(12) United States Patent
O'Loughlin et al.

(10) Patent No.: US 6,275,505 B1
(45) Date of Patent: Aug. 14, 2001

(54) METHOD AND APPARATUS FOR PACKETIZING DATA INTO A DATA STREAM

(75) Inventors: Gareth P. O'Loughlin, Ottawa; Michel J. P. Patoine, Ashton; J. Morgan Smail, Stittsville, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/087,840

(22) Filed: May 30, 1998

(51) Int. Cl.[7] .......................................... H04J 3/24
(52) U.S. Cl. ............................. 370/473; 370/474
(58) Field of Search ................................ 370/465, 471, 370/473, 474, 505, 509, 514

(56) References Cited

U.S. PATENT DOCUMENTS 5,680,400 * 10/1997 York ...................................... 370/473
5,961,626 * 10/1999 Harrison et al. ...................... 710/129

* cited by examiner

Primary Examiner—Melvin Marcelo
Assistant Examiner—D. Trinh

(57) ABSTRACT

A method and apparatus for packetizing data include processing that begins by determining the bit time occurrence for retrieval of at least one bit of a portion of a data word, which is stored in local memory. Next, the processing determines the status of the data word based on the bit time occurrence for retrieval of the bit. Next, the bit is retrieved from local memory based on the status of the data word. Having retrieved the bit, the status of the data word is updated based on the bit time occurrence of the at least one bit and the data word. Next, the processing applies a data packetizing protocol to the at least one retrieved bit based on the status of the data word to construct a data packet corresponding to the data word.

32 Claims, 42 Drawing Sheets

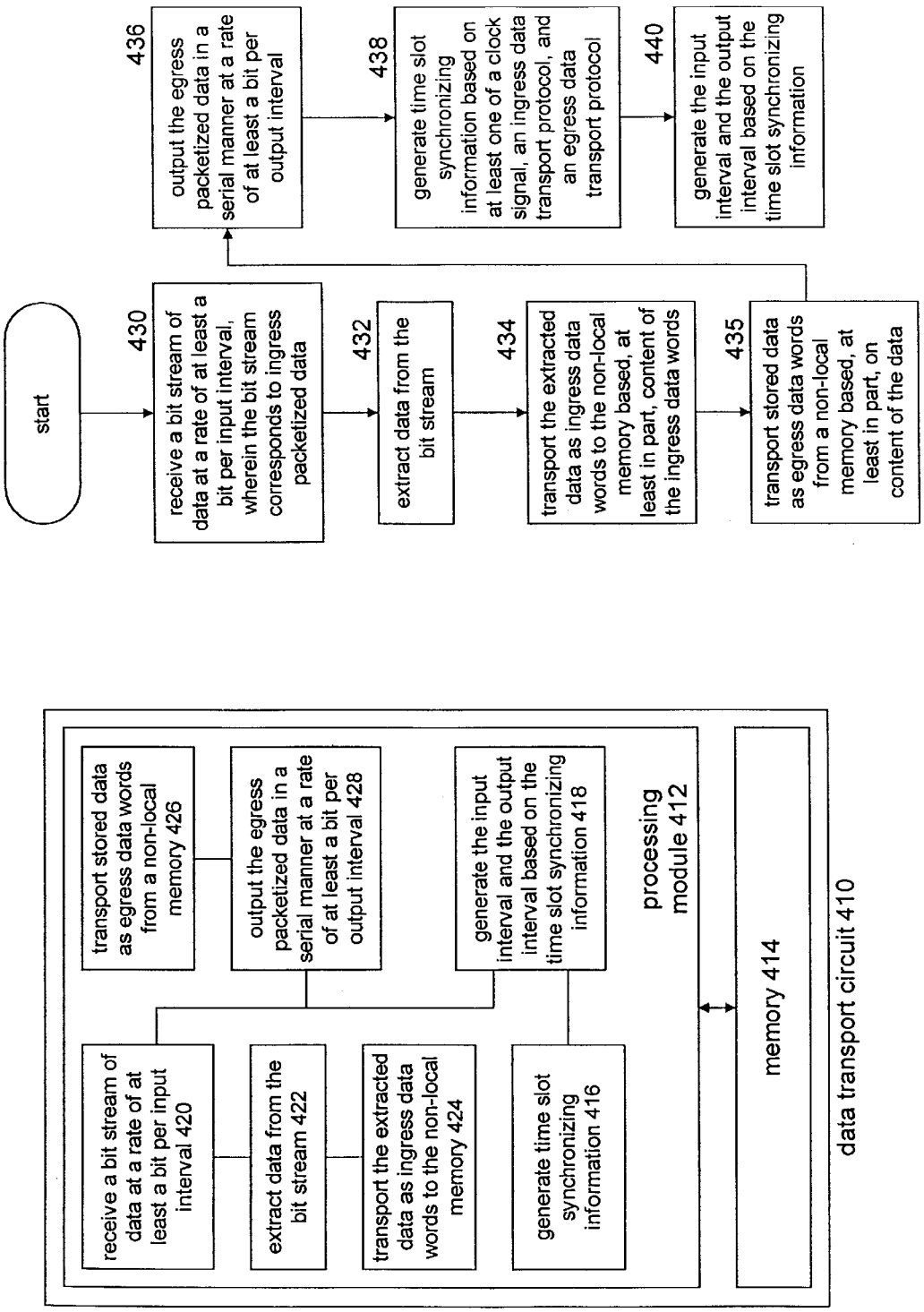

METHOD AND APPARATUS FOR PACKETIZING DATA INTO A DATA STREAM

TECHNICAL FIELD OF THE INVENTION

The present invention relates generally to telecommunication equipment and more particularly to data transportation within such equipment.

BACKGROUND OF THE INVENTION

Telecommunication is known to allow one or more calling parties to convey data to one or more called parties. The data conveyed may be voice, video data, and/or computer data. Computer data includes e-mail communications, file transfers, file sharing, etc. To enable such communication, a calling party transmits an identifying code (e.g., phone number) of at least one called party to a local exchange carrier (LEC), which is typically operated by a local phone company, or to an inter-network exchange carrier (IEC), which is typically operated by a long distance phone company. The receiving exchange carrier interprets the identifying code of the called party and determines whether it can complete the communication path between the called and calling parties (e.g., the call is a local call). If so, the receiving exchange carrier provides a communication path for the calling party and the called party such that they may participate in a communication.

If, however, the receiving exchange carrier cannot complete the communication path, it transfers the called party's identifying code to another local exchange carrier and/or to an inter-network exchange carrier. The called party's identifying code is continually passed until it reaches a local exchange carrier, or an inter-network exchange carrier, that can complete the communication path.

As is known, local exchange carriers and inter-network exchange carriers each processes hundreds, thousands, and even tens of thousands of calls at any given moment. To facilitate such a vast number of communications, each of the LECs and IECs includes switching equipment that multiplexes the plurality of communications for more efficient processing. A common multiplexing method for North American Public Data/Telephony Network is to multiplex a line as a DS3 line, which includes 28 DS1 lines, which, in turn, each includes 24 DS0 lines. As is known, a DS0 line support 64 Kbps or 56 Kbps of data, depending on its selected configuration. Since a DS1 line supports 24 DS0 lines, a DS1 has a data bandwidth of 1.536 Mbps (24*64 Kbps). Thus, a DS3 line, which includes 672 DS0s, has a data bandwidth of approximately 43 Mbps (672*64 Kbps). As is also known, DS0 lines may be combined into logical channels (often referred to as streams) depending on a particular customer's needs. For example, a typical individual data consumer (i.e., a home user) would require a single DS0 line, or link. In contrast, a business may require a full DS1, or T1, link thus utilizing the full 1.536 Mbps of bandwidth.

Another multiplexing method, which is primarily used outside of North America, is to configure a line as an E3 line, which includes 16 E1 lines. As is known, an E1 line is comprised of 32 DS0 lines (of which 31 support data) and has a data band width of 1.984 Mbps. Thus, an E3 line includes up to 496 DS0 lines and has data bandwidth of approximately 33 Mbps. The DS0 lines may be assigned to customers based on their data bandwidth requirements in a similar manner as the DS0 lines are allocated for a DS3 line. As such, a consumer may have a logical channel that includes a single DS0 line or up to a complete E1 link.

To ensure cooperation of telephone multiplexing equipment, several data transmission standards have been adopted. One such standard requires data to be transported in accordance with a High-level Data Link Controller (HDLC) encapsulated data protocol. There are several types of HDLC encapsulated data protocols including frame relay, point to point protocol (PPP) and switched multi-megabit data service (SMDS). In essence, the HDLC encapsulated technique allows multiple connections (i.e., logical channels) to be carried on a single link, be terminated, and adapted for further transportation using another encapsulating techniques. For example, data that has been packetized based on the frame relay HDLC encapsulated data protocol can be terminated and then converted to another HDLC encapsulated data packetizing protocol (e.g., PPP and/or SMDS) or to other data packetizing protocol such as ATM (asynchronous transfer mode) data packetizing protocol. For example, a frame relay to ATM adaptation technique includes network interworking and service interworking functionality, where service interworking provides two adaptation subcategories: transparent and translation. The conversion of data from one encapsulated data packetizing protocols to another is regulated by several published standards from Belcor, ITU, the frame relay forum, the ATM forum, and the Internet engineering task force.

To facilitate data transportation within the switching equipment, the switching equipment includes a direct memory access (DMA) controller. A typical DMA controller transports data elements from point to point in response to a stimulus from the source or destination point without regard to the data content. More advanced DMA controllers support scattering/gathering of data. As is known, the scattering/gathering technique enables a DMA controller to segment large blocks of data into smaller blocks and to distribute the smaller blocks within a large memory system, achieving more efficient use of the large memory system. A more advanced DMA controller typically implements the scattering/gathering without regard to data content and usually in only one data transfer direction (e.g., to the large memory system or from the large memory system). The more advanced DMA controller may, however, verify that the data is formatted in accordance with a specific data packetizing protocol (e.g., HDLC frame relay encapsulated data protocol) based on the data content, but the transporting of data is still independent of the data content.

To achieve multi-channel processing with a single DMA controller, the DMA circuit resources for a single channel are replicated. When the stimulus is received for a data transfer via a particular logical channel, the circuit resources for the particular logical channel are activated, but the circuitry for the other logical channels remains inactive. As such, the switching equipment is not operating at an optimal level.

To improve the switching equipment's multi-channel performance, the equipment may include a multi-channel DMA controller, which services multiple logical channels as they require data transfers. Controlling such multiple channel data transfers may be done in one of a variety of ways. For example, each channel, or object, in the system may be serviced based on a theoretical average of the overall system requirements. As such, each object obtains a theoretical average value and is processed in accordance with this average. While this method assures that each object will be processed, it, at times, over emphasizes some objects of lesser importance while undervaluing objects of greater importance. An alternate technique assigns a maximum weight for any given object. As such, each object is serviced as though it were of a maximum weight, i.e., priority. In this technique, the condition of all possible objects times maximum weight is theoretically impossible, but to come close to fulfilling this theoretical condition, a substantial amount of memory and supporting circuitry is required, which tends to be wasteful. Another technique allows the object to set its own pace of processing, which is efficient for keeping a given resource busy. However, in a runaway situation, a given object can consume the system, taking more than its fair share and starving other objects from being serviced.

Incorporating the above described techniques and circuitry, a telecommunication switch that supports a DS3 link, or an E3 link, can be configured to accommodate up to 128 logical channels. Recently, literature for an advanced telecommunication switch claims that the switch can be configured to support up to 256 logical channels. Thus, when most of the logical channels supported by the switch each includes a plurality of DS0s, the DS3/E3 link is run at near bandwidth capacity. However, when a majority of the logical channels include only a single DS0, which would be the case for most home users, a substantial portion of the DS3/E3 link bandwidth is unused. Recall that a DS3 link is capable of supporting 672 DS0s. Thus, if the DS3 link is supporting logical channels that all include a single DS0 up to 416 DS0s go unused. As one can imagine, when the DS3 link is operated at below its data bandwidth capacity, data transportation efficiency suffers.

Therefore, a need exists for a method and apparatus that allows for a telecommunication switch that is coupled to a DS3/E3 link to accommodate up to 672 logical channels. In addition, the method and apparatus should provide a service provider operating the telecommunication switch enhanced flexibility in supporting its ever-changing customers' needs.

BRIEF DESCRIPTION OF THE DRAWINGS

FIG. 13 illustrates a schematic block diagram of another alternate data transport circuit in accordance with present invention;

FIG. 14 illustrates a logic diagram of a method for transporting data in accordance with the present invention;

DETAILED DESCRIPTION OF A PREFERRED EMBODIMENT

Figure 1:
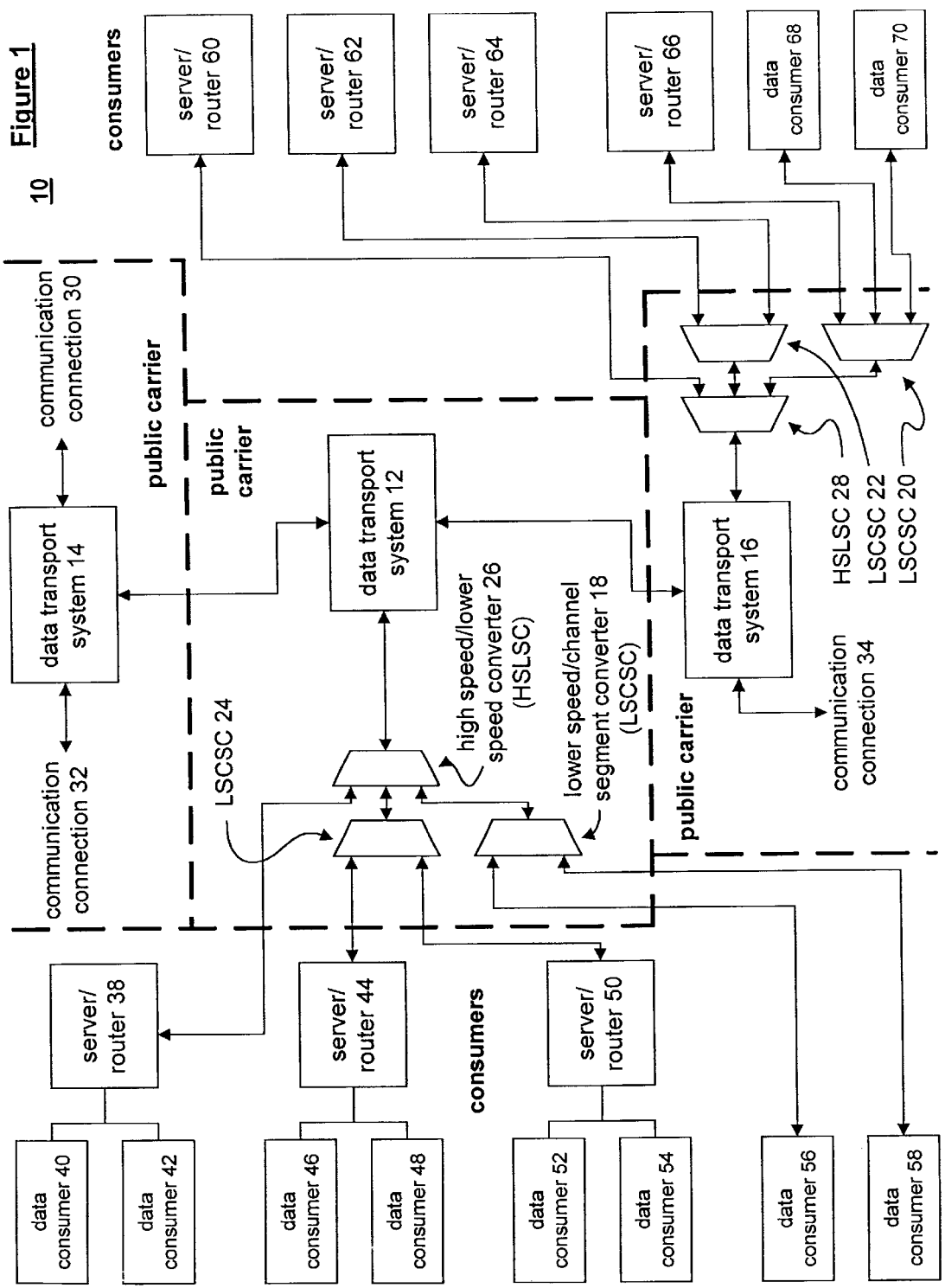
FIG. 1 illustrates a schematic block diagram of a data communication environment in accordance with the present invention.

Generally, the present invention provides a method and apparatus for packetizing data. Such processing begins by determining the bit time occurrence for retrieval of at least one bit of a portion of a data word, which is stored in local memory. Next, the processing determines the status of the data word based on the bit time occurrence for retrieval of the bit. Next, the bit is retrieved from local memory based on the status of the data word. Having retrieved the bit, the status of the data word is updated based on the bit time occurrence of the at least one bit and the data word. Next, the processing applies a data packetizing protocol to the at least one retrieved bit based on the status of the data word to construct a data packet corresponding to the data word. With such a method and apparatus, data packetizing may be done at the bit level, or groups of bit level, thereby providing much greater flexibility in the retrieval and packetizing of data. Further, when such a packetizing process incorporated into DS3 switching equipment, it is capable of supporting up to 672 logical channels or when incorporated into E3 switching equipment, it is capable of supporting 512 logical channels.

In general, the present invention teaches a system, and portions thereof, for the termination and generation of up to 672 HDLC encapsulated channels within DS3 switching equipment (i.e., data transport system) or up to 496 channels in E3 switching equipment (i.e., data transport system). The data transport systems may be configured to provide interface adaptation to ATM or cross-connection to HDLC encapsulated networks. The data transport system includes a plurality of transport mapping circuits that may be manufactured as printed circuits. The transport mapping circuits may each include a single integrated circuit (IC) solution for multi-channel HDLC processing and buffer management to support the DS3/E3 rates. The multi-channel HDLC IC includes a plurality of virtual HDLC modules that support ingress data packets and egress data packets. For example the HDLC integrated circuit may include seven virtual HDLC modules to support the DS3 rate, where each virtual HDLC modules supports four DS1 links. The four DS1 links are interleaved into a stream of data, which is provided as an input to the ingress path of the virtual HDLC and is outputted as a stream of data via the egress path of the virtual HDLC.

To facilitate the processing of the interleaved data streams, the multi-channel HDLC IC further includes a memory manager that facilitates the transfer of data between local memory (i.e., the memory on chip associated with each of the virtual HDLCs) and non-local memory (i.e., the memory on the printed circuit board). The memory manager in general uses a time shared multi-channel direct memory access (DMA) engine that has bandwidth proportional channel servicing capabilities and has programmable resource allocation. The memory manager utilizes a linked list to facilitate such data transfers, where the linked list is generated in an efficient manner based on similar and dissimilar proportions of the objects. By implementing such a printed circuit board (i.e., at the transport mapping level), which includes the single chip multi-channel HDLC solution, the present invention provides the following benefits: service for up to 672 logical channels, support for individual channel bandwidths of one to 96 DS0s, wherein each DS0 can be configured as 56 kilobits per second or 64 kilobits per second, provides maximum frame size rejection (which is configurable), supports per channel configuration for bit inversion, number of inter-frame flag, CRC (cyclic redundancy checking) 16 or CRC 32 protocol checking for transparent and/or frame relay services, provides statistics for short frames, under-runs, and overruns on a per channel basis, processes frames that are stored in off chip memory using a generic scatter gather buffering scheme, buffer pools are allocated per priority with each logical channel connection having an assigned priority, supports data link connection identifier (DLCI) lookups and address mapping, allowing full throughput at all valid frame sizes, and provides a simple processor interface to provide for stream configuration, i.e., logical channel configuration. These and other benefits will be further illustrated by the following description related to FIGS. 1 through 43.

FIG. 1 illustrates a schematic block diagram of a data transportation environment 10 that is divided into consumer sections and public carrier sections. As shown, the environment 10 includes a plurality of data consumers 40–58 in a first consumer area and a plurality of data consumers 68 and 70 in a second consumer area. Each of the data consumers 40–58, 68 and 70 may be facsimile machines, video telephones, telephones, personal computers, and/or any other device that transmits and/or receives data via a public, or private, telecommunication infrastructure. As shown in the first consumer area, the data consumers may be coupled to a public carrier in a variety of ways. For example, data consumers 40 and 42 are part of a local area network (LAN) that is supported by server/router 38, which is directly coupled to a high speed/lower speed converter 26. Data consumers 46 and 48 are part of a different LAN that is supported by server/router 44, which is coupled to a lower speed/channel segment converter 24. Data consumers 52 and 54 are part of another LAN that is supported by server/router 50, which is coupled to the lower speed/channel segment converter 24. Data consumers 56 and 58 are stand-alone devices (i.e., not part of a LAN) that are each coupled to lower speed/channel segment converter 18.

The server/routers 38, 44, and 50 may each include a separate server entity for services to its local area network and a separate router to interface with the public carrier network (an IEC and/or an LEC). Alternatively, the server/routers 38, 44, 50 may each be an integrated device that services the respective local area network and provides an interface to the public carrier network. The server/router 38, 44 and 50 are coupled to the public carrier based on their data bandwidth requirements for supporting their respective LANs. For example, as shown, data server/router 38 has a data bandwidth requirement for a fill lower speed data link, which may be a T1 or E1 link. Hence it is coupled directly to the high speed/lower speed converter 26, which is a bi-directional multiplexor of a high-speed link to a plurality of lower speed links. For example, the high-speed link may be a DS3 link, while the lower-speed links include 28 DS1 links or T1 links. Alternatively, the high-speed link may an E3 link, while the lower speed links include 16 E1 links. Note that, for the purposes of this discussion, a T1 link and DS1 link will be used interchangeably and when one is mentioned it shall be interpreted to include both.

Server/routers 44 and 50 have a data bandwidth requirement that is less than the bandwidth capacity of a full lower speed data link. As such, server/router 44 and 50 each consume only a portion of a lower speed data link, which may be an E1 link or a T1 link. As such, server/routers 44 and 50 are coupled to the lower speed/channel segment converter 24, which is a bi-directional multiplexor of a lower speed link to a plurality of channel segments. For example, the lower-speed link may be a T1 link, while the channel segments include 24 DS0 links, wherein each DS0 link has a data bandwidth of 56 kilobits per second or 64 kilobits per second, depending on the configuration of the DS0. Alternatively, the lower-speed link may be an E1 link, while the channel segments include 32 DS0s.

Data consumer 56 and data consumer 58 have a data bandwidth requirement that is less than the bandwidth capacity of a full lower speed data link. As such, data consumers 56 and 58 each consume only a portion of a lower speed data link, which may be an E1 link, a T1 link or a T1 link. As such, data consumers 56 and 58 are coupled to the lower speed/channel segment converter 18, which is a bi-directional multiplexor of a lower speed link to a plurality of channel segments. For example, the lower-speed link may be a T1 link, while the channel segments include 24 DS0 links, wherein each DS0 link has a data bandwidth of 56 kilobits per second or 64 kilobits per second, depending on the configuration of the DS0. Alternatively, the lower-speed link may be an E1 link, while the channel segments include 32 DS0s.

The multiplexed outputs of the low speed/channel segment converters (LSCSC) 18 and 24 are coupled to the high-speed/lower-speed converter (HSLSC) 26. As mentioned, the high-speed link may be a DS3, the lower speed links may be T1 links, and the channel segments may be DS0 links. Note that throughout the remainder of the description of the present invention, when a high-speed link is referred to by example, a DS3 link will be used, but shall be interpreted to include an E3 link. Further note that when a lower speed link is referred to by example, a T1 link will be used, but shall be interpreted to include an E1 link. Further note that when the functionality of the present invention differs for a DS3 and E3 link, the description will reference both the DS3 link and the E3 link.

While the lower speed/channel segment converters 18 and 24 are shown to multiplex two logical channels from the data consumers, the number of logical channels is dependent on the bandwidth of the data consumers. For example, if server/routers 44 and 50 each have a data bandwidth requirement of one-half a T1 link (i.e., 12 DS0s), then only two logical channels would be multiplexed into the T1 link. If the server/routers 44 and 50 have a total data bandwidth requirement less than a full T1, the converter 24 may be coupled to multiplex additional logical channels. Similarly, converter 18 multiplexes lower speed links with logical channel groupings of channel segments depending on the data bandwidth requirements of the data consumers. If each logical channel requires only a single DS0, the converter 18 would multiplex 24 logical channels into the T1 link. As one of average skill in the art will appreciate, the converter 18 and 24 multiplex 24 DS0 with one T1 regardless of the logical channel assignments.

The high-speed/low-speed converter 26 is coupled to multiplex 28 T1 links with a single DS3 link. As such, the de-multiplex portion of the converter 26 is coupled to 28 lower speed/channel segment converters and/or data consumers having a bandwidth requirement of a full T1. The multiplex portion of converter 6 is coupled to a data transport system 12, which is operable to route data between the converter 26, data transport system 14, and data transport system 16. In addition to routing the data, the data transport system 12 may re-packetize the data. For example, the data transport system 12 may receive frame relay packetized data, re-packetize it, and output it as another type of HDLC encapsulated data (e.g., PPP, SMDS, or Frame Relay) or ATM packetized data. Such re-packetizing is generally referred to as service interworking and/or network interworking. As an alternate example, the data transport system 12 receive frame relay packetized data from converter 26 and routes the frame relay packetized data to the transport system 14, the transport system 16, and/or the converter 26. Such transportation of frame relay data is generally referred to as frame relay switching. The details of the data transport systems 12, 14 and 16 will be discussed in greater detail with reference to FIGS. 2 through 9.

As shown, the data transport system 16 is operably coupled to another communication connection 34 and to a high-speed/lower speed converter 28. The communication connection 34 may be to another data transport system, or to a high-speed/low-speed converter. The high-speed/low-speed converter 28 is coupled to a plurality of low-speed/channel segment converters 20 and 22, which are operably coupled to a plurality of consumers. The consumers include server/router 60, 62 and 64 and 66, and data consumers 68 and 70. As shown, converter 20 is operably coupled to server/router 66 and a plurality of data consumers 68 and 70, which illustrates that the configuration of a converter 20 or 22 is independent of the type of data consumer that are coupled to the converter 20 or 22. A configuration requirement of the converters 20 and 22 is that the data transceived is packetized using the same data packetizing protocol. As such, the low-speed/channel segment converters may be coupled to any type of data consumers and support any logical channel configuration provided the packetizing protocol is similar and the data band width of the consumers do not exceed the capabilities of the converter. Note that the functionality of the converters 20 and 22 is identical to the functions of converter 18 and the functionality of converter 28 is identical to the functionality of converter 26.

Data transport system 14 is coupled to communication connections 32 and 30. As such, the data transportation system 14 may be coupled to another data transportation system, and/or to a high-speed/low-speed converter. Note that the data transport systems 12, 14 and 16, may be operated by local exchange carriers and/or long distance exchange carriers.

Figure 2:
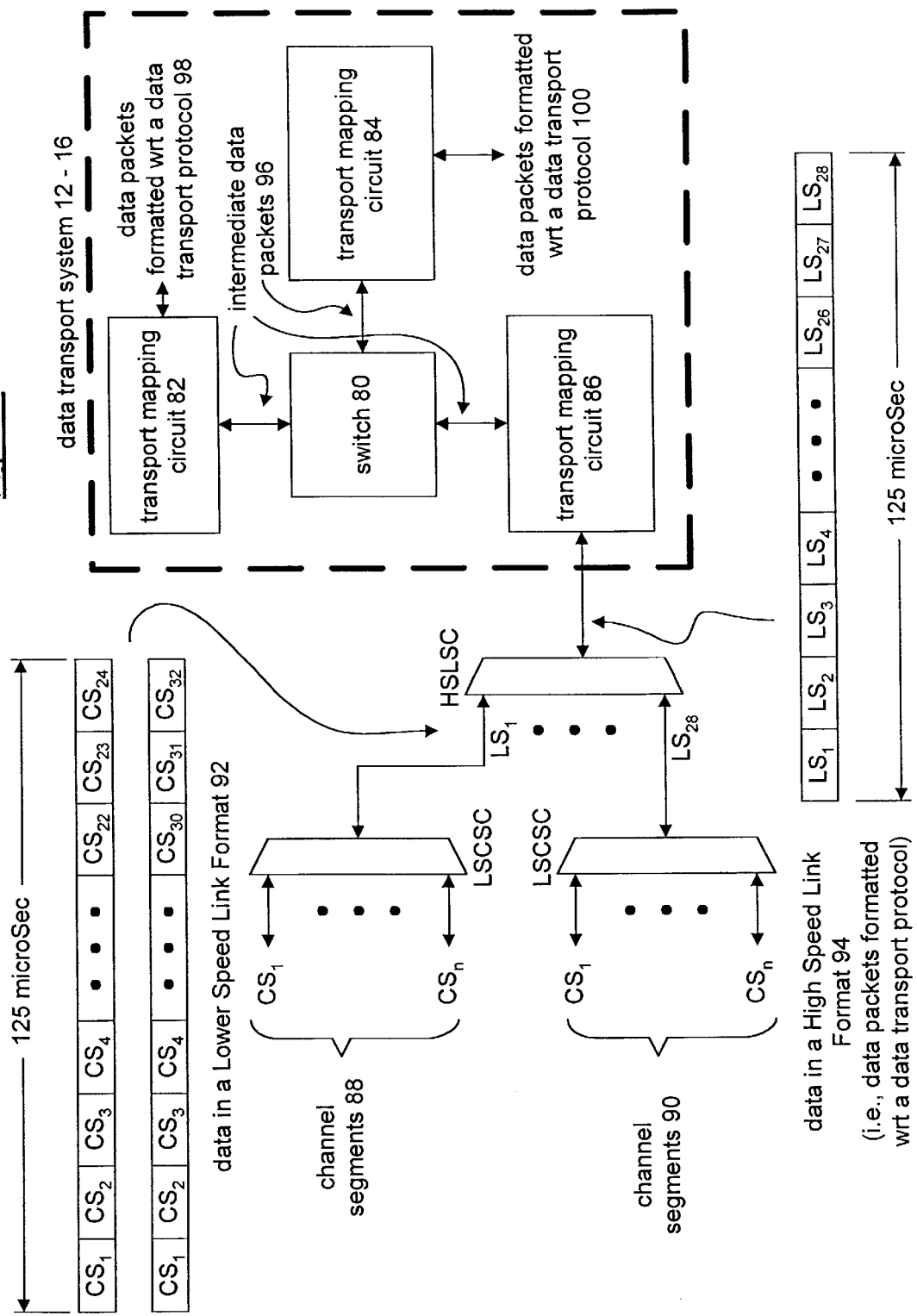
FIG. 2 illustrates a schematic block diagram of a data transport system in accordance with the present invention.

FIG. 2 illustrates a schematic block diagram of the data transport system 12–16 and a graphical representation of data processed thereby. The upper-left portion of FIG. 2 illustrates a graphical representation of data having a lower-speed link format 92. As shown, the data includes a plurality of channel segments ($CS_1$–$CS_n$). The period for such a lower speed link is 125 microseconds. For example, if the lower-speed link is representative of a T1 link, the channel segments are representative of 24 DS0 links. If the lower speed link is an E1 link, it includes 32 DS0s per 125 microsecond frame.

The lower-portion of FIG. 2 illustrates data having a high-speed link format 94.

Such data corresponds to data packets that have been formatted with respect to a data transport protocol (e.g., DS3, E3, etc.). As shown, the data formatted in a high-speed link format includes 28 lower-speed segments ($LS_1$–$LS_{28}$) for a DS3 link. If the high speed link format corresponds to an E3 link, the number of lower speed links is 16. Regardless of whether the high speed link is formatted based on a DS3 link or an E3 link, it has a frame duration of 125 microseconds.

FIG. 2 further illustrates a plurality of channel segments 88 ($CS_1$–$CS_n$) being received by a low-speed/channel segment converter. The low-speed channel segment converter multiplexes the data associated with the channel segments into data having the low-speed link format 92. Similarly, another low-speed/channel segment converter is operably coupled to multiplex a plurality of channel segments 90 into a single lower speed link. The multiplex side of the low-speed/channel segment converters are provided to a de-multiplex side of a high-speed/low-speed converter. The high-speed/low-speed converter multiplexes data of the lower speed links into data having a high-speed link format 94.

The multiplexed side of the high speed/lower speed converter is coupled to the data transportation system 12–16. The data transport system 12–16 includes a plurality of transport mapping circuits 82, 84 and 86 that are operably coupled to a switch 80. Transport mapping circuit 86 is operably coupled to receive the data having a high-speed link format 94. Note that the transportation mapping circuits 82 and 84 may be coupled to receive data from a high-speed/low-speed channel converter or operably coupled to another data transport system.

As shown, the switch 80 transceives intermediate data packets 96 between the transport mapping circuits 82–86. Transport mapping circuits 82 and 84 further transceive data packets formatted with respect to a data transportation protocol 98 and 100. Recall that the data transportation protocol may be HDLC encapsulated data such as frame relay, PPP and SMDS and/or transportation protocols such as ATM data packetizing. The transport mapping circuits will be discussed in greater detail with reference to FIGS. 5 and 6.

Figure 3:
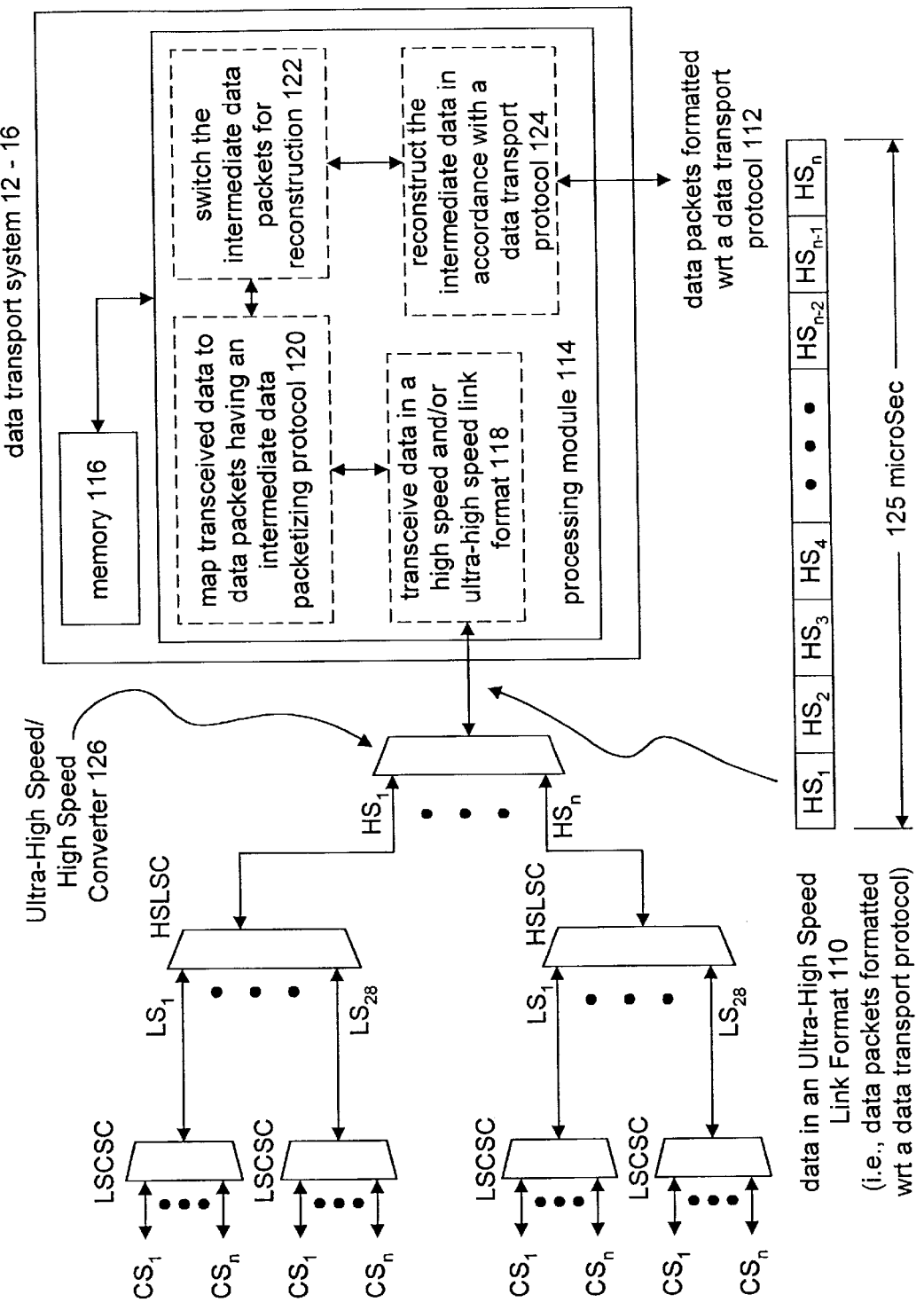
FIG. 3 illustrates a schematic block diagram of an alternate data transport system in accordance with the present invention.

FIG. 3 illustrates the data transportation system 12–16 being operably coupled to receive data having an ultra high-speed link format 110, which includes data packets that have been formatted with respect to a data transport protocol. As shown, the ultra high-speed format includes a plurality of high-speed links $HS_1$–$HS_n$, which may be DS3 links or E3 links. The ultra high-speed link has a frame duration of 125 microseconds. An ultra high-speed/high-speed converter 126 produces the data having the ultra high-speed link format 110 by multiplexing a plurality of high-speed links. The plurality of high-speed links are from a plurality of high-speed/low-speed converters, which are each coupled to a plurality of low-speed/channel segment converters. Comparing the inputs to the data transport system 12 of FIGS. 2 and 3, one can see that the input of FIG. 3 includes an extra layer of multiplexing. As such, the data bandwidth of the data transport system 12–16 increases proportional to the levels of multiplexing. As one of average skill in the art will appreciate, the multiplexing of data links may continue in a hierarchy manner to further increase the data bandwidth capabilities of the data transport system.

The data transport system 12–16 of FIG. 3 includes a processing module 114 and memory 116. The processing module 114 may include individual processing entities that perform the functions of circuits 120–124, a single processing entity, or a plurality of processing entities. Such processing entities may be a microprocessor, microcomputer, digital signal processor, central processing unit, a state machine, and/or any device that manipulates data based on operational instructions. The memory 116 may be a plurality of memory devices operably coupled to the respective circuits 120–124, or a single memory device. The memory device 116 may be random access memory, read-only memory, floppy disk memory, hard disk memory, magnetic tape memory, and/or any device that stores digital information. Note that if the processing module 114 is a state machine, the memory is embedded into the logic circuitry of the state machine to perform the functions of circuit 120–124. Further note that the data transport system of FIG. 3 is configurable to receive a DS3 link and/or an E3 instead of the ultra-high speed link data.

The memory 116 stores operational instructions that, when processed by the processing module 114, causes the processing module to function as a plurality of circuits 118–124. While executing the operating instructions, the processing unit functions as circuit 118 to transceive data in a high-speed and/or ultra high-speed link format. Circuit 118 is operably coupled to circuit 120, which maps data to data packets having an intermediate data packetizing protocol. The intermediate data packetizing protocol may correspond to a physical layer having a data transport protocol (e.g., DS3 or E3 link format) that transports data formatted based on an HDLC encapsulated data format (e.g., frame relay, PPP, SMDS) and/or ATM data packetizing format.

The processing module then functions as circuit 122 to switch the intermediate data packets for reconstruction. The processing module then functions as circuit 124 to reconstruct the intermediate data in accordance with a data transport protocol. The circuit 124 outputs data packets formatted with respect to a data transport protocol 112. The operating instructions stored in memory 116 and executing by processing module 124 will be discussed in greater detail with reference to FIG. 9.

Figure 4:
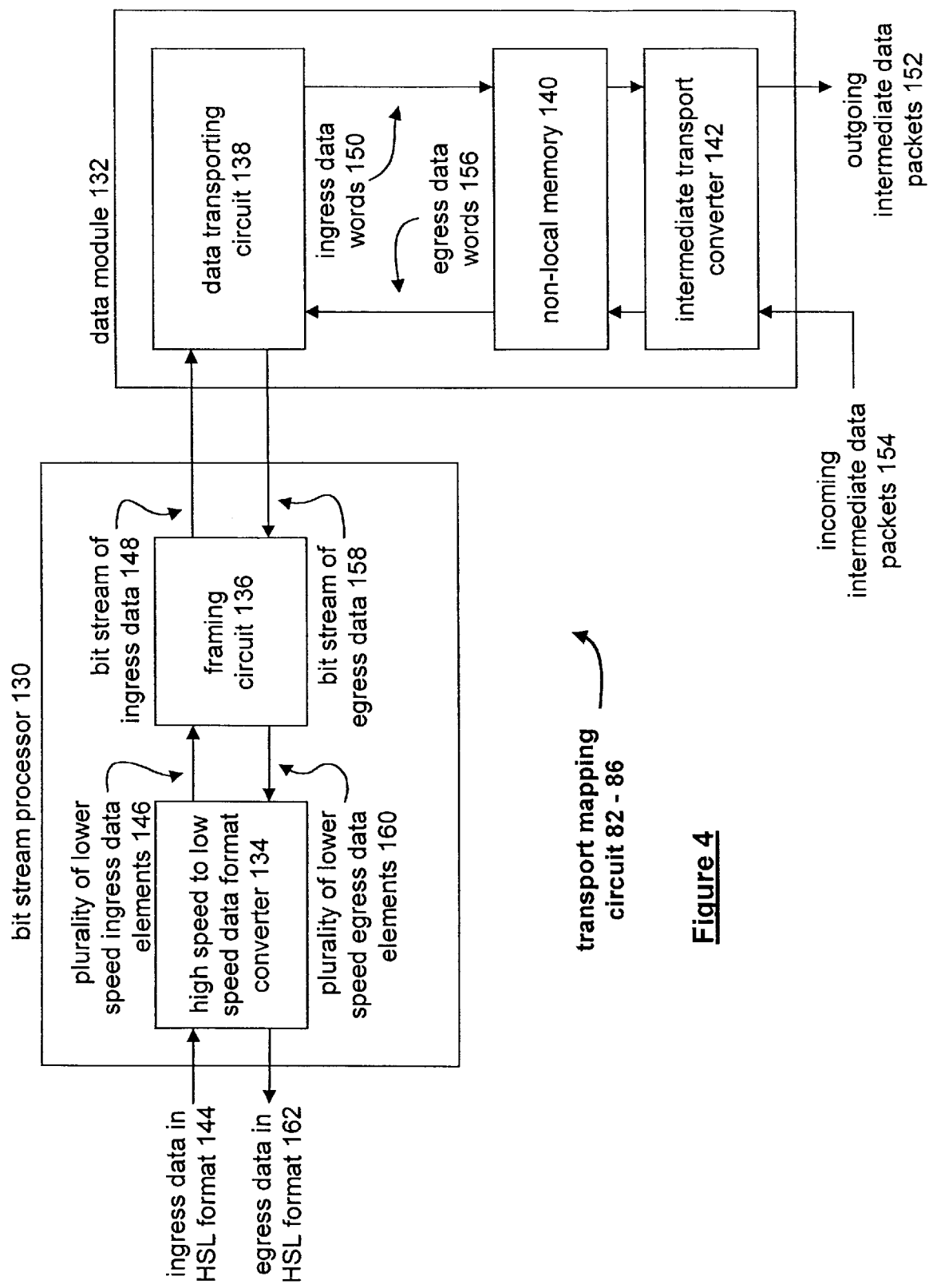
FIG. 4 illustrates a schematic block diagram of a transport mapping circuit in accordance with the present invention.

FIG. 4 illustrates a schematic block diagram of a transport mapping circuit 82–86 of the data transport system 12–16. The transport mapping circuit 82–86 includes a bit stream processor 130 and a data module 132. The bit stream processor 130 includes a high-speed to low-speed data format converter 134 and a framing circuit 136. The high-speed to low-speed data format converter 134 is operably coupled to receive ingress data in a high-speed link format 144. The converter 134 converts the high-speed ingress data into a plurality of lower-speed ingress data elements 146. The framing circuit 136 receives the plurality of lower-speed ingress data elements 146 and produces therefrom a bit stream of ingress data 148.

The framing circuit 136 is operably coupled to receive a bit stream of egress data 158 from the data module 132. The framing circuit 136 processes the bit stream of egress data 158 to produce a plurality of lower-speed egress data elements 160. The converter 134 is operably coupled to receive the plurality of lower-speed egress data elements 160 and to produce therefrom egress data having a high-speed link format 162. The functionality of the bit stream processor 130 will be discussed in greater detail with reference to FIGS. 5 and 6.

The data module 132 includes a data transporting circuit 138, non-local memory 140, and an intermediate transport converter 142. The data transporting circuit 138 is operably coupled to receive the bit stream of ingress data 148 and to produce therefrom an ingress data word 150. The ingress data word 150 is provided to the non-local memory 140 for storage. The intermediate transport converter 142 may retrieve the ingress data word 150 from the non-local memory 140 and produce an outgoing intermediate data packet 152, therefrom. The intermediate transport converter 142 may include a segmentation and reassembly engine (SAR) that packetizes the retrieved data words based on an ATM data packetizing protocol. Alternatively, the SAR may packetize the data in accordance with an HDLC encapsulated data packetizing protocol.

The intermediate transport converter 142 is operably coupled to receive incoming intermediate data packets 154. The intermediate transport converter 142 extracts data from the data packets and stores the data as egress data words 156 in the non-local memory. The data extraction process performed by the intermediate transport converter, as well as the data extraction performed by the data transport circuit 138, will be discussed in greater detail with reference to FIGS. 10–22.

The data transport circuit 138 retrieves the egress data words 156 from the non-local memory 140. Note that the egress data words 156 may correspond to the data received via the incoming intermediate data packets 154 or may be representative of the ingress data words 150. The data transport circuit 138 processes the egress data words 156 to produce a bit stream of egress data 158. Such processing will be discussed in greater detail with reference to FIGS. 10–15 and 23–28.

The framing circuit 136 is operably coupled to receive the bit stream of egress data 158 and produce therefrom a plurality of lower-speed egress data elements 160. The high-speed to low-speed data format converter 134 is operably coupled to receive the plurality of lower-speed egress data elements 160 and produce therefrom egress data in a high-speed link format 162.

Figure 5:
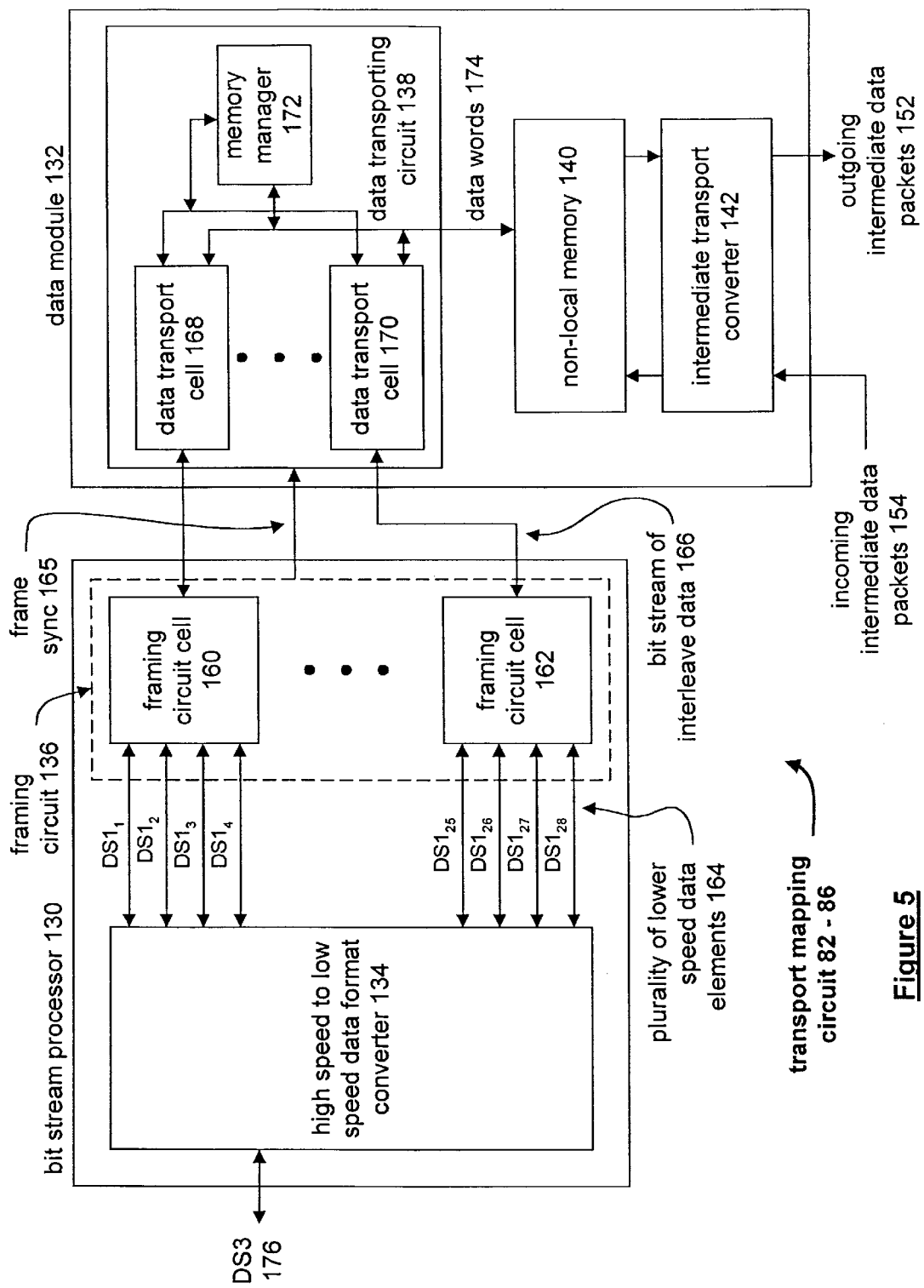
FIG. 5 illustrates a schematic block diagram of an alternate transport mapping circuit in accordance with the present invention.

FIG. 5 illustrates a more detailed schematic block diagram of the transport mapping circuit 82–86. In this embodiment, the framing circuit 136 includes a plurality of framing circuit cells 160–162. Also in this embodiment, the bit stream processor 130 is operably coupled to receive a DS3 link 176. The high-speed to low-speed data format converter 134 converts the DS3 link into a plurality of T1 links. In particular, the DS3 link is converted into 28 T1 links. Each of the framing circuit cells 160–162 is operably coupled to transceive data via four of the T1 links. As such, the first framing cell is coupled to receive $DS1_1-DS1_4$, while the seventh framing circuit 162 is operably coupled to transceive data via $DS1_{25}-DS1_{28}$ links. Each of the framing circuit cells 160–162 transceives data with a corresponding one of a plurality of data transport cells of the data module 132 as a bit stream of interleaved data 166. The generation of the bit stream of interleaved data 166 will be discussed in greater detail with reference to FIG. 6.

The framing circuit 136 generates a frame sync signal 165, which delineates the beginning and/or end of a DS3 frame within the bit stream of interleaved data 166. The beginning of a frame corresponds to the first bit of the first DS0 of the first DS1 that a framing circuit cell 160–162 is processing, not including frame and/or data packetizing overhead data. The end of a frame corresponds to the last bit of the last DS0 of the last DS1 processed by the framing circuit cell 160–162, not including frame and/or data packetizing overhead data. Note that the plurality of framing circuit cells 160–162 process their respective four DS1s in parallel. Thus, the duration of a frame within the bit stream may remain the same duration as a DS3 frame, providing the framing circuit cells compensation for the timing differences. As one of average skill in the art will appreciate, the partitioning of the DS1 links into groups may be done in any given combination to produce the bit stream of interleaved data 166.

The data transporting circuit 138 includes a plurality of data transporting cells 168–170 and a memory manager 172. The data transport cells 168–170 are coupled to a corresponding one of the framing circuit cells 160 and 162. As such, each of the data transport cells 168 and 170 process data corresponding to four DS1s. The memory manager 172 controls the sourcing and retrieval of data words 174 between the data transport cells 168, 170 and the non-local memory 140. As one of average skill in the art will appreciate, the bit stream processor 130 may be operably coupled to receive an E3 input wherein the framing circuits are operably coupled to receive three E1 links.

Figure 6:
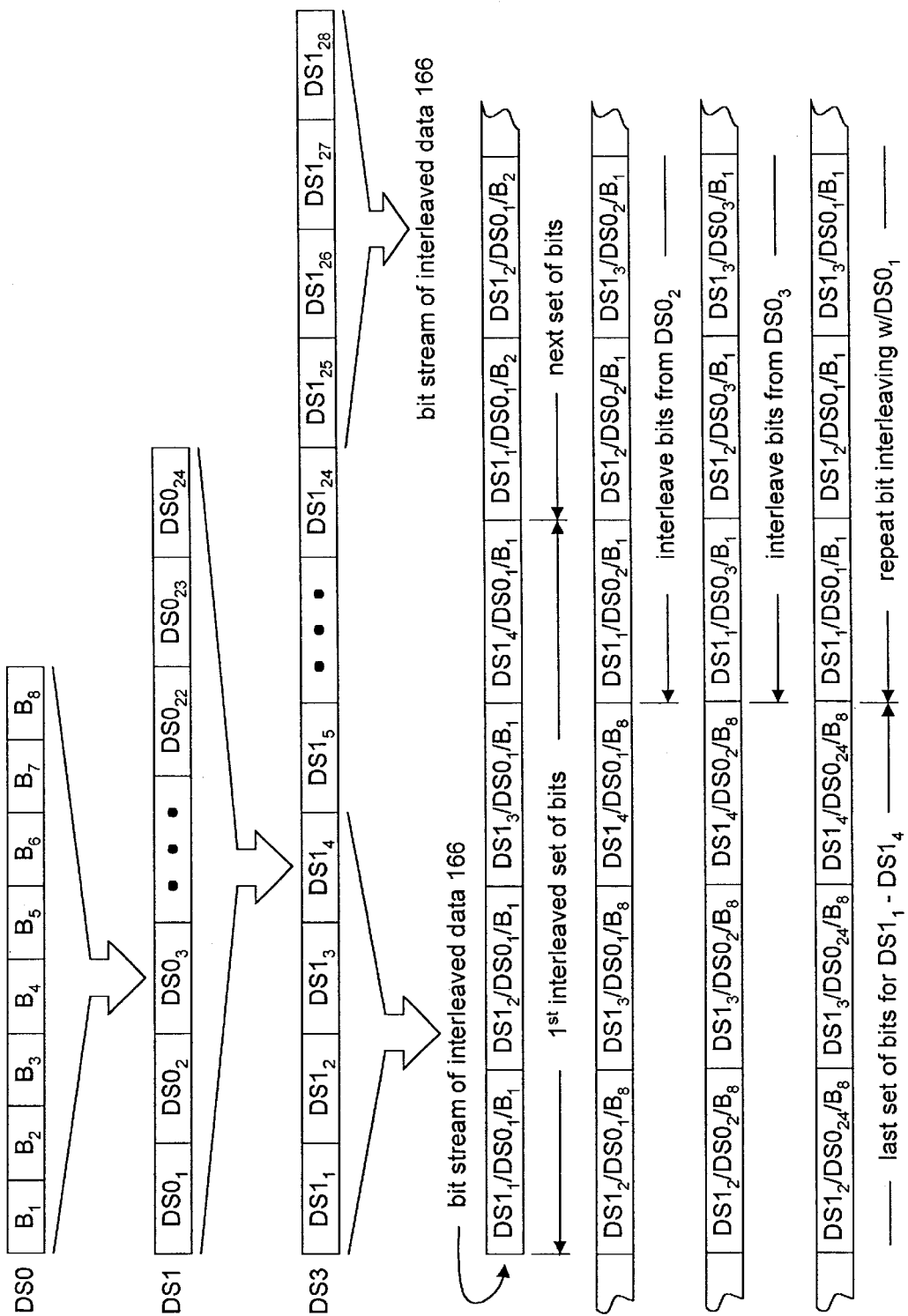
FIG. 6 illustrates a graphical representation for generating a bit stream of interleaved data in accordance with the present invention.

FIG. 6 illustrates a graphical representation of the generation of the bit stream of interleaved data 166. As shown, in the upper-portion of the Figure, a DS0 channel, which equates to a channel segment, includes eight bits of data. The next line illustrates a DS1 which includes 24 DS0s. The duration for the DS1 is 125 microseconds. The next line illustrates a DS3 containing 28 DS1s and having a duration of 125 microsecond per frame. To produce a plurality of bit streams of interleaved data 166, the DS3 link is divided into seven segments, each containing four DS1s. As shown, the first four DS1s of the DS3 are interleaved to produce the bit stream of interleaved data 166.

The remainder of FIG. 6 illustrates a portion of the bit stream of interleaved data 166. At the beginning of a frame, the first bit of data stream corresponds to the first bit of the first DS0 of the first DS1, less any framing and/or data packetizing overhead. The next bit in the stream corresponds to the first bit of the first DS0 of the second DS1, the next bit corresponds to the first bit of the first DS0 of the third DS1. The fourth bit in the stream, corresponds to the first bit of the first DS0 of the fourth DS1. The next bit corresponds to the second bit of the first DS0 of the first DS1. As such, the interleaving of the four DS1s occurs at the bit level of the DS0s. As shown on the second line of the bit stream, when the current bit corresponds to the eighth bit of the first DS0 of the fourth DS1, the next bit in the stream corresponds to the first bit of the second DS0 of the first DS1. Once all of the bits for the four DS1s have been combined, the bit pattern repeats. This is shown at the last line of the bit stream of interleaved data 166. As shown, the last set of bits for DS1–DS4 end with $DS1_4/DS0_{24}/B8$. Thus the next entry in the bit stream, corresponding to the data, would be the first bit of the first DS0 of the first DS1. Note that the ingress bit stream would include data packetizing overhead as well as framing overhead. Further note that the framing overhead data may be separated out prior to producing the ingress bit stream. As such, the ingress bit stream of interleaved data would not have the last bit of the DS1–DS4 series followed directly by the first bit of the first interleaved set of bit. Overhead data would be included between these sections.

Figure 7:
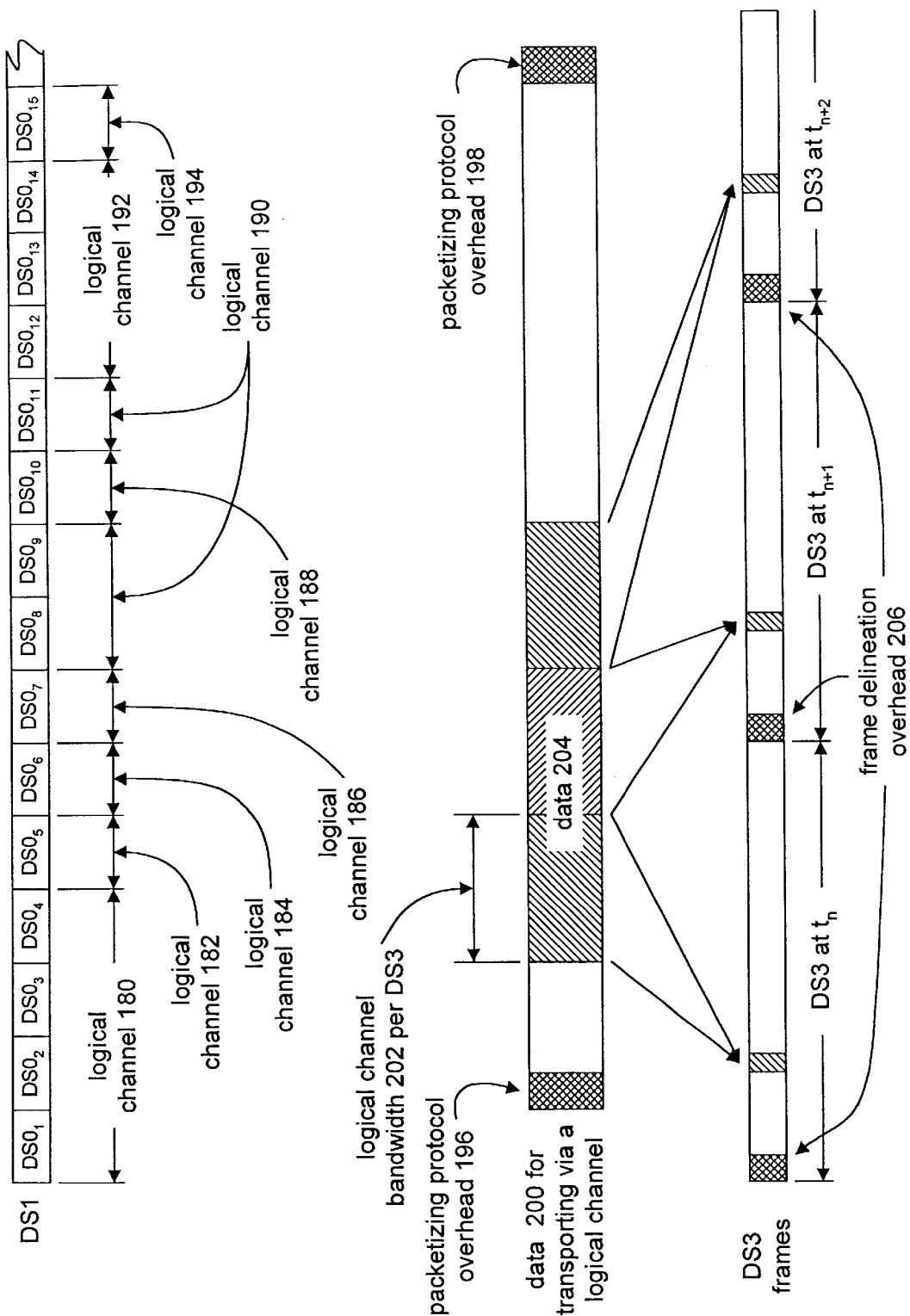
FIG. 7 illustrates a graphical representation of data transportation in accordance with the present invention.

FIG. 7 illustrates a graphical representation of transporting data associated with a logical channel. The transporting of the data may be in the ingress path or the egress path. To begin the transporting of data, the bit position positions of the data contained within the bit stream need to be affiliated with a particular logic channel. Recall that the frame duration is fixed. Since the frame duration is fixed, each bit in the bit stream has a corresponding duration. By determining the time duration from the beginning of a frame to the present retrieval, or sourcing, of a bit, the exact bit can be identified. As such, any bit in the bit stream of FIG. 6 may be determined by its time occurrence with respect to the beginning of the frame. Based on this information, a logical channel associated with a channel segment, (e.g., a DS0), may be ascertained.

As further shown in FIG. 7, a plurality of logic channels 180–194 are supported on a single DS1 link. In particular, logical channel 180 has four DS0s associated with it. Logical channel 182 has $DS0_5$ affiliated with it. Logical channel 184 has $DS0_6$ affiliated with it. Logical channel 186 has $DS0_7$ affiliated with it. Logical 188 has $DS0_{10}$ affiliated with it, while logical channel 190 has $DS0_9$, and $DS0_{11}$ affiliated with it. Logical channel 192 has $DS0_{12}$–$DS0_{14}$ affiliated with it, while logical channel 194 has $DS0_{15}$ associated with it. As can be seen in the Figure, a logical channel does not have to be associated with consecutive DS0s, refer to logic channel 190.

The next portion of FIG. 7 illustrates data 200 which is ready for transporting. The data corresponds to a particular logic channel. If the data 200 corresponds to ingress data, the packetizing protocol overhead 196 and 198 are included as part of a data packet. Alternatively, if data 200 corresponds to egress data, the data transportation cell adds the packetizing protocol overhead 196 and 198. The data packet 200 further includes a data section 204 which includes more data then can be transmitted within the logical channel bandwidth 202 of a given DS3 frame. In other words, if the logical channel has four DS0s associated therewith, its bandwidth is 256 Kbps (i.e., 4*64 Kbps). Thus, in a given 125 microsecond DS3 frame the maximum amount of data that can be transported by 4 DS0s is 32 bits. Thus, as shown at DS3 time interval $T_n$, 32 bits of data associated with the logical channel bandwidth 202 is being transported. At the next DS3 time interval $t_{n+1}$, the next 32 bits of data associated with the logical channel are transported and so on until the end of the data packet is reached. Note that if the data 200 corresponds to ingress data, the packetizing protocol overhead 196 and 198 would also be conveyed within the DS3 frames.

Figure 8:
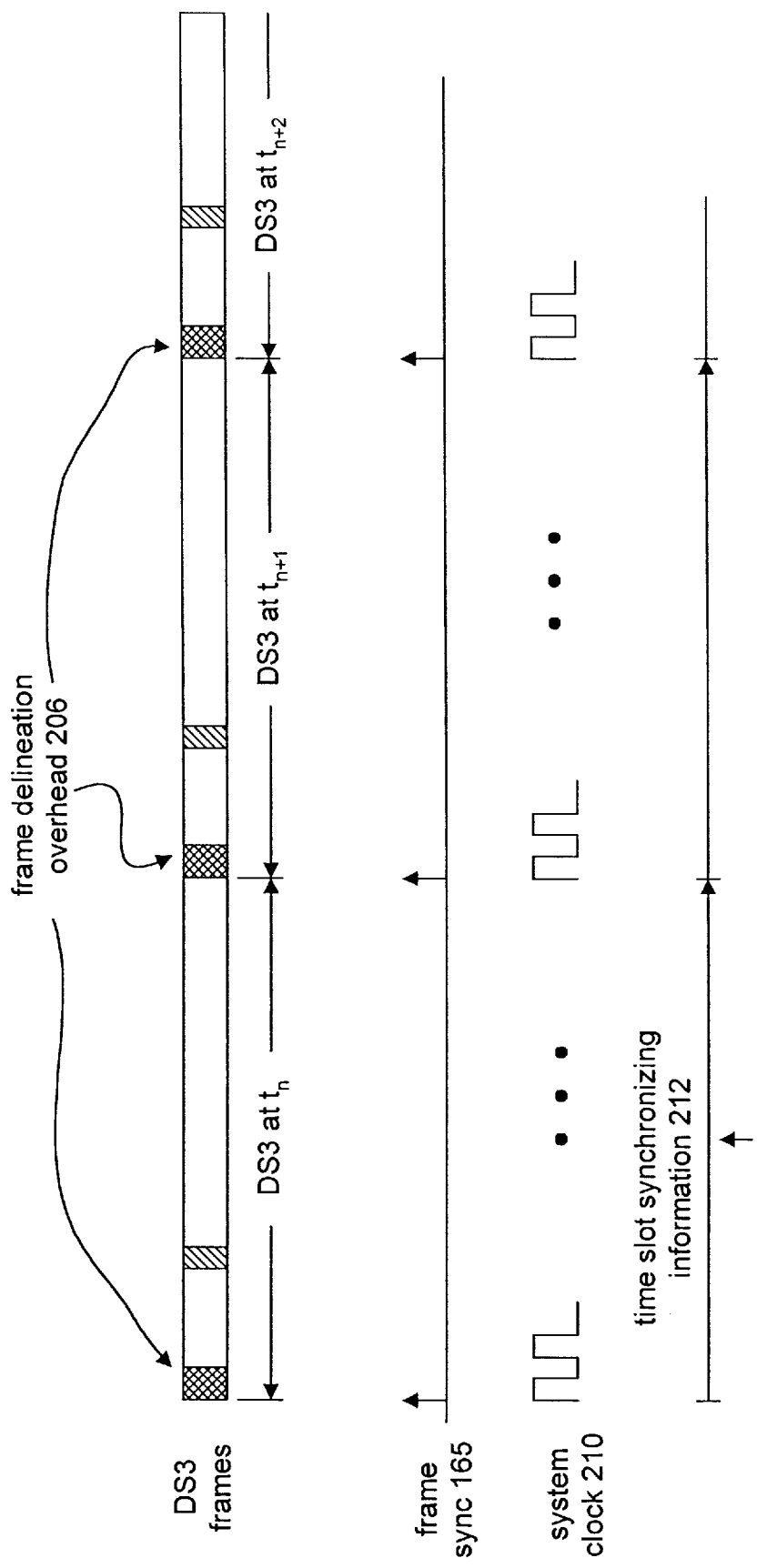
FIG. 8 illustrates a graphical representation of data transport timing in accordance with the present invention.

FIG. 8 illustrates a graphical representation of the frame sync signal 165 as it relates to the DS3 frames and a system clock 210. As shown, at the beginning of each DS3 frame, the frame includes frame delineation overhead 206, which corresponds to data protocol overhead (e.g., DS3 overhead and/or E3 overhead). Thus, at the beginning of each frame, a frame sync signal 165 is generated. The system clock, which may be a 16 megahertz clock, 32 megahertz clock, etc. is synchronized to the frame sync signal 165. By synchronizing the system clock to the frame sync signal, the system clock can be utilized to generate bit position synchronizing information 212. The bit position synchronizing information 212 corresponds the occurrence of a particular bit in the bit stream to its time relative to the beginning of the frame. As such, simple counting circuits may be utilized in conjunction with the system clock to determine the precise bit being processed by the data transport cell either in the egress or ingress path. FIG. 8 further shows an example that at a precise time the time interval corresponding to when the first bit of the 12th DS0 of the second DS1 would occur. The bit position synchronizing information will be discussed in greater detail with reference to FIGS. 16 and 23.

Figure 9:
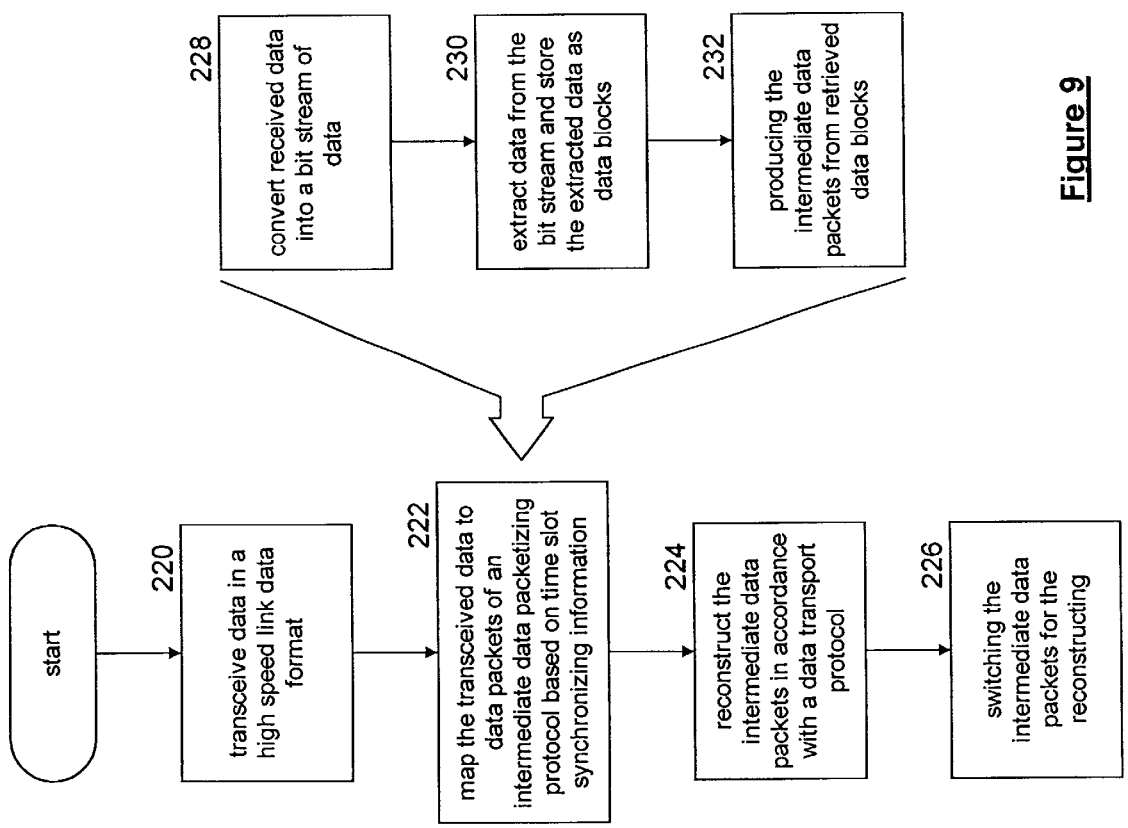
FIG. 9 illustrates a logic diagram of a method for high-speed data transportation in accordance with the present invention.

FIG. 9 illustrates a logic diagram of a method for high-speed data transportation. The process begins at step 220 where data having a high-speed link data format is transceived. The high-speed link data format corresponds to a high-speed link that includes a plurality of lower-speed links and supports a plurality of channels, or logical channels. Each of the plurality of lower-speed links includes a plurality of channel segments wherein each of the plurality of channels is associated with at least one channel segment. The number of channels is equal to or less than the number of channel segments within the high-speed link. Further note that the data associated with one of the channels is packetized based on one of a plurality of data packetizing protocols (e.g., HDLC encapsulated data, ATM encapsulated data protocols). By configuring the system as previously described with reference to FIGS. 1 through 8, the data transport system 12 is capable of supporting 672 logical channels, when coupled to a DS3 link. As such, each DS0 of the DS3 link may correspond to an individual logical channel. Thus, the present configuration increases the number of logical channels from 128 or 256 to 672 per data transport switch. Still further note that the data being transceived may be formatted in accordance with an ultra-high speed link wherein the ultra-high speed link includes a plurality of high-speed links, which may be comprised of a plurality of DS3s or E3s links.

The process then proceeds to step 222 where the transceived data is mapped to data packets of an intermediate data packetizing protocol. Such mapping is based on bit position synchronizing information. As previously mentioned, the intermediate data packetizing protocol may correspond to HDLC encapsulated data formats, and/or to ATM data packetizing protocol formats. The processing step 222 may be described in further detail with reference to steps 228 through 232.

At step 228, the received data is converted into a bit stream of data. The time occurrence of a bit within the bit stream, based on the bit position synchronization information, correlates the particular bit with a logical channel. The process then proceeds to step 230 where data is extracted from the bit stream and stored in data blocks of non-local memory based on logical channel affiliation of the bits. The process then proceeds to step 232 where the intermediate data is produced from the retrieved data blocks. Note that the intermediate data packets may be formatted in accordance with a data packetizing protocol to provide frame relay switching, networking interworking, or service interworking.

Returning to the main process at step 224, the intermediate data packets are reconstructed in accordance with a data transport protocol. The data transport protocol may be an E3 protocol, a DS3 protocol, an ultra-high speed link protocol, OC3, Synchronous Optical Network (SONET), Synchronous Digital Hierarchy (SDH), etc. Note that the data packets may be reconstructed based on a different data transport protocol than the data transport protocol of incoming data packets. For example, the data may be received via a DS3 link and outputted as an ultra-high speed link, a DS3 link, or a DS1 link. The process then proceeds to step 226 where the intermediate data is switched to facilitate the reconstruction. The switching is done between the transport mapping circuits 82–86 of FIG. 2 and their respective portions as illustrated in FIGS. 3–5.

Figure 10:
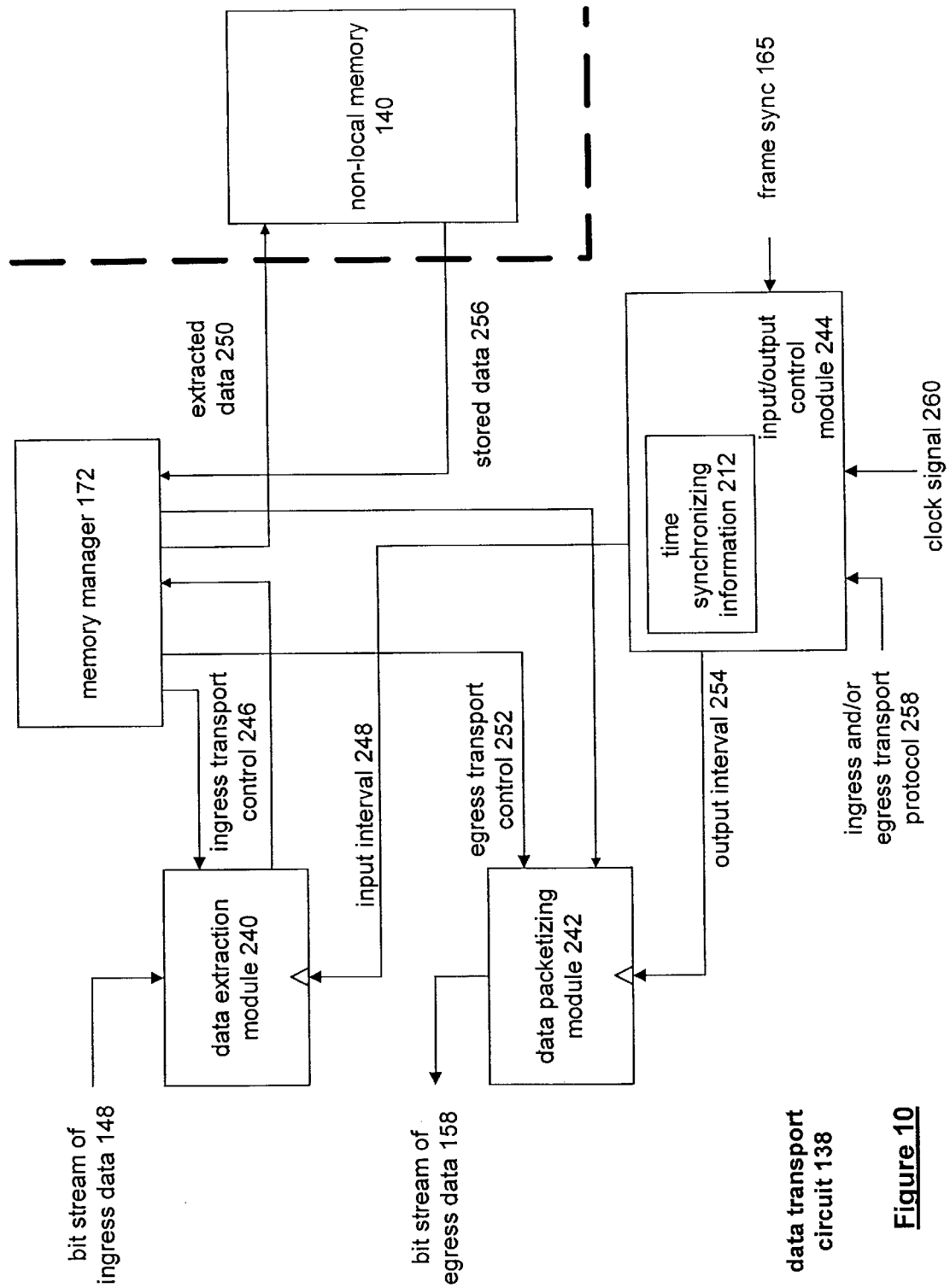
FIG. 10 illustrates a schematic block diagram of a data transport circuit in accordance with the present invention.

FIG. 10 illustrates a schematic block diagram of a data transport circuit 138 that includes a data extraction module 240, a memory manager 172, a data packetizing module and an input/output control module 244. The data transport circuit 138 is operably coupled to the non-local memory 140. Note that the data transport circuit 138 may be implemented as discrete circuits or as an integrated circuit. When implemented as an integrated circuit, the IC may be mounted on a printed circuit board that corresponds to a transport mapping circuit 82–86.

The data extraction module 240 is operably coupled to receive a bit stream of ingress data 148. Based on an input interval 248, the data extraction module 240 receives at least a bit from the bit stream of ingress data 148. In an embodiment of the data extraction module, it receives one bit of the bit stream of data per input interval. As one of average skill in the art will appreciate, the data extraction module may be configured to receive two or more bits of the bit stream of data per input interval. The data extraction module 240 stores each of the bits of the bit stream until it has acquired a data word. Once a data word has been acquired, a flag is set which is interpreted by the memory manager 172. Upon detecting the data ready flag, the memory manager 170 verifies that the non-local memory 140 has capacity to store the data word and provides, using an ingress transport control signal 246, the extracted data word 250 to the non-local memory 140.

The data packetizing module 242 is operably coupled to retrieve stored data 256 from the non-local memory 140. The data packetizing module 242 sets a flag when it has available memory space to receive the stored data 256. The memory manager 172 detects the memory available flag, verifies that the non-local memory has data to transport, and provides, using an egress transport control signal 252, the data packetizing module 240 with the stored data 256. The data packetizing module 242 then outputs at least a bit of the data word 256 per output interval 254 to create the bit stream of egress data 158. Note that the bit outputted by the data packetizing module 242 may correspond to data, packetizing data, and/or null data. Further note that the data packetizing module 242 may output multiple bits per output interval based on its configuration.

The input/output control module 244 receives ingress and/or egress transport protocol information 258, a clock signal 260, which may correspond to the system clock 210 as shown in FIG. 8, and the frame sync signal 165. Based on these inputs, the input/output control module 244 generates time synchronizing information 212. The time synchronizing information 212 corresponds the time bit occurrence of a bit with a bit position of the current frame. As such, based on the time synchronizing information 212 and the current duration from the beginning of a frame, the current bit may be identified with respect to its logical channel. Note that the time synchronizing information 212 is utilized to generate the input interval 248 and the output interval 254. In an embodiment of the data transport circuit 138, the output interval 254 and input interval 248 are synchronized. Further note that the output interval 254 and input interval 248 may be of different rates, if the bit streams 148 and 158 include a different number of channel segments (e.g., DS0s) and/or have a different data transport protocol.

Figure 11:
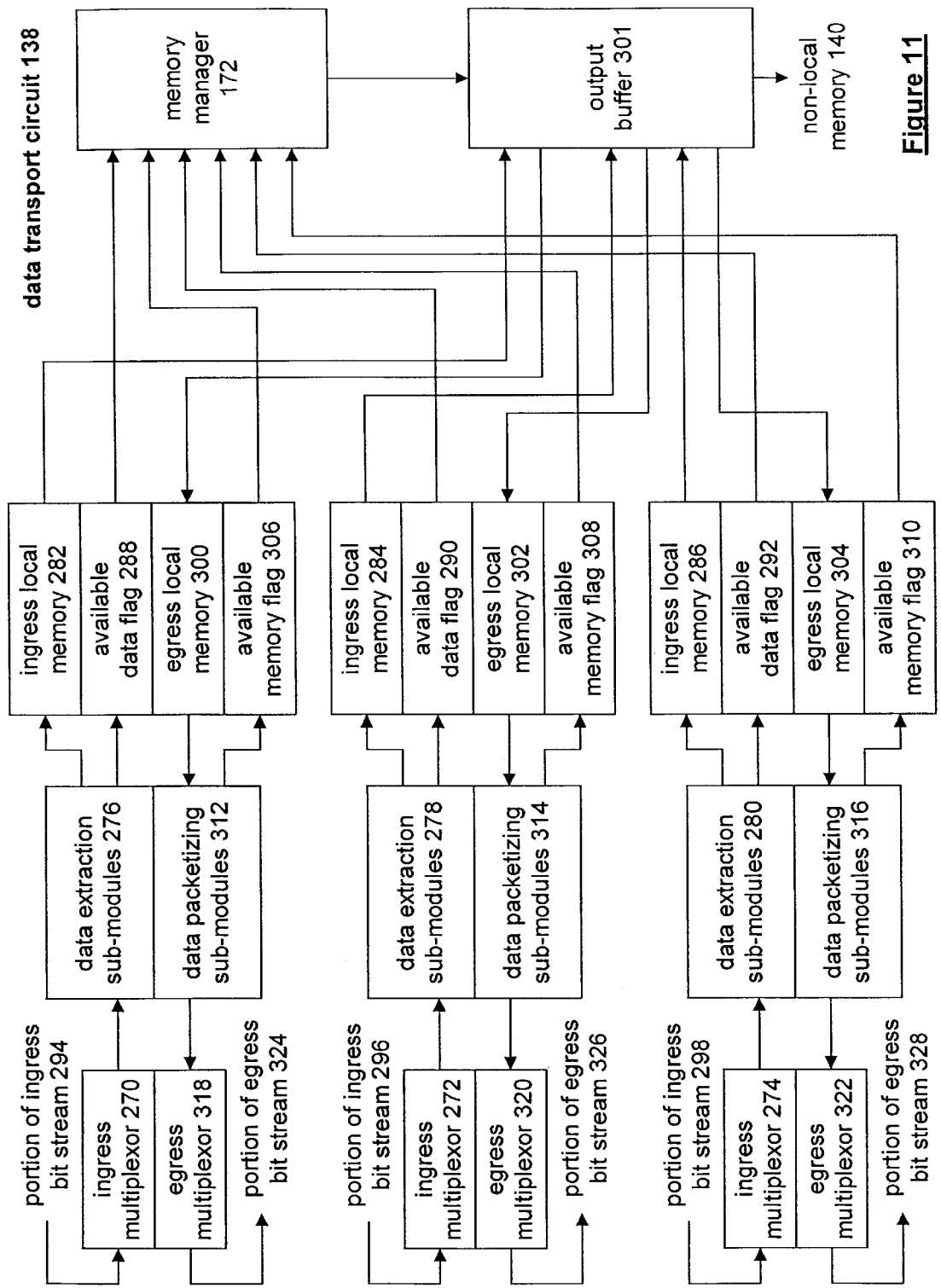
FIG. 11 illustrates a schematic block diagram of an alternate data transport circuit in accordance with the present invention.

FIG. 11 illustrates a more detailed schematic block diagram of the data transport circuit 138. As shown, the data transport circuit 138 includes a plurality of data transport cells, which are represented by the data extraction submodules 276, 278 and 280 and the data packetizing submodules 312, 314 and 316. The data transport circuit 138 further includes a plurality of local memory sections. Each local memory section is affiliated with a data transport circuit cell and includes an ingress local memory section 282, 284 and 286, an available data flag section 288, 290 and 292, an egress local memory section 300, 302 and 304, and an available memory flag section 306, 308 and 310. In addition, the data transport circuit 138 includes a plurality of ingress multiplexors 270, 272 and 274, a plurality of egress multiplexors 318, 320 and 322, and an output buffer 301.

The ingress multiplexors 270–274 are operable to route portions of the ingress bit stream 294, 296 and 298 to respective data extraction submodules 276–280. As mentioned previously, the ingress bit stream may include multiple segments, wherein each segment is interleaved. Refer to FIGS. 5 and 6. Similarly, the egress multiplexors 318–322 are utilized to receive signals from corresponding data packetizing submodules 312–316 and output portions of egress bit streams 324–328. Each of the data transport cells, which includes the data extraction submodule, the data packetizing submodule and the local memory, functions in a similar manner. As the data extraction submodule 276–280 receives, on a bit by bit basis, the bit stream 294–298, it interprets the data and time position of the bit to determine whether the data should be stored and, if it should be, where should it be stored. For example, if the incoming data is representative of valid data, the data extraction submodule will utilize its bit position to determine its affiliated logical channel, which is used to determine an address within the ingress local memory 282. If, however, the received bit corresponds to invalid data, frame delineation data, or data packetizing protocol information, the data extraction submodule will only temporarily store such data and overwrite it as soon as valid data is received. As the data extraction submodule is storing bits in the ingress local memory section, it is updating the available data flag 288. Once a data word, which may be one to 16 bytes in length, is stored in the ingress local memory section, the available data flag is set.

The memory manager 172 is operably coupled to poll each of the data transport circuit cells to determine whether a cell has available data for transporting to the non-local memory 140 or whether it has available memory space to receive a data word from non-local memory 140. The memory manager 172 polls the data transport circuit cells by reading the available data flag and the available memory flag. When an available data flag 288–292 is set, the memory manager causes a data word to be read from the corresponding ingress local memory section and transported to the non-local memory 140 via the output buffer 301. As one of average skill in the art will appreciate the output buffer 301 is included to compensate for latencies between the non-local memory and the local memory.

When an available memory flag is set, the memory manager causes a data word to be retrieved from the non-local memory and stored in the egress local memory section 300–304. The corresponding data packetizing submodule 312–316 retrieves, on a bit by bit basis, the egress data word from the egress local memory and outputs it to produce the corresponding portion of the egress bit stream 324–328. In addition, the data packetizing submodule 312–316 adds data packetizing protocol information to the data word as well as performing bit stuffing (which is done to avoid a false triggering of an end of packet, beginning of packet, etc.). Once the data packetizing submodule has retrieved a data word from the egress local memory, it sets the available flag memory indicating that it has available memory.

Figure 12:
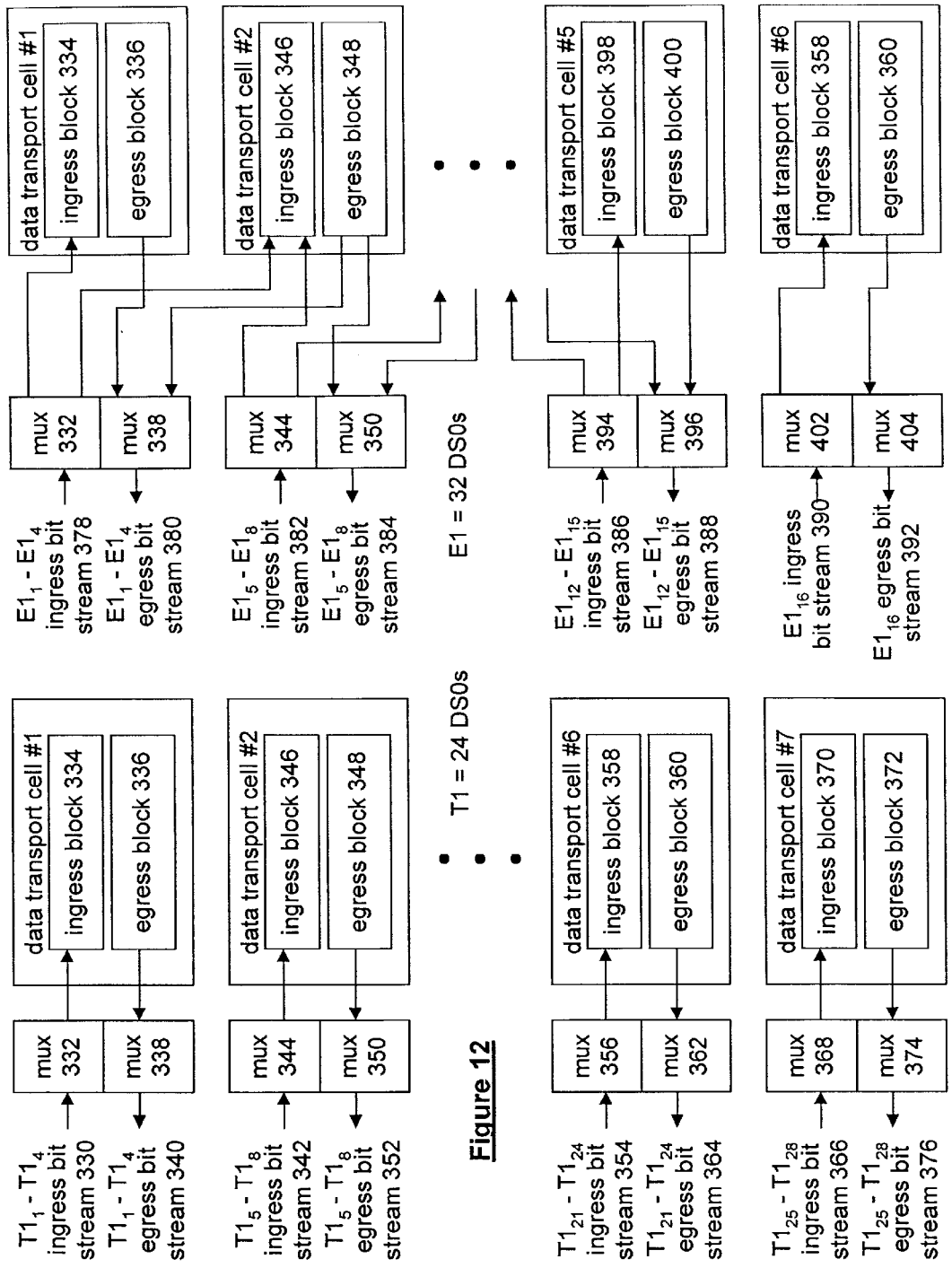
FIG. 12 illustrates a schematic block diagram of multiplexing the input and output bit streams to and from the data transport circuit in accordance with the present invention.

FIG. 12 illustrates the functionality of the ingress and egress multiplexors. As shown on the left portion of FIG. 12, the data transport cells 1–7 are operably coupled to transport data via T1 links. As indicated, a T1 link includes 24 DS0s. As such, the ingress block 334 of the first data transport cell is operably coupled, via multiplexor 332, to receive the ingress bit stream 330 corresponding to $T1_1$–$T1_4$. The egress block 336 is operably coupled to multiplexor 338 to output the egress bit stream 340 corresponding to $T1_1$–$T1_4$. Each of the remaining data transport cells 2–7 include an ingress block 346, 358, 370 and an egress block 348, 360 and 372. Each of these blocks is coupled to corresponding multiplexors 344, 350, 356, 362, 368 and 374. As coupled, each data transport cell processes the bit stream corresponding to four T1 links. As such, data transport cell 2 processes the bit streams 342 and 352 corresponding to $T1_5$–$T1_8$. The sixth data transport cell processes the bit streams 354 and 364 corresponding to $T1_{21}$–$T1_{24}$ while data transport cell number 7 processes the bit streams 366 and 376 that correspond to $T1_{25}$ and $T1_{28}$.

The right hand side of FIG. 12 illustrates the data transport cells 1 through 6 being operably coupled to support E1 links. Since each E1 includes 32 DS0s and since each of the data transport cells are capable of supporting 96 DS0s, the multiplexors are configured to provide each data transport cell with three E1 links. While the multiplexors are configured to output three E1 links to a given data transport cell, the bit stream of data includes four E1 links. As such, a data transport cell will receive data from one or more E1 interleaved bit streams. Multiplexors 332 and 338 provides 3 of the 4 E1 links of the $E1_1$–$E1_4$ bit streams 278, 380 to the first data transport cell. The fourth E1 link of the $E1_1$–$E1_4$ bit streams is provided to the second data transport cell.

Data transport cell number 2 is operably coupled via multiplexor 344 and 350 to receive 2 E1 links of bit streams 382 and 384. The multiplexors 344 and 350 provide the remaining portions of bit stream 382 and 384 to data transport cell number 3 (not shown). Multiplexors 394, 396, 402 and 404, similarly multiplex the E1 links correspond to bit streams 386, 388, 390 and 392 to the ingress blocks and egress blocks of data transport cells 4, 5, 6 and 7. Note that the seventh data transport cell is not used when the data transport circuit is coupled to an E3 link.

FIG. 13 illustrates a schematic block diagram of a data transport circuit 410 that includes a processing module 412 and memory 414. The processing module 412 may include a plurality of processing entities where each processing entity performs the functions associated with the circuits 416–428, or a single processing entity. Such a processing entity may be a microprocessor, microcontroller, digital signal processor, central processing unit, state machine, logical circuitry, and/or any device that processes digital information based on operating instructions. Note that if the processing module includes a state machine, plurality of state machines, and/or logic circuitry, the operating instructions are embedded into the circuitry. The memory 414 may be read-only memory, random access memory, floppy disk memory, hard drive memory, magnetic tape memory, or any other device that stores digital information. As previously mentioned, if the processing module 412 is implemented as a state machine, the memory may be embedded within the circuitry of the state machine.

The memory 414 stores operating instructions that, when executed by the processing module 412, causes the processing module to function as a plurality of circuits 416–428. When executing the operating instructions, the processing module 412 functions as circuit 416 to generate bit position synchronizing information. Having done this, the processing module functions as circuit 418 to generate an input interval and an output interval based on the bit position synchronizing information. Next, the processing module functions as circuit 420 to receive a bit stream of data at a rate of at least one bit per input interval. The processing module then functions as circuit 422 to extract data from the bit stream. Having done that, the processing module then functions as circuit 424 to transport the extracted data as ingress data words to the non-local memory.

The processing module also functions as circuit 426 to transport stored data as egress data words from the non-local memory to local memory of a data transport cell. The processing module then functions as circuit 428 to packetize the data and then output the packetized data in a serial manner at a rate of at least a bit per output interval. The operating instructions stored in memory 414 and the execution thereof by the processing module 412 will be discussed in greater detail with reference to FIG. 14. Further note that the operating instructions have been generally described with reference to FIGS. 10 through 12.

FIG. 14 illustrates a logic diagram of a method for transporting data. The process begins at step 430 where a bit stream of data is received at a rate of at least one bit per input interval. The bit stream corresponds to ingress packetized data that has been packetized based on one of a plurality of data packetizing protocols (e.g., HDLC encapsulated data protocols such as frame relay, PPP, SMDS, or ATM packetizing protocols). Note that the receiving of the bit stream of data may be multiplexed based on an ingress data transport protocol and/or an egress transport protocol such that portions of the bit stream are received in parallel. Refer to FIGS. 11 and 12 for a discussion on multiplexing of portions of the incoming, or ingress, bit stream.

The process then proceeds to step 432 where data is extracted from the bit stream. In general, the extraction process strips off overhead data such that all that remains is the data. Such overhead data includes frame delineation data and/or data packetizing protocol information. The process then proceeds to step 434 where the extracted data is transported to non-local memory as an ingress data word. The transporting of the data is at least, in part, based on the content of the ingress data words. Such data words include a data portion and a tag portion wherein the tag portion indicates whether the data word is complete. In other words, the tag provides an ingress indication when an ingress data word is available for transporting.

The process then proceeds to step 435 where data stored in non-local memory is transported, as egress data words, to local memory of a data transport cell, based on at least in part, on the content of the data. Note that the data transport cell may provide an egress indication when local egress memory is available for receiving an egress data word. The process then proceeds to step 436 where packetized data is generated from the egress data words and is outputted in a serial manner at a rate of at least one bit per output interval. The outputting of the egress packetized data may be done in a multiplexed manner based on an egress data transport protocol (e.g., E3, DS3), such that the portions of the egress packetized data are received in parallel. Refer to FIGS. 11 and 12 for a description of multiplexing of the egress bit stream.

The process then proceeds to step 438 where bit position synchronizing information is generated based on at least one of a clock signal, the ingress data transport protocol and the egress data transport protocol. Refer to FIGS. 8 and 10 for a discussion on the bit position synchronizing information. The process then proceeds to step 440 where the input interval and output interval are generated based on the bit position synchronizing information. Note that the input interval and output interval may be synchronized.

Figure 15:
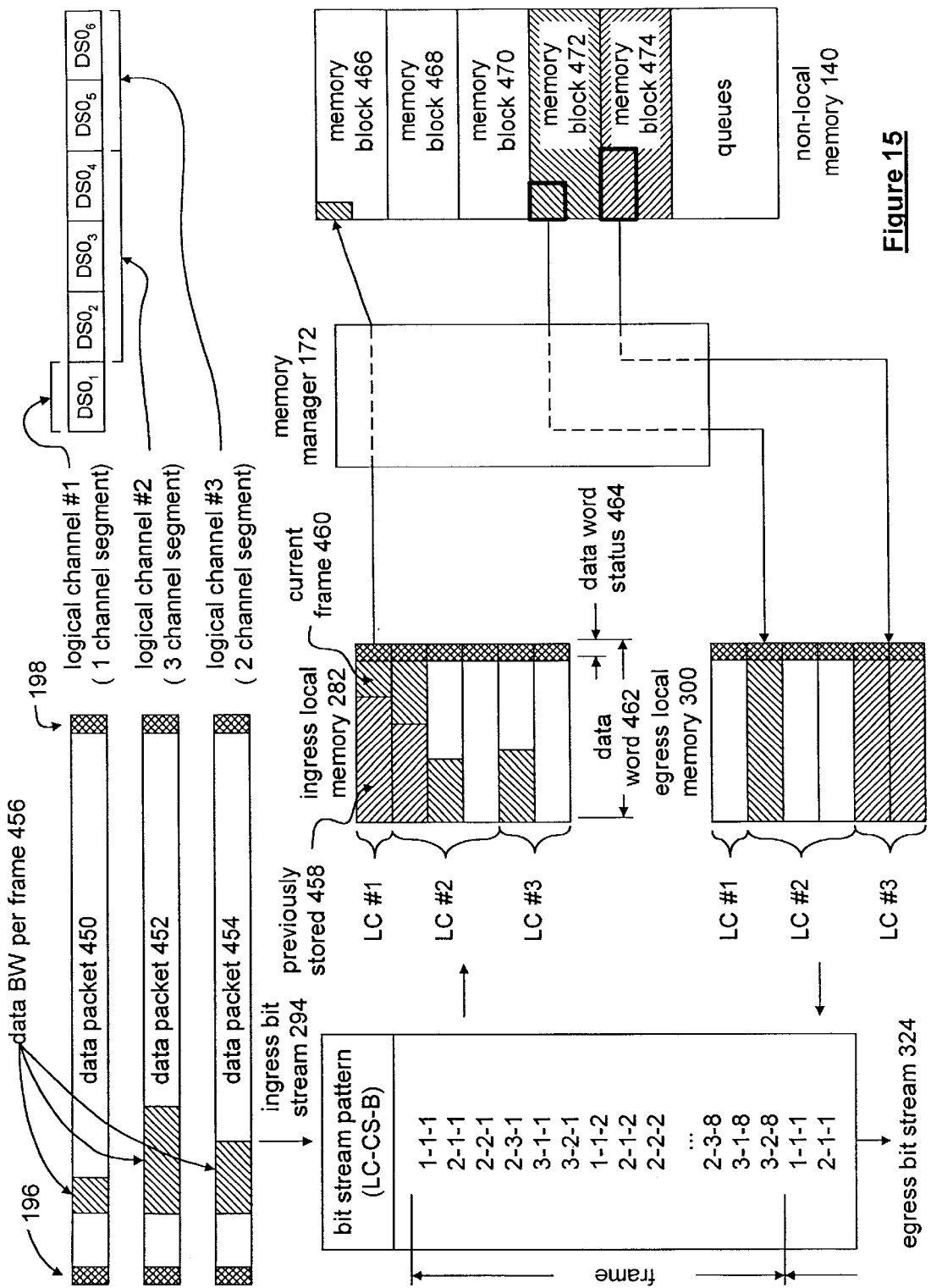
FIG. 15 illustrates a graphical representation of data transportation in accordance with the present invention.

FIG. 15 illustrates transportation of data between local memory and non-local memory as controlled by the memory manager 172. In general, the memory manager 172 coordinates the transfer of data between ingress local memory 282 and the non-local memory 140. In addition, the memory manager 172 controls the transport of data from the non-local memory 140 to the egress local memory 300. As an example of the operation of the memory manager 172, an ingress bit stream 294 is generated based on three logical channels, which are currently transmitting three data packets 450, 452, and 454. As shown, logical channel 1 includes 1 channel segment, logical channel 2 includes three channel segments and logical channel three includes two channel segments. Based on the channel segments associated with the logical channels, the data bandwidth 456 per frame can be determined. As shown, logical channel 2 transmits three times the amount of data that the logical channel 1 transmits per frame. While logical channel 3 transmits twice the data of logical channel 1 per frame. The ingress bit stream may be transporting any portion of the data packets including the data packetizing overhead, or information, 196 and 198. Regardless of the data being transported, the ingress bit stream 294 has a bit stream pattern as shown. The corresponding bit stream is represented by the local logical channel, the channel segment number, and the particular bit position of the channel segment. As such, the bit pattern begins with the first bit of the first channel segment of the first logical channel and continues as shown.

The ingress local memory 282 includes a plurality of memory sections that are allocated to the logical channels. The number of memory sections that are allocated to a logical channel is dependent on the number of channel segments affiliated with the logical channel. As shown, logical channel 1, which has 1 channel segment, has one data section of the ingress local memory 282 assigned to it. Logical channel 2 has three data sections assigned to it, one for each of the channel segments. Logical channel 3 has two data sections assigned to it. Each of the data sections includes a data word portion 462 and a data word status, or tag, portion 464. The data sections associated with logical channel 2 are linked together such that the three data sections function as a single data storage location for logical channel 2. Similarly, the two data sections associated with logic channel 3 are linked together such that they function as a single data element.

As a current frame of data is being received, which is represented by the hashed blocks in the data packets 450–454, the data is written into the corresponding sections of the ingress local memory 282. As shown for the data section associated with logical channel 1, the data section had a substantial amount of data that has been previously stored 458. As such, the current frame of data 460 fills the data word 462 associated with logical channel 1. As such, the data word status 464 will be set indicating that a full data word is available for transporting to the non-local memory. The data word status 464 would also indicate that all of the data contained within the data word is representative of valid data. This is determined by where in the data packet 460 the received data is from. In this example, the data is from a valid data portion of the data packet 460. Note that data 458 and data 460 correspond to the same data packet, where data 458 is transmitted in a previous DS3 frame with respect to data 460.

The three data sections associated with logical channel 2 include a portion of previously stored data, which is represented by the box having left hash marks. The data sections also include data that has been stored for the current frame 460, which is represented by the box having right oriented hash marks. As shown, the currently received data wraps around to the next data section associated with logical channel 2, based on the linking between the data sections. Even though the three data sections are grouped into a single data entry, each of the data sections may be treated individually, thus each respective data word status section would indicate whether the corresponding data section is full. For example, the first of the three data sections may be set to indicate that it has a complete data word, which may be subsequently transmitted to the non-local memory. Alternatively, the three data sections may be treated as a single data entry, which until all three sections were full, the data word status would indicate that the data word is not complete.

The two data segments associated with the third logical channel contain only a portion of a data word, that being the currently received data. As such, the associated data word status 464 indicates that data is not currently available for transportation to the non-local memory.

The non-local memory 140 includes a plurality of memory blocks 466–474. Memory blocks 466–470 are not full of data, while memory blocks 472 and 474 are full of data, as indicated by the hash marks. As such, memory blocks 466–470 are in the receiving mode while memory blocks 472 and 477 are in a sourcing mode. When a data section of the ingress local memory 282 has data for transportation, the memory manager 172 determines whether a memory block has already been assigned for this particular logical channel. If not, the memory manager assigns a memory block, assuming one is available, to the logical channel. Once a memory block is affiliated with a logical channel, the memory manager causes the data word to be transported from the local memory to the assigned memory block of the non-local memory 140.

The memory manager 172 also coordinates the retrieval of data from the non-local memory 140. Data will typically not be retrieved from the non-local memory until a complete data packet has been stored therein. A data packet may be stored in a single memory block or a plurality of memory blocks that have been linked together. Once data is available for transporting to the egress local memory, the memory manager 172 determines whether the egress local memory has available memory space. Such a determination is made by interpreting the data word status 464 associated with each data word of a data section. When the flag is set, the memory manager 172 causes a data word to be transported from the non-local memory to the egress local memory. This is represented by the rectangle encircling a portion of the memory block 472, which corresponds to a data word being transported to a first data section associated with logical channel 2. Similarly, a pair of data words is transported from memory block 474 to two data sections associated with logical channel 3. When the egress local memory 300 includes a data word for any logical channel, the data word is outputted in a bit by bit serial fashion, by the data packetizing module, to produce the egress bit stream 324. The pattern follows the same bit stream pattern as shown.

Figure 16:
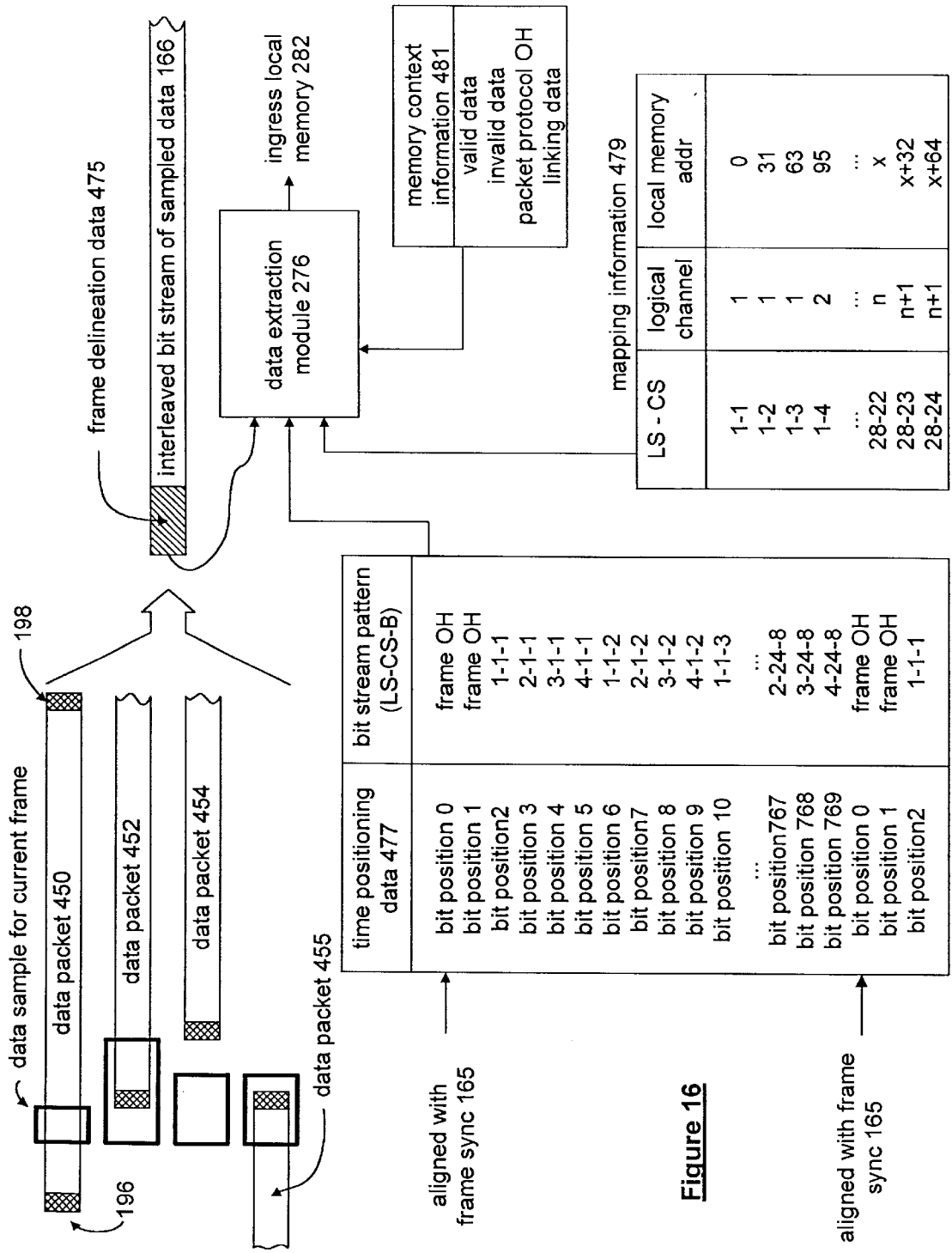
FIG. 16 illustrates a graphical representation of data bit position synchronization in accordance with the present invention.

FIG. 16 illustrates a graphical representation of processing ingress data through the data extraction module 276. In other words, FIG. 16 represents the generation of ingress data words from the ingress bit stream 294 of FIG. 15. As shown, four data packets 450, 452, 454 and 455 are combined into an interleaved bit stream of sample data 166. The interleaved bit stream includes frame delineation data 475, which indicates the beginning and/or end of a frame. The data extraction module 276 strips this data off such that the data stored in the ingress local memory 282 is representative of the data only.

As shown in the upper-left portion of FIG. 16, the four data packets are being sampled, for a current frame, at different portions of the respective data packets. As shown, data packet 450 is being sampled during a fully valid portion of the data packet. As such, each bit of data retrieved during this frame for data packet 450 will be valid and stored in the ingress local memory 282. Data packet 452 is being sampled at the beginning of the data packet. As such, a portion of the data sampled will be invalid, a portion will represent the data packetizing overhead 196 and the remaining portion will be representative of the valid data. Only the valid data portion will be written to the ingress local memory 282 for transportation to the non-local memory.

Data packet 454 is being sampled at a completely invalid portion of the data packet. As such, no valid data will be supplied to the ingress local memory for data packet 454 for this frame. Data packet 455 is being sampled at the end of the data packet. As such, the data extraction module will obtain valid data, data packetizing overhead 198, and invalid data. Only the valid data portion will be provided to the ingress local memory and subsequently provided to the non-local memory.

The data extraction module 276 utilizes time positioning data 474, bit stream pattern information (LC-CS-B), mapping information 479 and current storage status 481 to determine how to process the bit it is currently receiving. In addition, the data extraction module utilizes the content of the data to determine whether the current bit relates to valid data, invalid data, and/or packetizing protocol overhead.

The time positioning data 477 includes a plurality of bit positions that correspond to the time occurrence of a particular bit in the bit stream pattern. As shown, frame overhead (OH) is included in the first two bit positions of a new frame. As such, the frame overhead, or frame delineation data 475 is aligned with the frame sync signal 165. The data extraction module 276 knowing that the first two bit positions of the bit stream correspond to frame delineation data 475, strips the overhead off such that only data portions remain. In other words, the data extraction module ignores the frame overhead information and does not provide it to the local memory 282.

At the third bit position, the data extraction module 276 knows that it corresponds to the first bit of the first DS0 of the first DS1 of the interleaved bit stream. Knowing the lower-speed link and channel segment associated with bit position 2, the data extraction module 276 accesses the mapping information 479 to determine that this bit position is associated with logical channel 1, which is currently allocated a data section of the local memory that begins at address 0. Having obtained the local memory address for the data section associated with this particular bit, the data extraction module accesses the current storage status 81, which is reflective of the data word status 464. Note that the order of this information may vary. The current storage status may indicate that the incoming data is valid, invalid, packetizing protocol overhead or linking data. To make such a determination, the data extraction module accesses several previously stored bits and, in conjunction with the current bit, compares the bits with data packetizing overhead data. For example, data packet delineation is represented by 01111110 (i.e., six consecutive ones encircled by two zeros) for frame relay data packetizing protocol. The data extraction module 276 compares the six stored bits with the data packet delineation flag. If it matches, the data extraction module determines that the received bit corresponds with packet delineation data. If it does not match, the incoming bit is either valid data or invalid data depending on the current status of the channel (e.g., valid data, invalid data, data packet start, data packet end). Further, the data extraction module 276 can determine whether the packetizing protocol overhead indicates the beginning of a data packet or the end of a data packet. Such a determination is readily made based on whether the previous state was valid data or invalid data. If the previous state was invalid data, the packetizing protocol overhead represents the beginning of a data packet. Conversely, if the previous data was valid, the packetizing protocol represents the end of a data packet.

Based on the inputs from the time positioning data 477, the mapping information 479 and the current storage status 481, the data extraction module 276 can determine whether a current bit is to be provided to the ingress local memory for storage. The data extraction module 276 processes a data word in accordance to these inputs. When a new frame begins, it is aligned with the frame sync signal 165 such that the data extraction module 276 knows that the first two bit positions correspond to frame overhead data. As one of average skill in the art would appreciate the first two bit positions being allocated to frame overhead is representative of an example only. As such the frame overhead may be representative of more bit positions or less bit positions as dictated by the particular data transport protocol being used (e.g., E3, or DS3 links).

Figure 17:
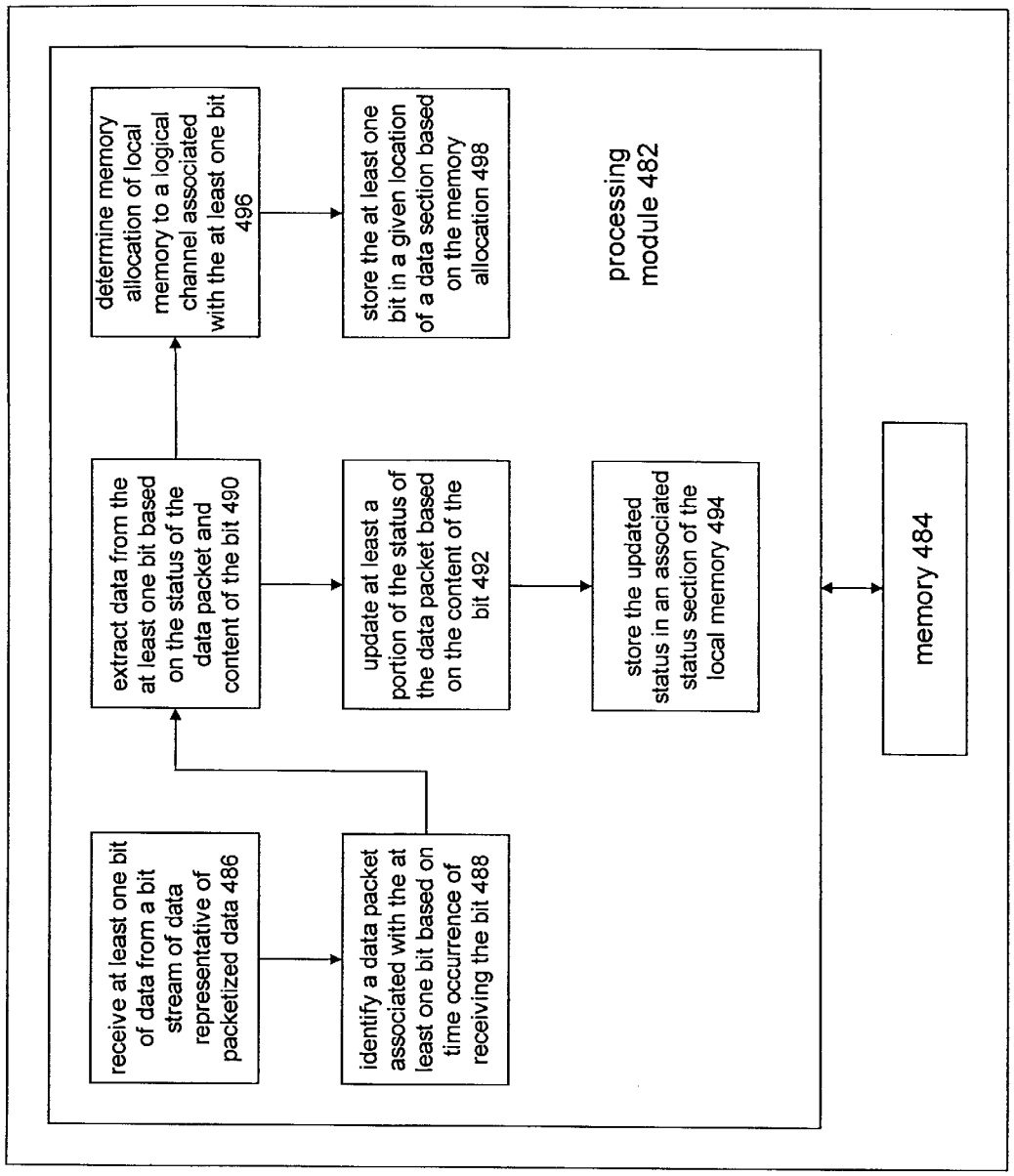
FIG. 17 illustrates a schematic block diagram of a data extraction module in accordance with the present invention.

FIG. 17 illustrates a schematic block diagram of a data extraction module 480. The data extraction module 480 includes a processing module 482 and memory 484. The processing module 482 may include a single processing entity or a plurality of processing entity. Such a processing entity may be a microprocessor, microcontroller, microcomputer, central processing unit, state machine, logical circuitry and/or any device that manipulates data based on operating instructions. The memory 484 may be read-only memory, random access memory, DVD memory, CD ROM memory, floppy disk memory, hard drive memory and/or any device that stores digital information. Note that if the processing module 482 includes a state machine(s) and/or logic circuitry, the memory is embedded into the state machine and/or logic circuitry such that the operating instructions stored therein are inherent within the state machine and/or logic circuitry.

The memory 484 stores operating instructions that cause the processing module 482 to function as a plurality of circuits 486–498. While performing the operating instructions, the processing module functions as circuit 486 to receive at least one bit of data from a bit stream of data that is representative of packetized data. The processing module then functions as circuit 482 to identify a data packet associated with the at least one bit based on time occurrence of receiving the bit. The processing module then functions as circuit 490 to extract data from the at least one bit based on the status of the data packet and the content of the bit.

The processing module then functions as circuit 492 to update at least a portion of the status of the data packet based on the content of the bit. The processing module then functions as circuit 494 to store the updated status in an associated status section of the local memory. In addition, the processing module functions as circuit 496 to determine memory allocation of the local memory to a logical channel associated with the at least one bit. The processing module then functions as circuit 498 to store the at least one bit in a given location of a data section based on the memory allocation. The operating instructions stored in memory 484 and performed by the processing module 482 may be further described with reference to FIGS. 18 and 19. In addition, data extraction module 480 function similarly to the data extraction process described with reference to FIGS. 15 and 16.

Figure 18:
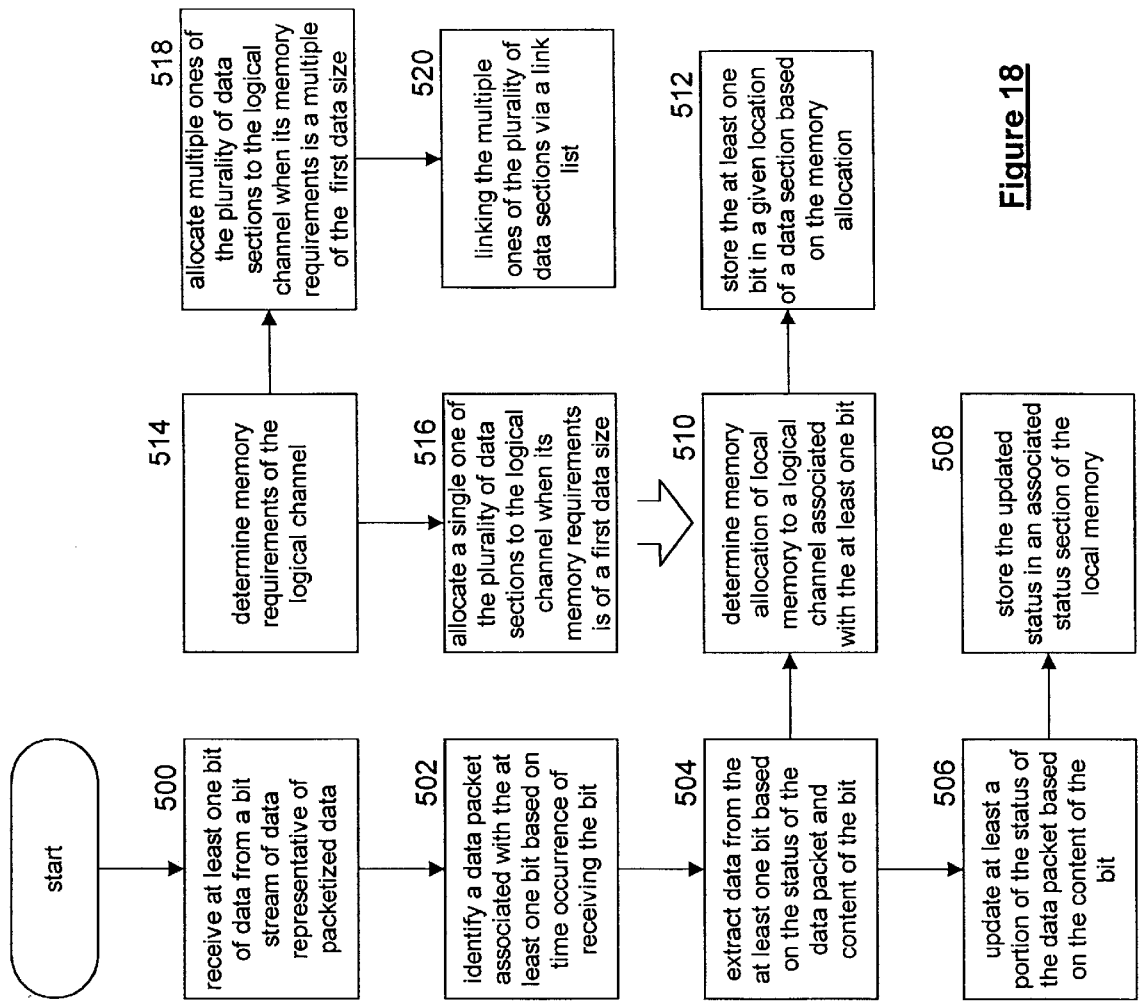
FIG. 18 illustrates a logic diagram of a method for data extraction in accordance with the present invention.

FIG. 18 illustrates a logic diagram of a method for extracting data. The process begins at step 500 where at least one bit of data is received from a bit stream of data that is representative of packetized data. The packetized data is formatted based on a data packetizing protocol (e.g., HDLC encapsulated data protocol and/or ATM packetizing protocol). Note that the stream of data may include a plurality of bit streams of data that have been interleaved. Where each of the bit streams includes at least data associated with at least one lower-speed link, such as a T1 link, E1 link, or a portion thereof.

The process then proceeds to step 502 where a data packet that is associated with the at least one bit is identified based on the time occurrence of receiving the bit. Note that the data packet includes flags that delineated a data packet and/or data that has been packetized based on a high-level data link controller protocol and is conveyed via a logical channel. Further note that the identifying of a data packet associated with the at least one bit was described with reference to FIG. 16 utilizing the time positioning data 477. The process then proceeds to step 504 where data is extracted from the at least one bit based on the status of the data packet and content of the bit. The status of the data packet comprises at least one of current status of the data packet (e.g., valid data, invalid data, beginning of a data packet, end of data packet), history status of the data packet, mapping information of a logical channel to local memory, local memory context information that contains address information, current stored word length and linked list information. The process then proceeds to steps 506 and 510.

At step 506, at least a portion of the status of the data packet is updated based on the content of the bit. For example, if the bit is representative of valid data, invalid data, data packetizing overhead, the status of the data packet is updated to reflect the data content. The process then proceeds to step 508 where the updated status is stored in an associated status section of the local memory. The status section corresponds to the data word section 464 as illustrated in FIG. 15.

At step 510, memory allocation of local memory to a logical channel associated with the at least one bit is determined, which will be discussed in greater detail with reference to steps 514 through 520. Note that the allocation of memory to the logical channel may be done at logical channel set-up, prior to receiving data. The process then proceeds to 512 where the at least one bit is stored in a given location of a data section based on the memory allocation.

The determination of memory allocation begins at step 514 where memory requirements of a logical channel are determined. The process then proceeds to steps 516 and 518. At step 516, a single one of a plurality of data sections is allocated to the logical channel when its memory requirements is that of a first data size. Refer to FIG. 15 where logic channel 1 included one-channel segment, thus was allocated one data section in ingress local memory 282.

The process then proceeds to step 518 where multiple ones of the plurality of data sections are allocated to a logical channel when the logical channel's memory requirements is a multiple of the first data size. The process then proceeds to step 520 where the multiple ones of the plurality of data sections are linked via a linked list. Refer to FIG. 15, where logical channel 2 has a memory requirement that is a multiple of the first data size. In particular, logical channel 2 had three channel segments affiliated therewith and was allocated three sections in the local memory, while logical channel 3, which includes two channel segments, was allocated two data segments. In general, the first data size corresponds to a data word within the local memory section, which may be one to sixteen bytes in length and may include one or more data words.

Figure 19:
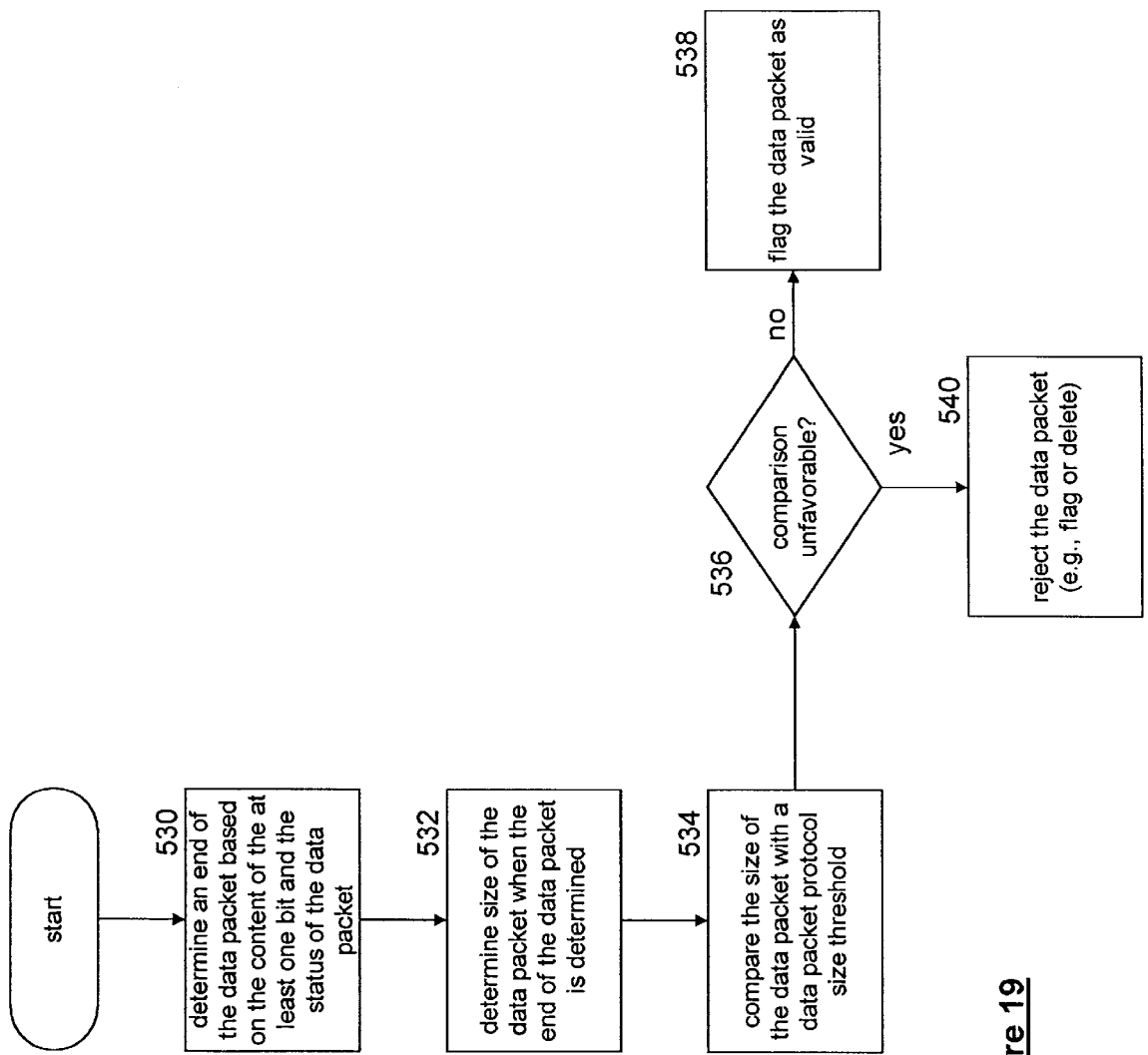
FIG. 19 illustrates a logic diagram of a method for further data extraction in accordance with the present invention.

FIG. 19 illustrates a method for determining a short data packet. The process begins at step 530 where an end of data packet is determined based on the content of the at least one bit and the status of the data packet. Refer to the discussion of FIG. 16 as to how the end of a data packet is identified based on the data status and the content of the bit. The process then proceeds to step 532 where the size of the data packet is determined when the end of the data packet is identified.

The process then proceeds to step 534 where the size of the data packet is compared with a data packet protocol size threshold, which is specified as a number of bytes. For example, the minimum byte size may be four bytes in length. The process then proceeds to step 536 where a determination is made as to whether the comparison was unfavorable. If the comparison was unfavorable, i.e., the size of the data packet was less than the data packet protocol size threshold, the process proceeds to step 540. At step 540, the data packet is rejected. The data packet may be rejected by flagging the data as being invalid but it is provided to the non-local memory. Alternatively, the data may be rejected by deleting the data packet from local memory and not providing it to the non-local memory. If, however, the comparison was favorable, the process proceeds to step 538 where the data packet is flagged as valid.

Figure 20:
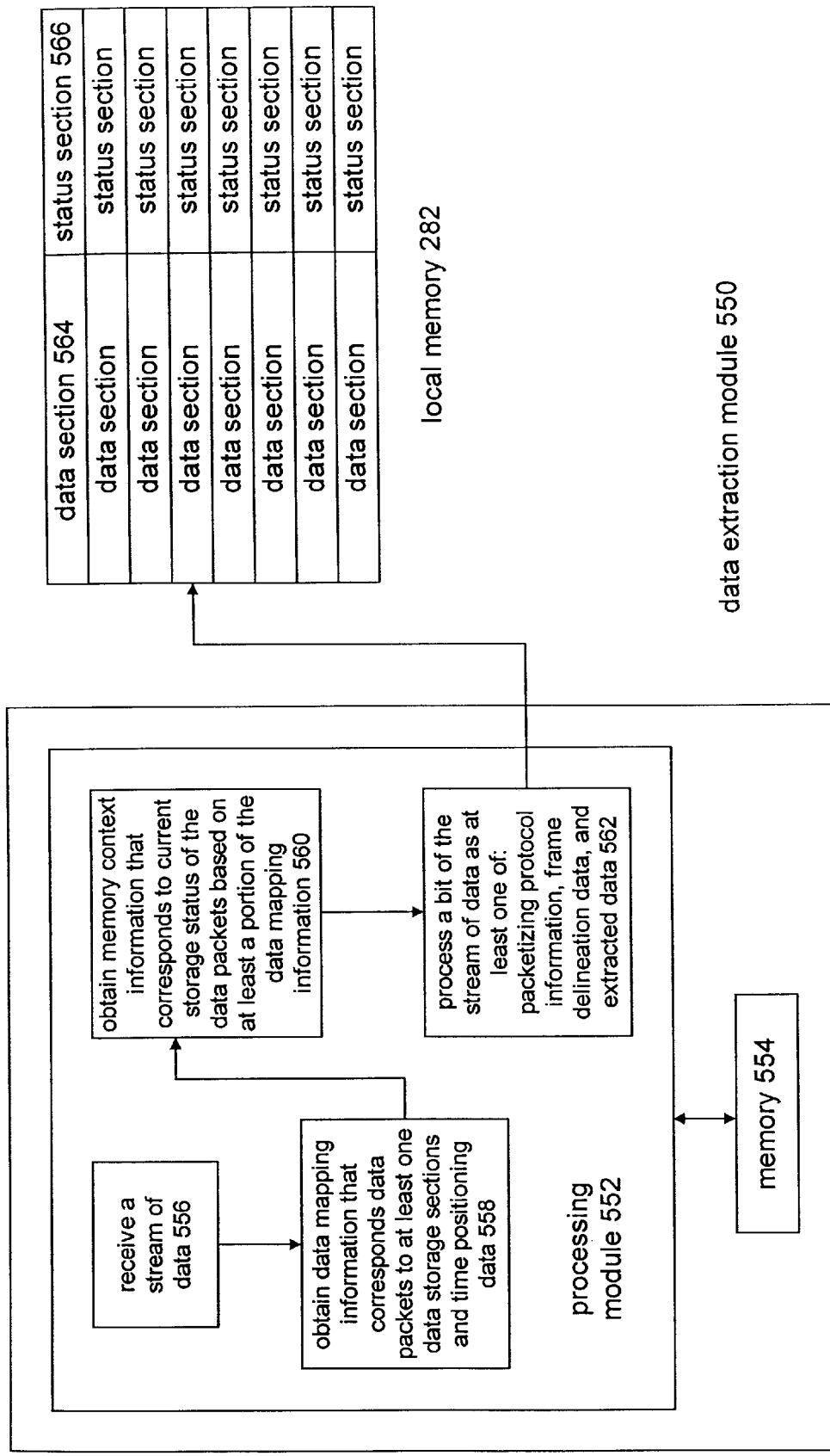
FIG. 20 illustrates a schematic block diagram of an alternate data extraction module in accordance with the present invention.

FIG. 20 illustrates a schematic block diagram of a data extraction module 550 that is operably coupled to local memory 282. The data extraction module 550 includes a processing module 552 and memory 554. The processing module 552 may include a single processing entity, or a plurality of processing entities. Such a processing entity may be a microprocessor, microcontroller, digital signal processor, central processing unit, state machine, logical circuitry and/or any device that manipulates data based on operational instructions. The memory 554 may be a read-only memory, random access memory, CD ROM memory, DVD memory, floppy disk memory, hard disk memory, magnetic tape memory, and/or any other device that stores digital information. Note that if the processing module includes a state machine and/or logic circuitry, the memory may be imbedded within the state machine and/or logic circuitry such that the implementation of the state machine includes the operational instructions.

The memory 554 stores operating instructions that causes the processing unit 552 to function as a plurality of circuits 556–562. While performing the operating instructions, the processing unit 552 functions as circuit 556 to receive a stream of data. The processing unit then functions as circuit 558 to obtain data mapping information that corresponds data packets to at least one data storage section and time positioning data.

The processing module then functions as circuit 560 to obtain memory context information that corresponds to current storage status of the data packet. The memory context information is obtained based on at least a portion of the data mapping information.

The processing module then functions as circuit 562 to process a bit of the stream of data as at least one of packetizing protocol information, frame delineation data or extracted data The processed data is then provided to the local memory 282, which includes a plurality of data sections 564 and a plurality of associated status sections 566.

The data section may correlate to the data word section 462 of FIG. 15 while the status section 566 may correspond to the data word section 464 of FIG. 15. The operating instructions stored in memory 554 and executed by processing module 552 will be further described with reference to FIGS. 21 and 22. Further note that the data extraction module 550 in general performs the functions as described with reference to FIGS. 15 and 16.

Figure 21:
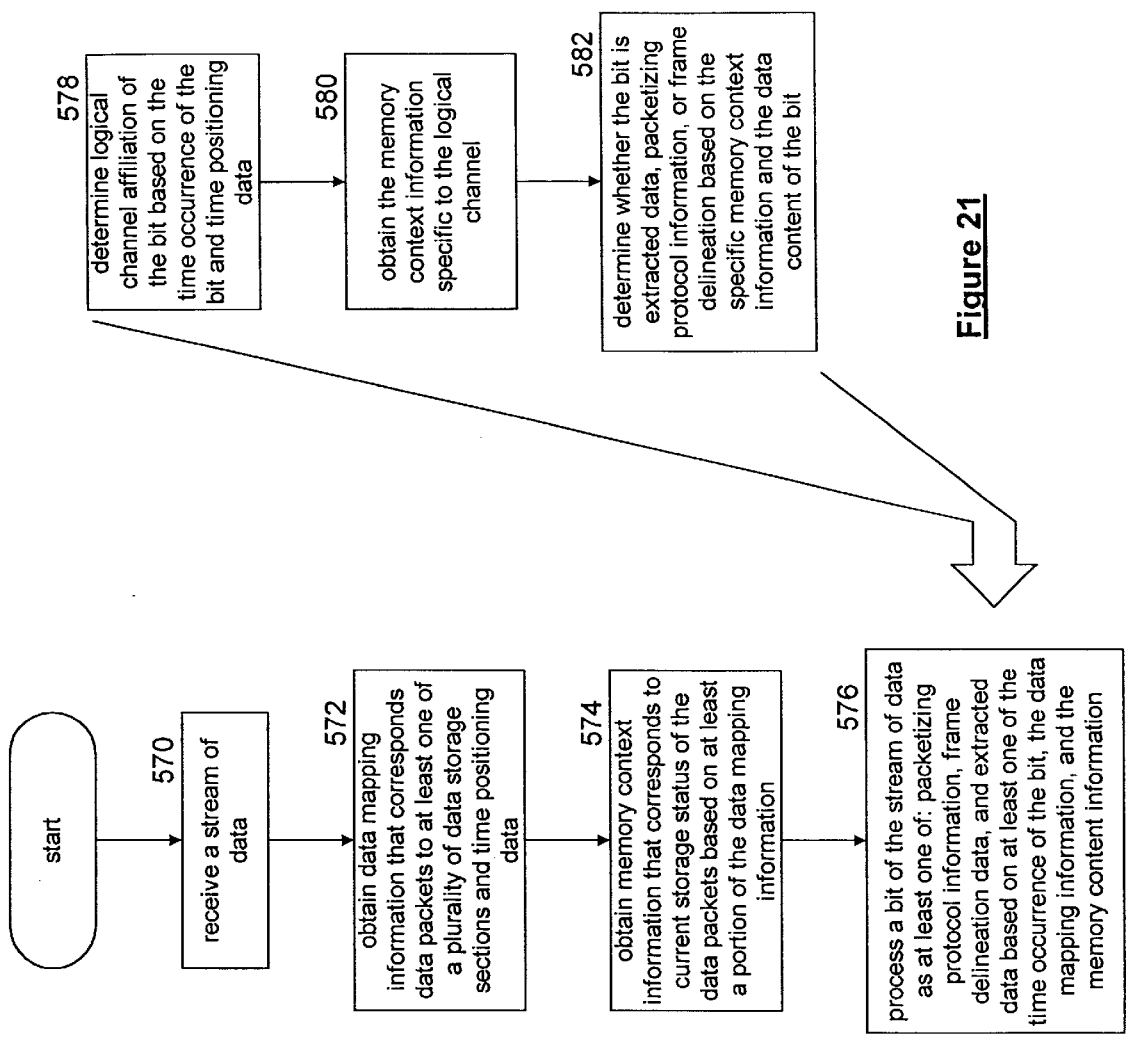
FIG. 21 illustrates a logic diagram for an alternate method of data extraction in accordance with the present invention.

FIG. 21 illustrates a logic diagram of a method for extracting data. The process begins at step 570 where a stream of data is received. The process then proceeds to step 572 where data mapping information is obtained. The data mapping information corresponds data packets to at least one of a plurality of data storage sections of local memory and time positioning data. Refer to FIG. 16 for a graphical representation of the correlation of the time positioning data and the mapping information.

The process then proceeds to step 574 where memory context information is obtained. The memory context information corresponds to current storage status of the data packets. The context information is obtained based on at least a portion of the data mapping information. Again refer to FIG. 16 for a graphical representation of the current storage status and the accessing thereof based on the mapping information 479. Also note that the current storage status of the data packets include channel segment rate (e.g., 64 kilobits per second or 56 kilobits per second), bit inversion, addressing mode, valid data, link memory segments, and/or data storage section fill status (e.g., how many bits of the word have been stored in memory).

The process then proceeds to step 576 where a bit of the stream of data is processed as at least one of packetizing protocol information, frame delineation data, and extracted data Such processing is based on at least one of the time occurrence of the bit, the data mapping information and the memory content information. The frame delineation data may be determined based on the time occurrence of the bit and the time positioning data. Refer to FIG. 16 wherein the first two bit positions of a new frame correspond to frame delineation data 475. As such, the data extraction process can readily identify frame delineation data by its bit position of the time positioning data 477.

At step 576, the processing of the bit may also be done by determining an end of a data packet based on the data content of the bit, the data mapping information and the memory context information. Next, the size of the data packet may be determined based on the memory context information when the end of the data packet is determined. Having obtained the size, it is compared with a data packet protocol size threshold. The data packet is rejected when the size of the data packet compares unfavorably to the data packet protocol size threshold.

The processing step 576 may be further described with reference to processing steps 578–582. At step 578, a logical channel affiliation of the bit is determined based on the time occurrence of the bit and time positioning data. The process then proceeds to step 580 where the memory context information is obtained specifically for the logical channel. The process then proceeds to step 582 where a determination is made as to whether the bit is extracted data, packetizing protocol information or frame delineation data based on the specific memory content information and the data content of the bit. Again refer to the discussion of FIG. 16 for a graphical representation of the determination process.

Figure 22:
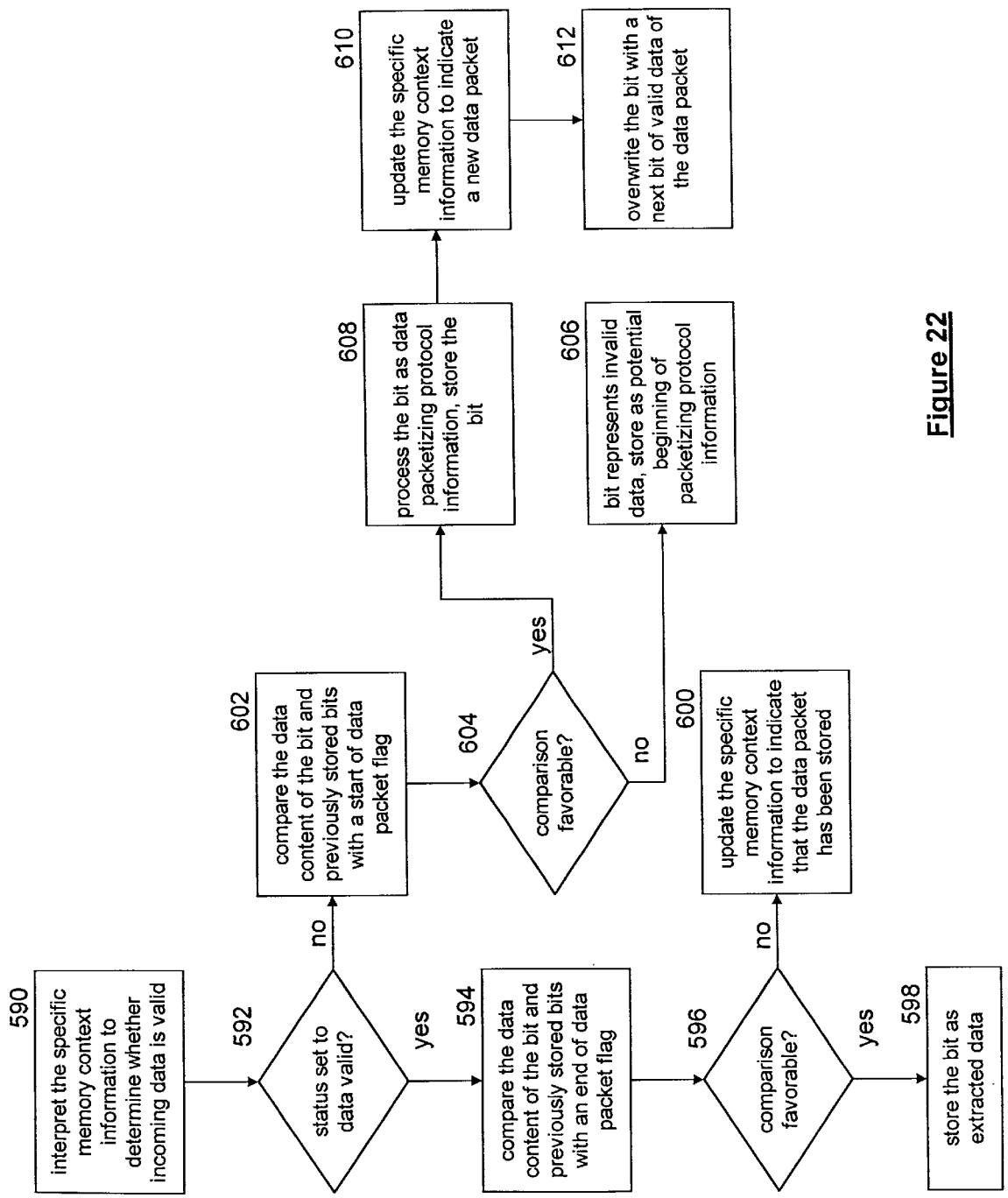
FIG. 22 illustrates a logic diagram in furtherance of the method of FIG. 21.

FIG. 22 is a logical diagram in furtherance of the method of FIG. 21. At step 590 the specific memory context information is interpreted to determine whether the incoming data is valid. In particular, the tag, or data word status, is interpreted to determine whether the data is valid. The process then proceeds to step 592 where a determination is made as to whether the status is set to valid data. If yes, the process proceeds to step 594 where the data content of the bit and previously stored bits, are compared with an end of data packet flag. The process then proceeds to step 596 where a determination is made as to whether the comparison was favorable. If not, the process proceeds to step 600 where the specific memory context data is updated to indicate the data packet has been stored. As such, an unfavorable comparison indicates that an end of data packet flag was identified. As previously mentioned, the end of data packet equates to data packetizing protocol information. If, however, the comparison was favorable indicating that the end of data packet has not been reached, the process proceeds to step 598 where the bit is stored as extracted data.

If the determination at step 592 was that the status is not set to valid data, the process proceeds to step 602. At step 602 the data content of the bit and previously stored bits are compared with a start of data packet flag. Recall that six consecutive ones in a row may indicate a start of a data packet. The process then proceeds to step 604 where a determination is made as to whether the comparison was favorable. A favorable comparison indicates that the bit content corresponds to a start of data flag. If the comparison was unfavorable, the process proceeds to step 606 where the bit is identified as containing invalid data but is stored as a potential beginning of the packetized protocol information (i.e., the start of data packet flag).

If, however, the comparison was favorable, the process proceeds to step 608 where the bit is processed as packetizing protocol information and stored. The process then proceeds to step 610 where the specific memory content information is updated to indicate that a new data packet is being received. The process then proceeds to step 612 where the data packetizing protocol bit is overwritten with a next bit of valid data of the new data packet.

Figure 23:
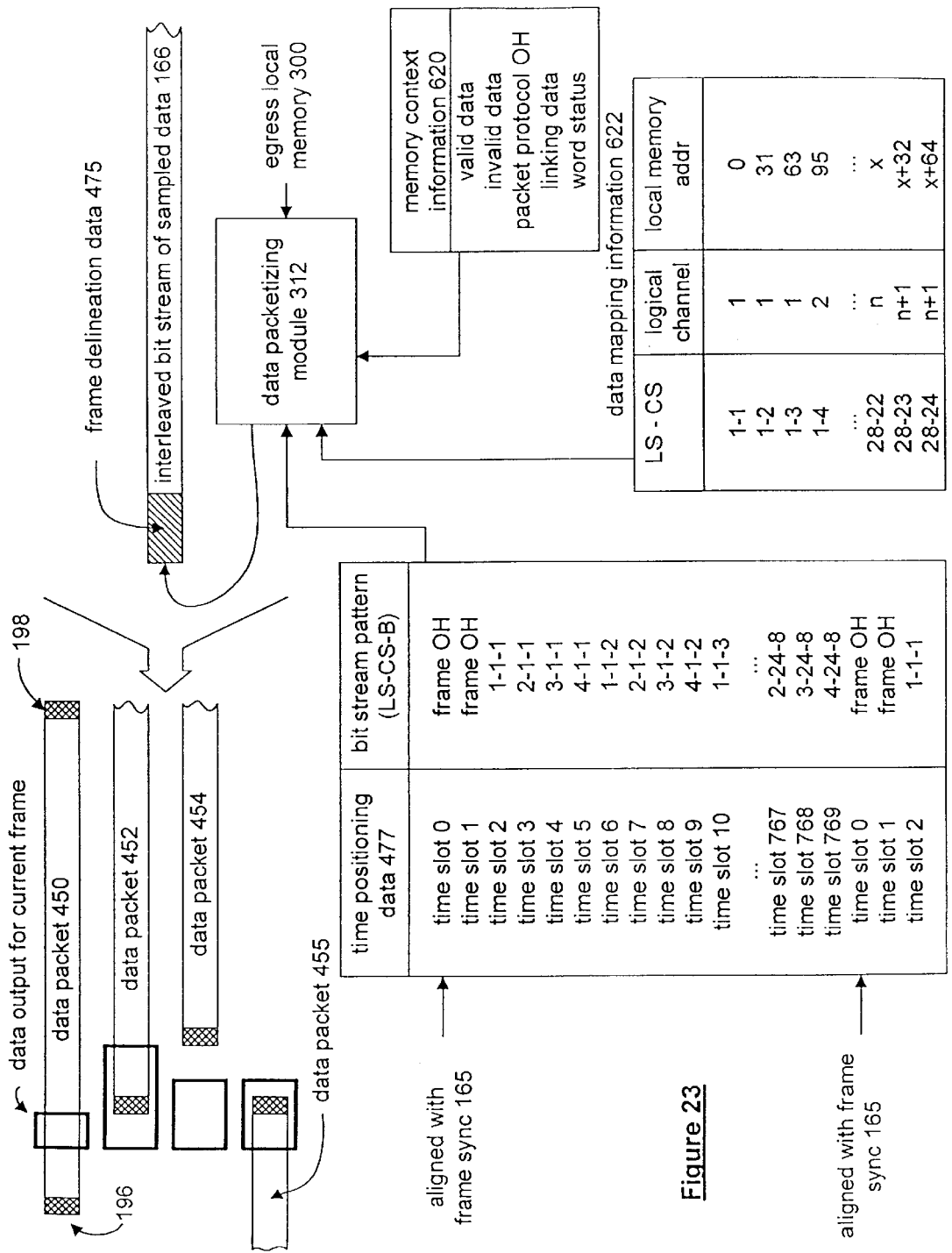
FIG. 23 illustrates a graphical representation of bit position synchronization for egress data in accordance with the present invention.

FIG. 23 illustrates a graphical representation of the data packetizing process as performed by the data packetizing module 312, which is operably coupled to obtain memory content information 620, data mapping information, time positioning data 477 and to receive data words from the egress local memory 300. In general, the data packetizing module 312 receives a data word from the egress local memory 300 and, based on the time positioning data 477, the data mapping information 622, and the memory content information 620, generates the interleaved bit stream of sample data 166. As shown, the bit stream includes frame delineation data 475. The data packetizing module 312 adds the frame delineation data to the interleaved bit stream. The addition of the frame overhead, or a frame delineation data 475 is determined based on the time positioning data. As the data packetizing module 312 receives the frame sync signal, it accesses the time positioning data to know that the first two bit positions correspond to frame overhead, i.e., the frame delineation data 475. As such, the data packetizing module outputs the first two bits of a frame of the interleaved bit stream as the frame delineation data.

The third bit, which corresponds to bit position 2, corresponds to data for the first bit of the first channel segment of the first lower-speed link. The remaining bits of the bit stream, for a given frame, correspond to the bit positions of the time positioning data. To determine which logical channel and corresponding channel segment(s) the bit position belongs to, the data mapping information 622 is accessed.

As shown, a logical channel is affiliated with the lower-speed link and the channel segment, which may correspond to a DS1 link and the affiliated DS0s. As such, for bit position 2, the data packetizing module 12 knows that this particular bit position is allocated to logical channel 1. In addition, he mapping information 622 indicates that the egress local memory has a data segment associated with the logical channel wherein the data section initial address is address 0. In addition, the logical channel 1 has the second and third channel segments of the first low-speed link affiliated therewith. As such, the egress local memory 300 includes additional data sections, beginning at address 31 and 63, allocated to the local channel.

Having identified the local memory location, the data packetizing module 312 accesses the memory context information 620 to determine whether to output a bit from the relevant data segment of local memory as valid data, invalid data, packetizing protocol overhead, linking data and/or word status. The linking data and/or word status is generally included in the tag portion of the data segment.

For a current frame, the data packetizing module 312 is outputting data that corresponds to data packets 450, 452, 454 and 455. The data packetizing module 312 outputs the data packets in the interleaved bit stream. While processing bits associated with data packet 450, the data packetizing module 312 accesses the time positioning data to determine whether the bit is associated with a particular logical channel, which supports the data packet. Having determined this information, the data packetizing module 312 accesses the memory contest information 620 to determine that the current frame of data, for data packet 450, is valid. As can be see in the figure, the data is valid for data packet 450 of the current frame since it is between the data packetizing protocol overhead 196 and 198.

As the data packetizing module 312 is processing bits affiliated with data packet 452, it accesses the time positioning data 477 to determine the bit position positions of the associated bits. Having determined this, the data packetizing module 312 determines the particular logical channel. The logical channel is then used to address the data mapping information 622 to identify a particular data segment of the egress local memory. Having identified the particular memory section, the specific memory context information 620 is determined for the logical channel. As can be seen in the upper-left portion of FIG. 23, the output data for the current frame includes invalid data, the packetizing protocol overhead, which is inserted by the data packetizing module 312, and then valid data.

As the data packetizing module 312 is processing bits associated with data packet 454 during the current frame, it again accesses the time positioning data 477, the data mapping information 622 and the specific memory context information for data packet 454. Having obtained this information, the data packetizing module 312 determines that the data is invalid for this current frame of data packet 454. As such, the data provided into the interleave bit stream will be don't care information, or null data.

The data packetizing module 312 processes bits associated with the data packet 455 for the current frame based on the time positioning data 477, the data mapping information 622 and specific context information 620 for the data packet. As such, for each bit associated for data packet 455, the logical channel is determined which leads to the particular data segment of the egress local memory 300. The data segment of egress local memory is then used to obtain the specific memory context information 620. As can be seen, the specific memory context would indicate that the first series of bits will include valid data, the next series of bits will include packetizing protocol overhead 198 and the final set of bits will include invalid data.

Figure 24:
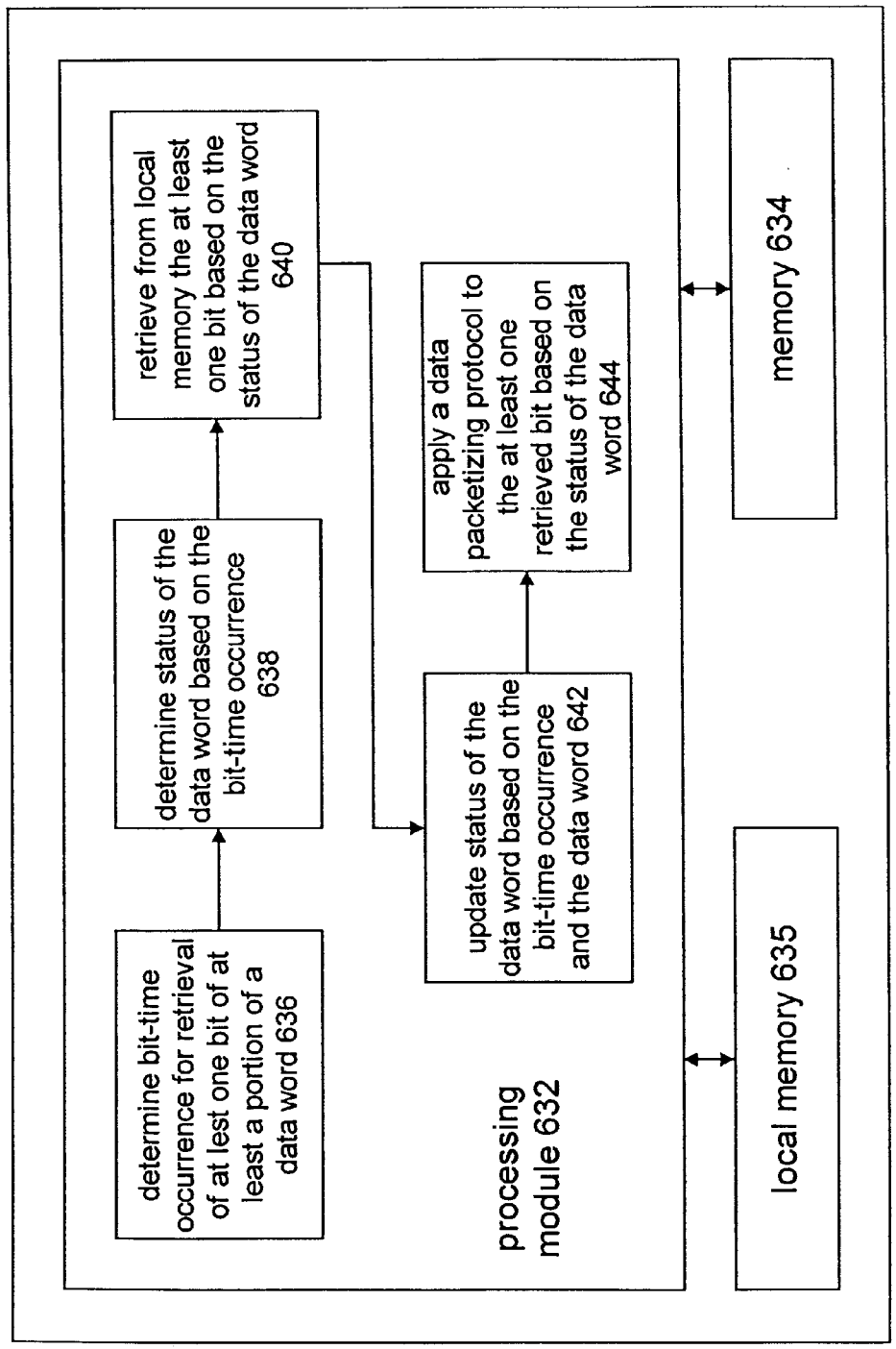
FIG. 24 illustrates a schematic block diagram of a data packetizing module in accordance with the present invention.

FIG. 24 illustrates a schematic block diagram of a data packetizing module 630. The data packetizing module 630 includes a processing module 632, memory 634, and local memory 635. The processing module 632 may include a single processing entity or a plurality of processing entities. Such a processing entity may be a microprocessor, microcontroller, digital signal processor, central processing unit, state machine, logical circuitry and/or any other device that processes data based on operating instructions. The memory 634 may be read-only memory, random access memory, floppy disk memory, DVD memory, CD memory, magnetic tape memory and/or any other device that stores digital information. Note that if the processing module includes a state machine to implement one or more of the associated circuits, the memory containing the specific operating instructions for the associated circuit, or circuits, would be embedded within the state machine and/or embedded within the logic circuitry. The local memory 635, which corresponds to the egress memory 300 may be random access memory.

The operating instructions stored in memory 634 causes the processing unit 632 to function as a plurality of circuits 636–644. While executing the operating instructions, the processing module functions as circuit 636 to obtain bit time occurrence by retrieval of at least one bit of at least a portion of a data word. The processing module then functions as circuit 638 to determine status of the data word based on the bit time occurrence of the bit. Next, the processing module functions as circuit 640 to retrieve from local memory the at least one bit based on the status of the data word. The processing module then functions as circuit 642 to update the status of the data word based on the bit time occurrence and the data word. The processing unit then functions as circuit 644 to apply a data packetizing protocol to the at least one retrieved bit based on the status of the data word. The operating instructions stored in memory 634 and executed by processing module 632 will be discussed in greater detail with reference to FIGS. 25. Further note that the data packetizing module 630 performs the general functions as described with reference to FIG. 23.

Figure 25:
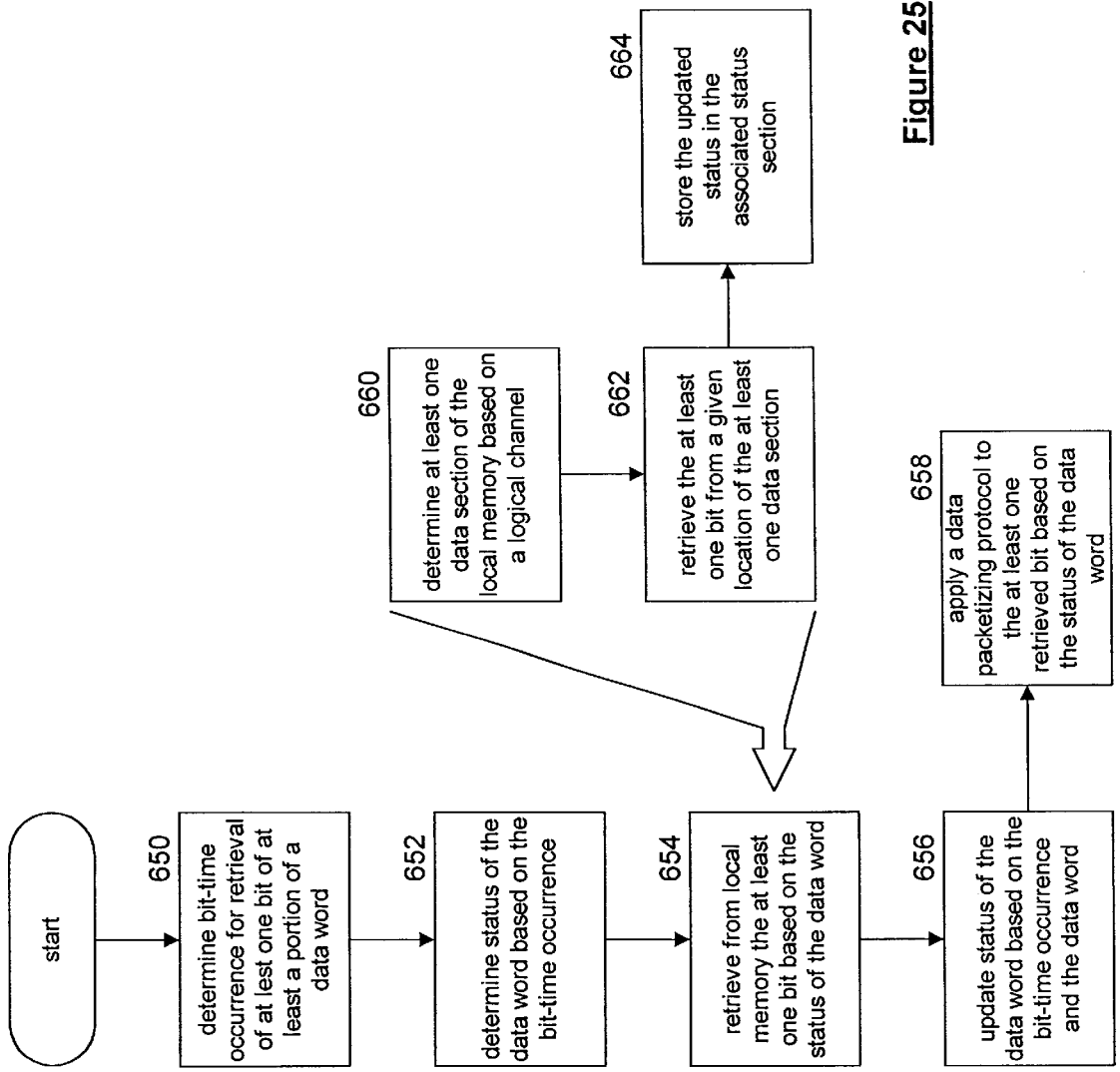
FIG. 25 illustrates a logic diagram of a method for packetizing data in accordance with the present invention.

FIG. 25 illustrates a logic diagram of a method for packetizing data. The process begins at step 650 where the bit time occurrence for retrieval of at least one bit or at least a portion of a data word is determined. The bit time occurrence corresponds to the time positioning data as described with reference to FIG. 23. The process then proceeds to step 652 where the status of the data word is determined based on the bit time occurrence. The status of the data word includes the current status of the data block, history status of the data block (e.g., the last few bits, stored), mapping information of a logical channel to local memory, local memory context information that contains addressing information, and linked list information. Refer to the discussion of FIG. 23 for a graphical representation of the determined of the status of the data word.

The process proceeds to step 654 where the at least one bit is retrieved from local memory based on the status of the data word. Retrieval from local memory can be further described with reference to steps 660–664. At step 660, at least one data section of local memory is determined based on a logical channel. The process then proceeds to step 662 where the at least one bit from a given location of the at least one data section is retrieved. The process then proceeds to step 664 where the updated status is stored in the associated status section within the local memory.

Returning to the main process, the process proceeds to step 656 where the status for the data word is updated based on the bit time occurrence and the data word. The process then proceeds to step 658 where a data processing protocol is applied to the at least one retrieved bit based on the status of the data word. The application of a data packetizing protocol may be outputting the at least retrieved bit, generating a stuffing bit and outputting the stuffing bit. Such stuffing bits would occur when the current bit and previously outputted bit falsely represent data packetizing protocol information. The application of data packetizing protocol may further include outputting at least one error checking bit and outputting at least one start or end of data packet flag bit. The application of a data packetizing protocol may further include inserting at least one error bit in the at least one retrieved bit position when an underflow condition is detected. As such, if the local memory does not provide a data word to the data packetizing module, the data packetizing module would insert an error bit indicating that an underflow condition has occurred. As a further application of a data packetizing protocol, a determination may be made that the at least one bit is affiliated with the unassigned logical channel. When such a determination is made, a null bit is outputted in place of the at least one bit. Such was illustrated in FIG. 23 with reference with data packet 454.

Figure 26:
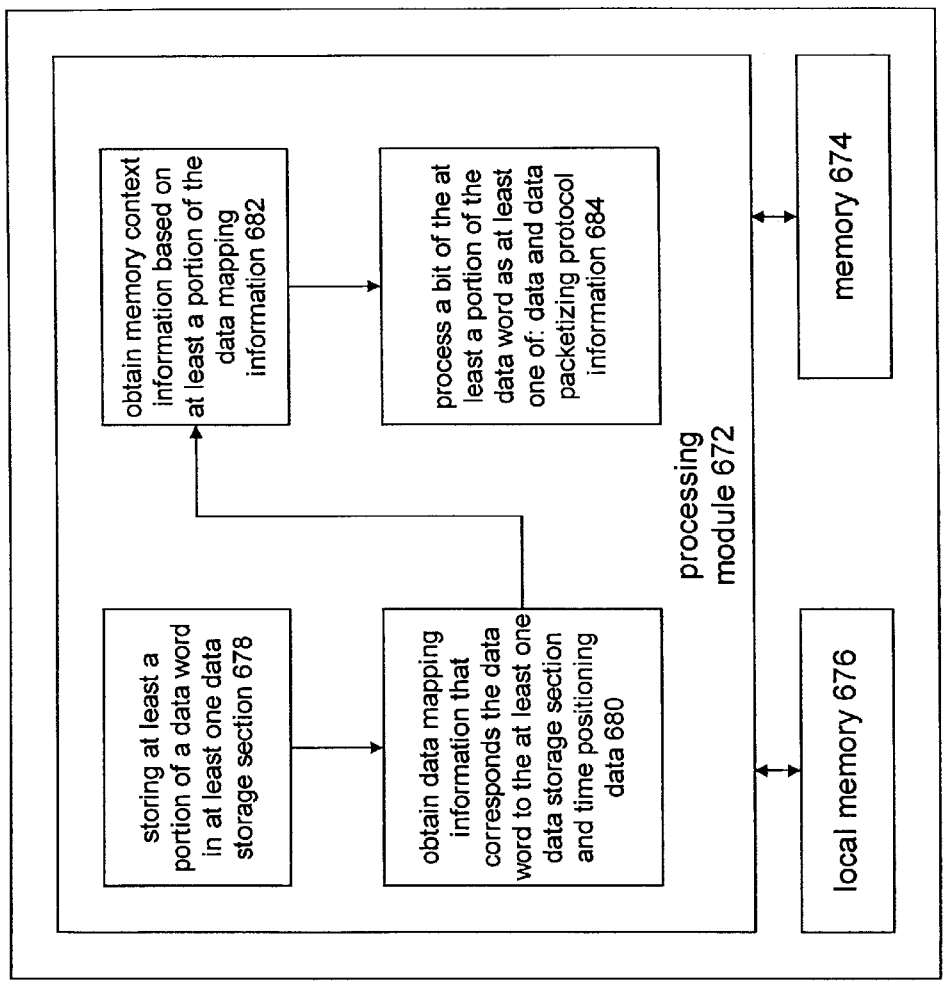
FIG. 26 illustrates a schematic block diagram of an alternate data packetizing module in accordance with the present invention.

FIG. 26 illustrates a schematic block diagram of a data packetizing module 670. The data packetizing module 670 includes a processing module 672, memory 674 and local memory 676. The local memory 676 corresponds to the egress memory 300 of FIG. 23. The processing module 672 may include a single processing entity, or a plurality of processing entities. Such a processing entity may be a microprocessor, microcontroller, microcomputer, digital signal processor, state machine, logical circuitry and/or any device that manipulates data based on operating instructions. The memory 674 may be read-only memory, random access memory, floppy disk memory, magnetic tape memory, and/or any device that stores digital information. Note that if the processing module includes a state machine to perform one or more of the functions of the processing module, the operating instructions stored in memory would be embedded within the circuitry making up the state machine. Similarly, the operating instructions of memory would be embedded in a logic circuit that would implement a function(s) of the processing modules 672.

The memory 674 includes operating instructions that cause the processing module 672 to function as a plurality of circuits 678–684. While performing the operating instructions, the processing module functions as circuit 678 to store at least a portion of a data word in at least one data storage section of the local memory 676. The processing module then functions as circuit 680 to obtain data mapping information that corresponds the data word to the at least one data storage section and time positioning data. The processing module then functions as circuit 682 to obtain memory context information based on at least a portion of the data mapping information. The processing module then functions as circuit 684 to process a bit of at least a portion of the data word of at least one of data or data packetizing protocol information. The operating instructions stored in memory and executed by the processing module 672 are further described with reference to FIGS. 27 and 28. Further note that the data packetizing module 670 performs in a similar fashion as the data packetizing module 312 of FIG. 23.

Figure 27:
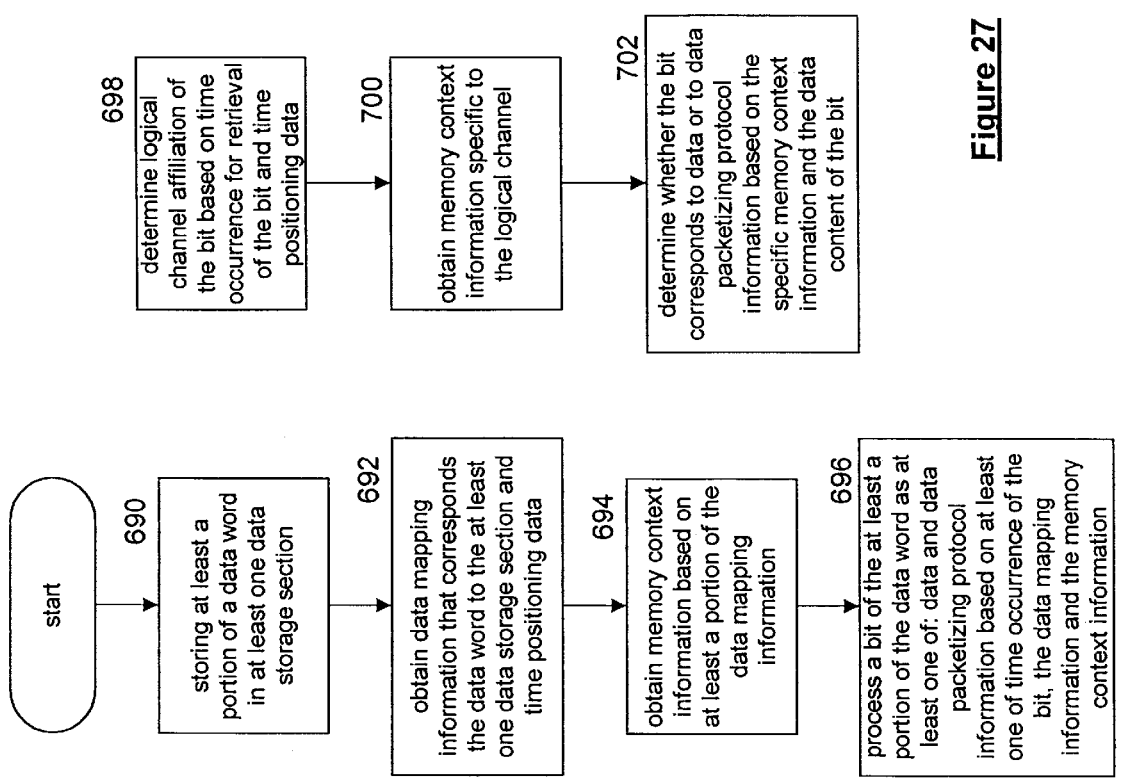
FIG. 27 illustrates a logic diagram of an alternate method for packetizing data in accordance with the present invention.

FIG. 27 illustrates a logic diagram of a method for packetizing data. The process begins at step 690 where at least a portion of a data word is stored in at least one storage section of local memory. Prior to storing the data, a determination is made as to whether at least a portion of a data block is available for packetizing. In addition to determining that a data block, or a portion thereof, is available for transporting from non-local memory, a determination is also made as to whether the local memory has capacity to store the portion of the data block. If so, step 690 is executed. Otherwise, the process waits until the data block is available from non-local memory for transporting and/or the local memory has the capacity to store a data word or a portion of the data block.

The process then proceeds to step 692 where data mapping information is obtained. The data mapping information corresponds the data word to the at least one data storage section of the local memory and to time positioning data. The process then proceeds to step 694 where memory context information is obtained based on at least a portion of the data mapping information. The memory context information contains current bit retrieval status of the at least a portion of the data block. In addition, the current bit retrieval status includes channel segment rate (e.g., 64 kilobits or 56 kilobits per second, addressing mode, valid data indication, link memory segments, and data storage section fill status). Note that the data storage section fill status indicates whether the data sections associated with a particular logical channel include a sufficient amount of memory to begin the data packetizing process.

The process then proceeds to step 696 where a bit of the at least a portion of the data word is processed as data or data packetizing protocol information. Such processing is based on the time occurrence of the bit, the data mapping information and/or the memory context information. The processing at step 696 may be further described by the processing step 698–702.

At step 698, a logical channel affiliation of the bit is determined based on time occurrence for retrieval of the bit and the time positioning data. The process then proceeds to step 700 where specific memory context information is obtained regarding the logical channel. The process then proceeds to step 702 where a determination is made as to whether the bit corresponds to data or data packetizing protocol information. Such a determination is based on the specific memory context information and the data content of the bit. A graphical representation and detailed discussion of such processing was provided with reference to FIG. 23.

Figure 28:
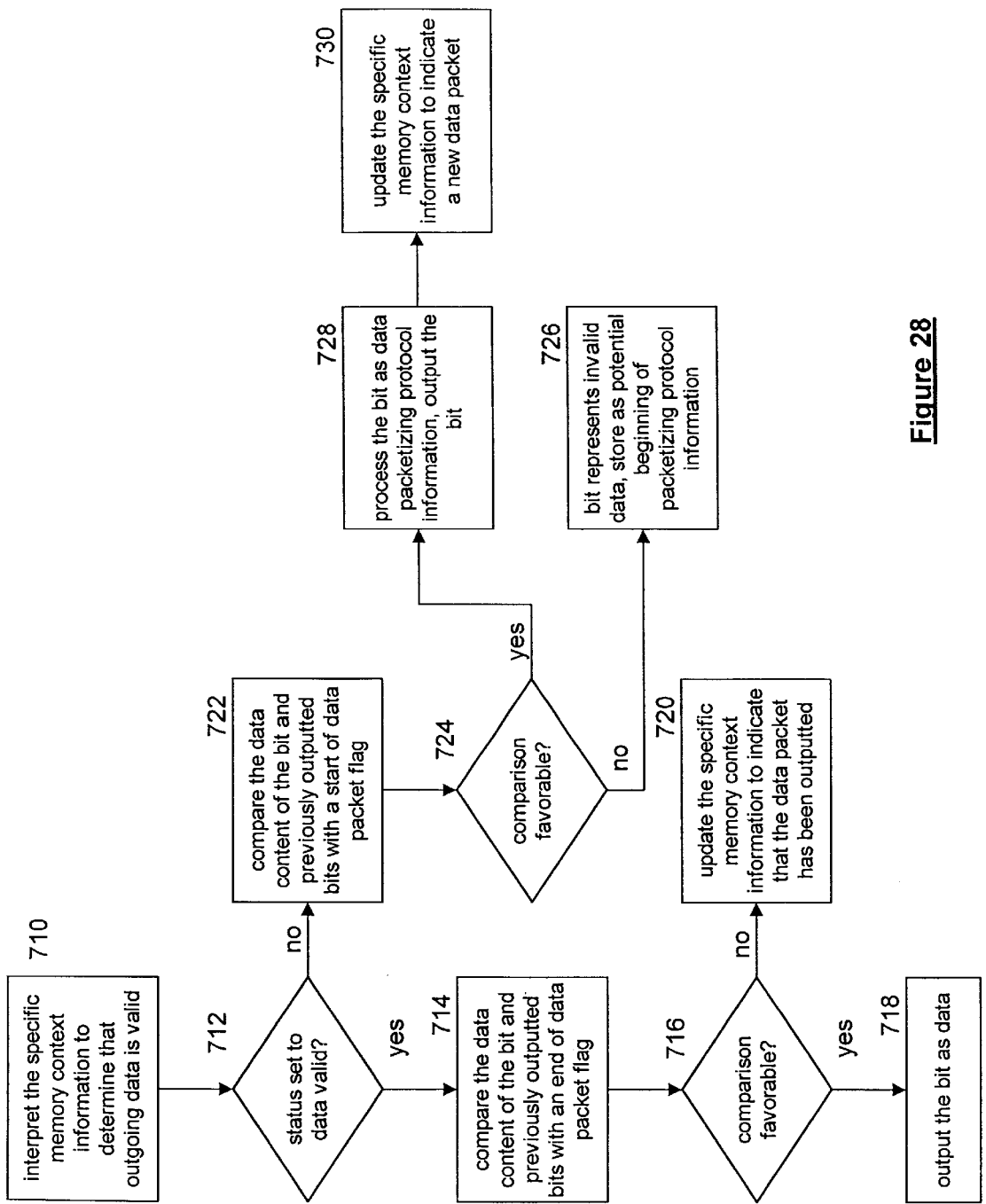
FIG. 28 illustrates a logic diagram of a method in furtherance of the method of FIG. 27.

FIG. 28 illustrates a logical diagram of a method, which is in furtherance of the method of FIG. 27. Such processing begins at step 710 where the specific memory context information is interpreted to determine whether outgoing data is valid. Such a determination may be done by reading the tag associated with the data word. The process then proceeds to step 712 where a determination is made as to whether the status (e.g., the tag) is set to valid data. If so, the process proceeds to step 714 where the data content of the bit and previously outputted bits are compared with an end of data packet flag. As previously mentioned, an end of data packet flag may be represented by six consecutive ones.

The process then proceeds to step 716 where a determination is made as to whether the comparison was favorable. If the comparison was not favorable, i.e., the end of data packet has been reached, the process proceeds to step 720. At step 720 the specific memory context information is updated to indicate that the data packet has been outputted. This was graphically represented in FIG. 23 with the discussion regarding the processing of data packet 455. If, however, the comparison at step 716 was favorable, the process proceeds to step 718 where the bit outputted is representative of valid data. Alternatively, the bit may be replaced by a stuffing bit when the data is valid and a pattern of the data matches a packetizing protocol pattern. In other words, the data is known to be valid but the current bit and the previously outputted bits indicate data packetizing information. When this occurs, the bit is stuffed to overcome the violation of the packetizing protocol overhead. The processing of valid data was discussed in detail with graphical illustrations regarding the processing of data packet 450 as shown in FIG. 23.

If, at step 712, the status was not set to valid data, the process proceeds to step 722. At step 722, the data content of the bit and previously outputted bits are compared with a start of data packet flag. The process then proceeds to step 724 where a determination is made as to whether the comparison was favorable. If not, indicating that a start of a data packet flag has not been identified, the process proceeds to step 726. At step 726, the bit is identified as representing invalid data but is maintained as a potential beginning of packetized protocol information indicating a packet start.

If, however, the comparison at step 724 was favorable, the process proceeds to step 728. At step 728, the bit is processed as data packetizing protocol information and outputted. As such, the data packetizing module is packetizing the bit with the packetizing protocol information. The process then proceeds to step 740 where the specific memory context information is updated to indicate that a new data packet is being processed.

Figure 29:
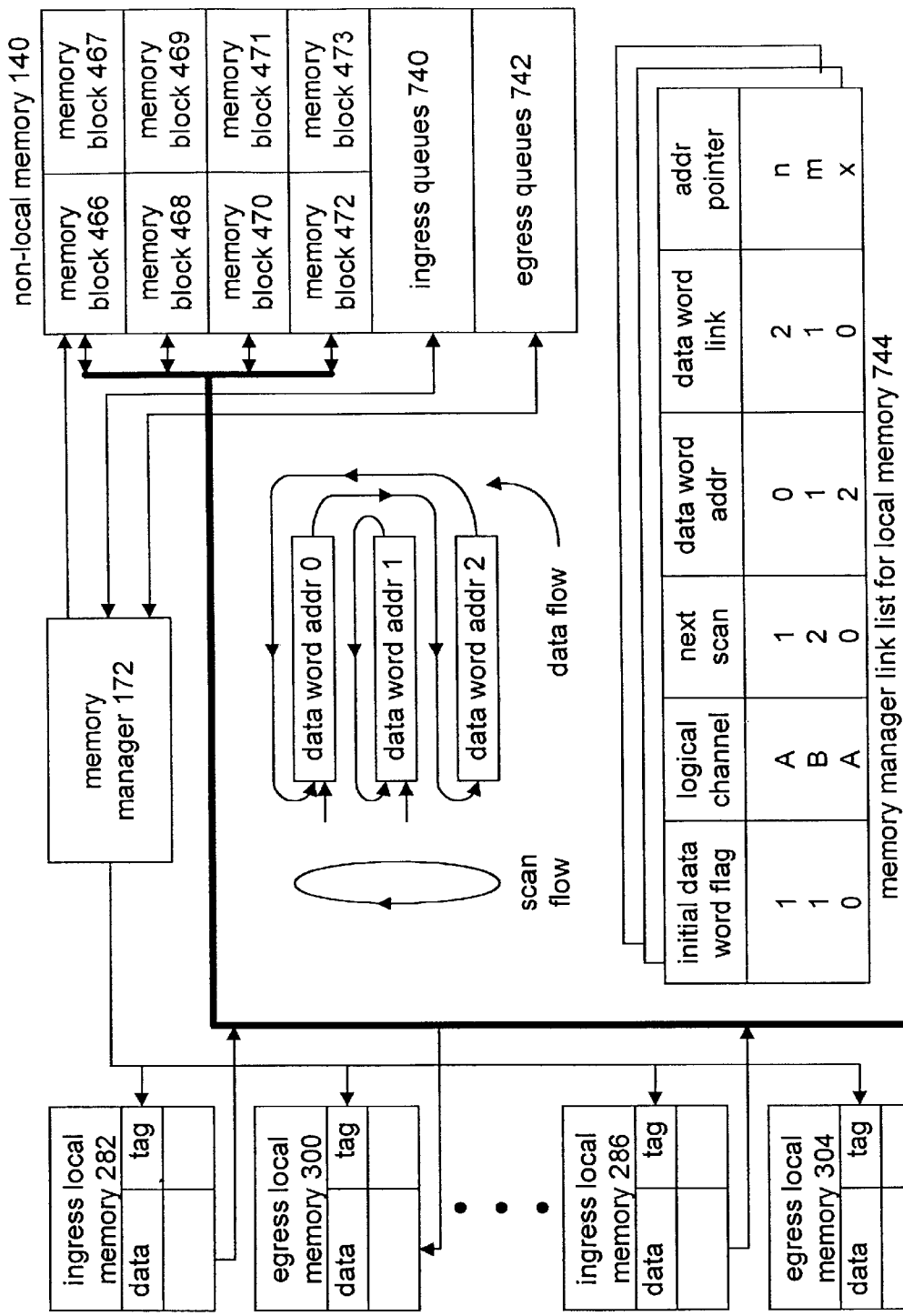
FIG. 29 illustrates a schematic block diagram for a memory management system that processes ingress data in accordance with the present invention.

FIG. 29 illustrates a schematic block diagram of the memory management process in accordance with the present invention. As shown, the memory manager 172, which is also referred to as a data transport managing module, is operably coupled to a plurality of ingress local memories 282, 286, a plurality of egress local memories 300, 304 and the non-local memory 140. The memory manager 172 includes memory to store memory manager linked list information for local memories 744. As previously mentioned, the local memories (ingress and egress) each include a data portion and a tag portion. The tag portion of the ingress local memories indicates whether the associated data section includes a data word for transportation to the non-local memory. The tag portion of the egress local memories indicates whether the associated data section has the capacity to store a retrieved data word from the non-local memory 140. One of the memory manager's 172 primary functions is to facilitate the data transfer between the ingress local memories and the non-local memory 140 and the data transfer from the non-local memory 140 to the egress local memory 300 and 304. The memory manager also further to process statistics for short frames, under-runs and overruns on a per channel basis.

The non-local memory 140 includes a plurality of memory blocks 466–473, an ingress queue section 470 and an egress queue section 472. The ingress queue section facilitates the storage of ingress data words into the memory blocks while the egress queue section facilitates the retrieval of data words from the memory blocks. In addition, the ingress queue section 740 may include a similar linked list to that of the local memory linked list 744. As such, the linked list for the memory blocks indicate which memory blocks are linked together for data packets and the fill status for the corresponding memory blocks. For example, a memory block may have a data capacity of 512 bytes, which includes a 480 byte section for storing data words, and a 32 byte section for storing memory block status information.

The status information includes memory block linking data, current memory block fill status, end of data packet status, etc. Note that the memory blocks will be linked together for a data packet when the data packet is larger than a memory block.

To facilitate the transportation of data between the local memories and the non-local memory 140, the memory manager 172 utilizes the memory manager linked list 744. The linked list includes an initial data word flag, logical channel affiliation, next scan field, data word address field and a data word link field. The linked list 744 includes separate linked lists for each of the local memory sections. As such, each ingress and egress local memory has its own linked list or share a linked list.

In the ingress path, the memory manager 172 utilizes the linked list to poll the ingress local memories by interpreting the tag to determine whether the associated data segment has a data word for transportation. The scan, or polling, flow, which is indicated by an ellipse in the center of FIG. 29, continues in the loop. As shown in the linked list, the data word address 0, i.e., the first entry in the list, indicates that the next scan is data word address 1 wherein the next scan for data word address 1 is data word 2. As such, the three data words continue in the loop, as indicated by the scan flow for the polling operation. As one of average skill in the art would readily appreciate, the linked list may include many more objects than the three indicated in the example of FIG. 29. The linked list 744 also includes the logical channel affiliation of the data word segment. As shown, the data sections addressed by data word address 0 and data word address 2 are affiliated with logical channel A while the data section of address 1 is affiliated with logic channel B. The initial data word flag of the linked list 744 indicates whether the corresponding data segment is the first data segment associated with the logical channel. When the bit is set, (e.g., a one), the associated data segment is the first data segment for the logical channel. When the initial data word flag is not set (e.g., 0), the associated data segment is not the first.

The linked list further includes the data word link. The data word link is used to determine the data flow for the logical channels. As shown, logical channel B includes a single data section which corresponds to the data word address one. The associated data word link includes a one, indicating that the data flow (i.e., the manner in which data is written in to the local memory) for logical channel B is as shown in the center of FIG. 29. As such, the data word address one is continually overwritten with new data words once the current data word has been flagged for transporting to the non-local memory. For logical channel A, the data word link field includes a 2 associated with the data section 0 and a 0 for data section 2. As such, the data flow causes data to be written at data section 0 then at data section 2, before beginning again at data section 0. The data flow for logical channel A is as shown in the center portion of FIG. 29.

Once the memory manager 172 determines that the ingress local memory has a data word for transportation, the memory manager 172 identifies the logical channel, determines whether a memory block has been allocated to the logical channel and provides the data word to the allocated memory block. If the logical channel has not been allocated a memory block in non-local memory, the memory manager allocates one, if one is available, and then provides the data to the memory block. The memory manager 172 also monitors the amount of data provided to the non-local memory to determine when another memory block is needed. The memory manager further monitors the size of the memory block to determine whether the data packet is in a runaway condition, i.e., exceeding a maximum data packet size.

Figure 30:
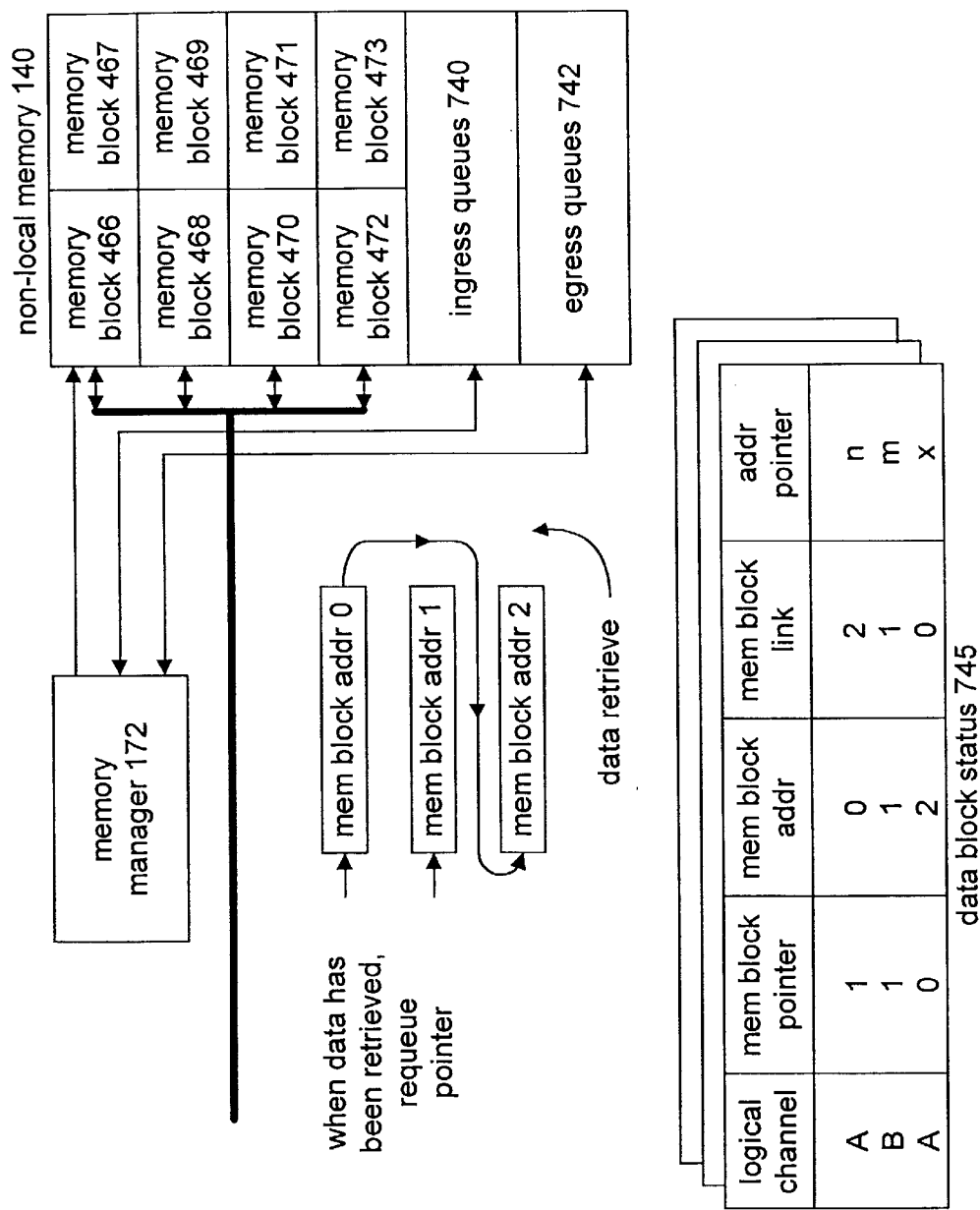
FIG. 30 illustrates a schematic block diagram of a memory management system that processes egress data in accordance with the present invention.

FIG. 30 illustrates the memory manager 172 coupled to the non-local memory 140 to perform the egress data transportation process. The memory manager 172 accesses data block status information 745 to facilitate the transportation of egress data words. The data block status 745 includes a logical channel field, memory block pointer field, memory block address, memory block link, and an address pointer. The memory block pointer indicates whether the memory block being accessed is the first memory block in a series of memory blocks allocated to the logical channel. If so, the memory block pointer is flagged as a logic one. If not, the memory block pointer is flagged as a zero. The memory block address indicates the starting address for the particular memory block while the memory block link field indicates how the memory blocks are linked together for a particular logical channel. The address pointer indicates the current address of a memory block regarding the words being extracted from the memory block.

As shown in the center portion of FIG. 30, the data retrieval process is to retrieve the data from the memory block, once the memory block has been identified as containing a completed data packet. Once the data has been retrieved, the pointers to the memory block are requeued such that the memory block may be utilized for other data processing.

Figure 31:
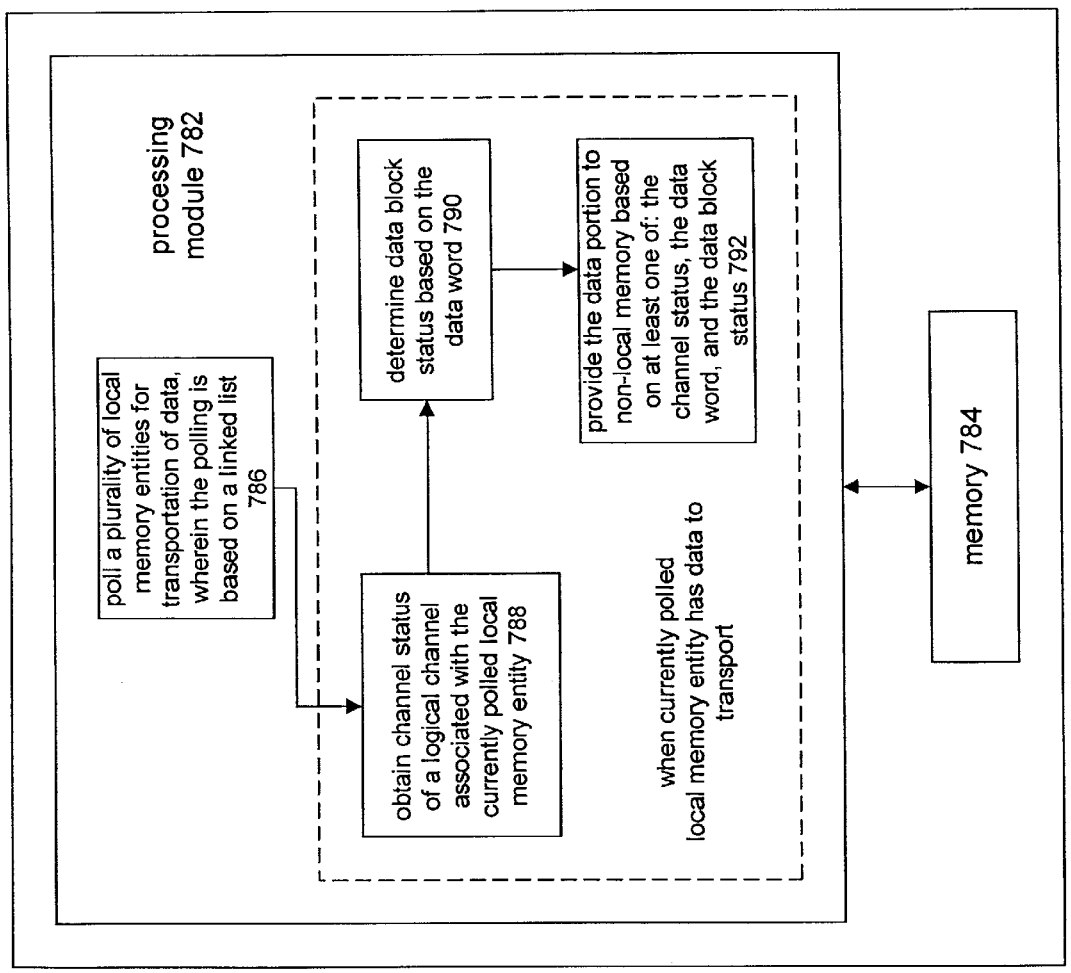
FIG. 31 illustrates a schematic block diagram of a data transport managing module in accordance with the present invention.

FIG. 31 illustrates a schematic block diagram of a data transport managing module 780 that includes a processing module 782 and memory 784. In general, the data transport managing module functions similarly to the memory manager 172, as discussed with reference to FIGS. 29 and 30. The processing module 782 may include a single processing entity or a plurality of processing entities. Such a processing entity may be a microprocessor, microcontroller, digital signal processor, central processing unit, state machine, logical circuitry and/or any device that processes data based on operating instructions. The memory 784 may be read-only memory, random access memory, floppy disk memory, hard disk memory, DVD memory, and/or any device that stores digital information. If the processing module includes a state machine and/or logic circuitry to implement one or more of its functions, the operating instructions corresponding to that function or functions stored in memory 784 are embedded within the state machine and/or logic circuitry.

The memory 784 stores operating instructions that cause the processing module to function as a plurality of circuits 786–792. While executing the operating instructions, the processing module 782 functions as circuit 786 to poll a plurality of local memory entities for transportation of data. The polling is done based on a linked list. The processing module then functions as circuits 788–792 when a currently polled local memory entity has data to transport. When such is the case, the processing module functions as circuit 788 to obtain channel status of a logical channel associated with the currently polled local memory entity. The processing unit then functions as circuit 790 to determine data block status based on the data word. The processing module then functions as circuit 792 to provide the data portion to non-local memory based on the channel status, the data word, and/or the data block status. The operating instructions stored in memory 784 and executed by processing module 782 are discussed in greater detail with reference to FIGS. 32 and 33.

Figure 32:
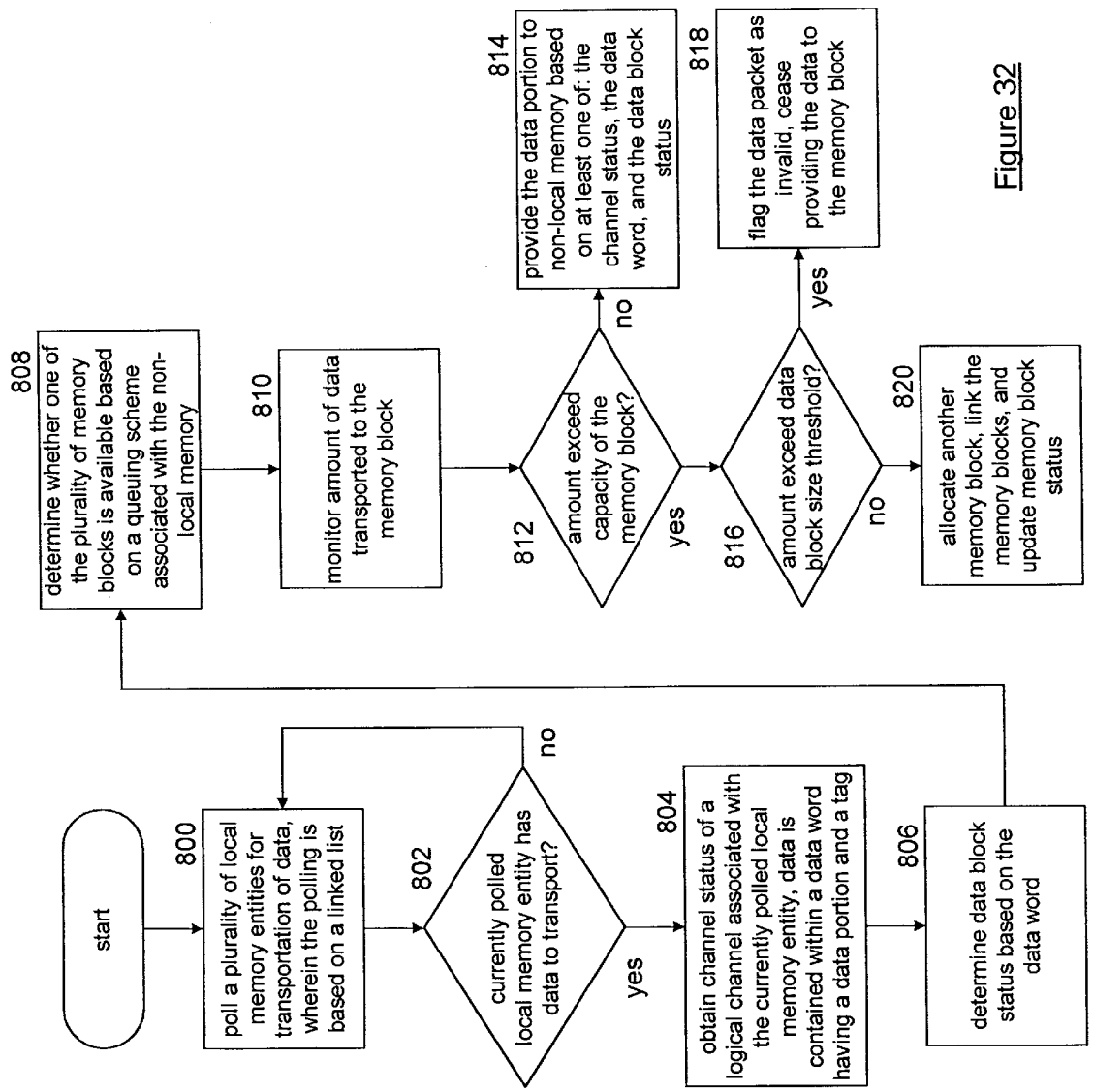
FIG. 32 illustrates a logic diagram of a method for memory management in accordance with the present invention.

FIG. 32 illustrates a logic diagram of a method for managing the transportation of data. The process begins at step 800 where a plurality of local memory entities are polled for an indication that they have data to transport. The polling is done based on a linked list. Note that the polling sequence is generated in accordance with affiliations of logical channels to local memory segments, wherein the linked list maintains the affiliation of logical channels to the local memory segments. Further note that the logical channels may be weighted within the polling sequence based on the number of local memory segments assigned to the logical channel, a predetermined priority of a logical channel, and/or user defined weighting criteria. As such, the priority may be strictly based on the processing of logical channels as shown with reference to FIGS. 29 and 30 or based on a predetermined logical channel weighting based on the identity of the data consumer (e.g., governmental user) and/or a premium paid by the data consumer. Alternatively, or in addition to, the weighting of the logical channels may be user-defined, i.e., the service provider establishes the weighting factor based on a number of criteria.

The process then proceeds to step 802 where a determination is made as to whether a currently polled local memory entity has data to transport. Note that a local memory entity may be an ingress local memory and/or an egress local memory. If not, the process reverts to step 800 where the polling continues based on the linked list. If, however, a currently polled local memory entity has data to transport, the process proceeds to step 804. At step 804 channel status of a logical channel associated with the currently polled local memory entity is obtained. The data that the currently polled local memory entity has to transport is contained within a data word that includes a data portion and a tag. Note that the channel status includes seeking a data packet, processing a valid data packet, end of a data packet, amount of data transferred and/or current packet status.

The process then proceeds to step 806 where the data block stored in non-local memory is determined based on the data word. The process then proceeds to step 808 where a determination is made as to whether one of the plurality of memory blocks is available based on a queuing scheme associated with the non-local memory. The queuing scheme, in essence, provides handshaking to transport data between the local memories and the non-local memory. The process then proceeds to step 810 where the amount of data transported to the memory block is determined. The process then proceeds to step 812 where a determination is made as to whether the amount of data exceeds the capacity of the memory block. If not, the process proceeds to step 814 where the data portion is provided to the non-local memory based on the channel status, the data word and/or the data block status.

If, however, the amount of data exceeds the capacity of the memory block the process proceeds to step 816 where a determination is made as to whether the amount of data exceeds a data block threshold, i.e., the data packet is in a runaway state. If so, the process proceeds to step 818 where the data packet is flagged as invalid and the memory manager ceases to provide the data to the memory block. If, however, the amount of data does not exceed the block size but does exceed the capacity of a memory block, another memory block is allocated to the logical channel as shown at step 820. In addition, the new memory block is linked to the existing memory block, or blocks, and the memory block status is updated to include the linking information.

Figure 33:
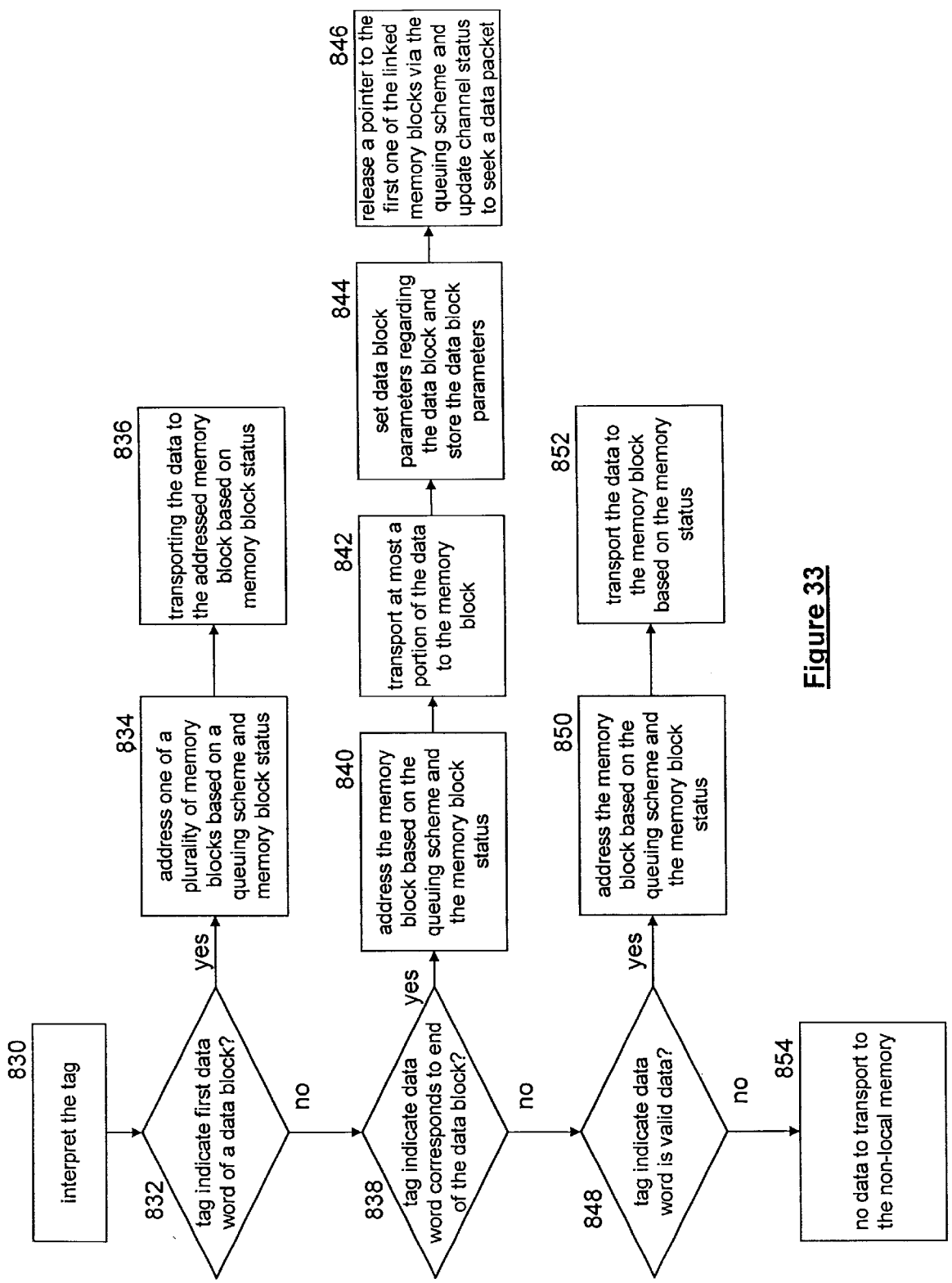
FIG. 33 illustrates a logic diagram of a method in furtherance of the method of FIG. 32.

FIG. 33 illustrates a logic diagram of a method in furtherance of the method of FIG. 32. At step 830, a tag associated with a data section is interpreted. The process then proceeds to step 832, where a determination is made as to whether the tag indicates the data word is the first data word of a data block. If so, the process proceeds to step 834, where one of a plurality of memory blocks is addressed based on a queuing scheme and memory block status. The process then proceeds to step 836 where the data is transported to the addressed memory block based on the memory block status. The memory block status was described with reference to FIGS. 29 and 30.

If the tag did not indicate a first data word of a data block, the process proceeds to step 838. At step 838, a determination is made as to whether the tag indicates that the data word corresponds to the end of a data block. If so, the process proceeds to step 840 where the memory block is addressed based on the queuing scheme and the memory block status. The process then proceeds to step 842 where at most a portion of the data word is transferred to the memory block. The process then proceeds to step 844 where the data block parameters are set regarding the data block and are stored. The data block parameters include the size of the data block, an indication of whether it is valid data and whether the data block is completely full with the data packet. The process then proceeds to step 846 where a pointer to the first one of the linked memory blocks is released via the queuing scheme and the channel status is updated to seek a new data packet. At this point, a data packet is fully stored in non-local memory thus the pointers to writing to the memory can be deleted. As such, the data packet is now ready for retrieval from the non-local memory.

The process proceeds to step 848 if the tag is not indicative of a first data word or the end of a data block. At step 848, a determination is made as to whether the flag indicates that a data word is valid. If the data word is invalid, the process proceeds to step 854 where the memory manager identifies that it has no data to transport to the non-local memory. If however, the tag indicates that the data word is valid, the process proceeds to step 850 where the memory block is addressed based on the queuing scheme and the memory status block. The process then proceeds to step 852 where the data is transported to the memory block based on the memory status.

Figure 34:
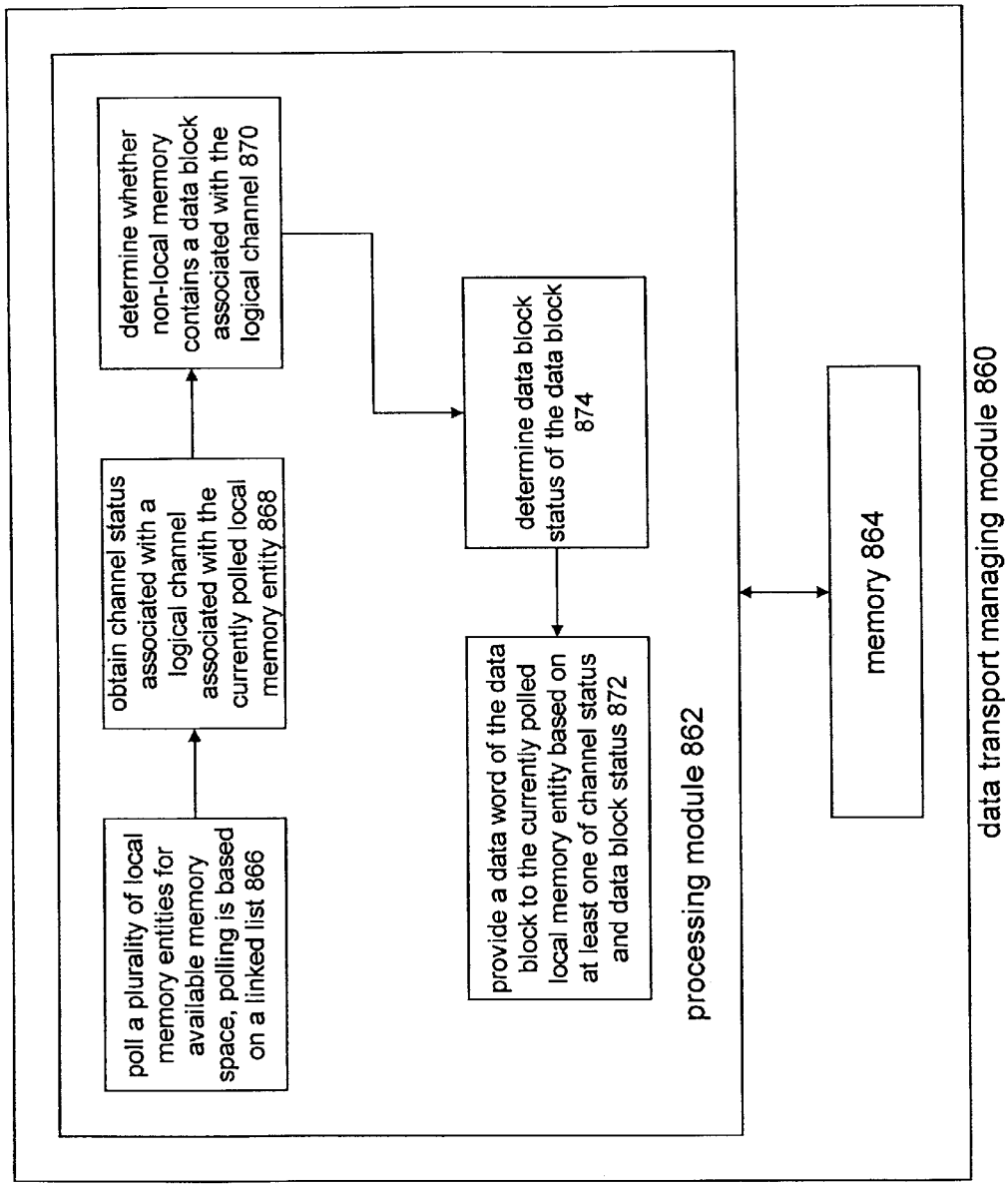
FIG. 34 illustrates a schematic block diagram of an alternate data transport managing module in accordance with the present invention.

FIG. 34 illustrates a schematic block diagram of an alternate data transport management module 860 that includes a processing module 862 and memory 864. The processing module 862 may include a single processing entity or a plurality of processing entities. A processing entity may be a microprocessor, microcomputer, digital signal processor, central processing unit, state machine, logical circuitry and/or any device that processes data based on operating instruction. The memory 864 may be read-only memory, random access memory, floppy disk memory, magnetic tape memory, embedded memory, and/or any device that stores digital information. Note that if the processing module 862 includes a state machine and/or logical circuitry to implement one or more of its functions, the corresponding operating instructions are embedded within the circuitry. As such, the memory that contains the operating instructions is embedded into the circuitry that makes up the state machine.

Memory 864 stores operating instructions that causes the processing module 862 to function as a plurality of circuits 866–874. While performing the operating instructions, the processing module functions at circuit 866 to poll a plurality of local memory entities for available memory space. Such polling is based on a linked list. The processing module then functions as circuit 868 to obtain channel status associated with a logical channel that is affiliated with the currently polled memory entity. The processing module then functions as circuit 870 to determine whether the non-local memory contains a data block associated with the logical channel. The processing module then functions as circuit 874 to determine the data block status of the data block. Having done that, the processing module functions as circuit 872 to provide a data word of the data block to the currently polled local memory entity based on at least one of channel status and the data block status. The operating instructions stored in memory 864 and executed by processing module 862 will be discussed in greater detail with reference to FIGS. 35 and 36. Note that the data transport managing module 860 operates in a similar manner as the memory manager 172 of FIGS. 29 and 30.

Figure 35:
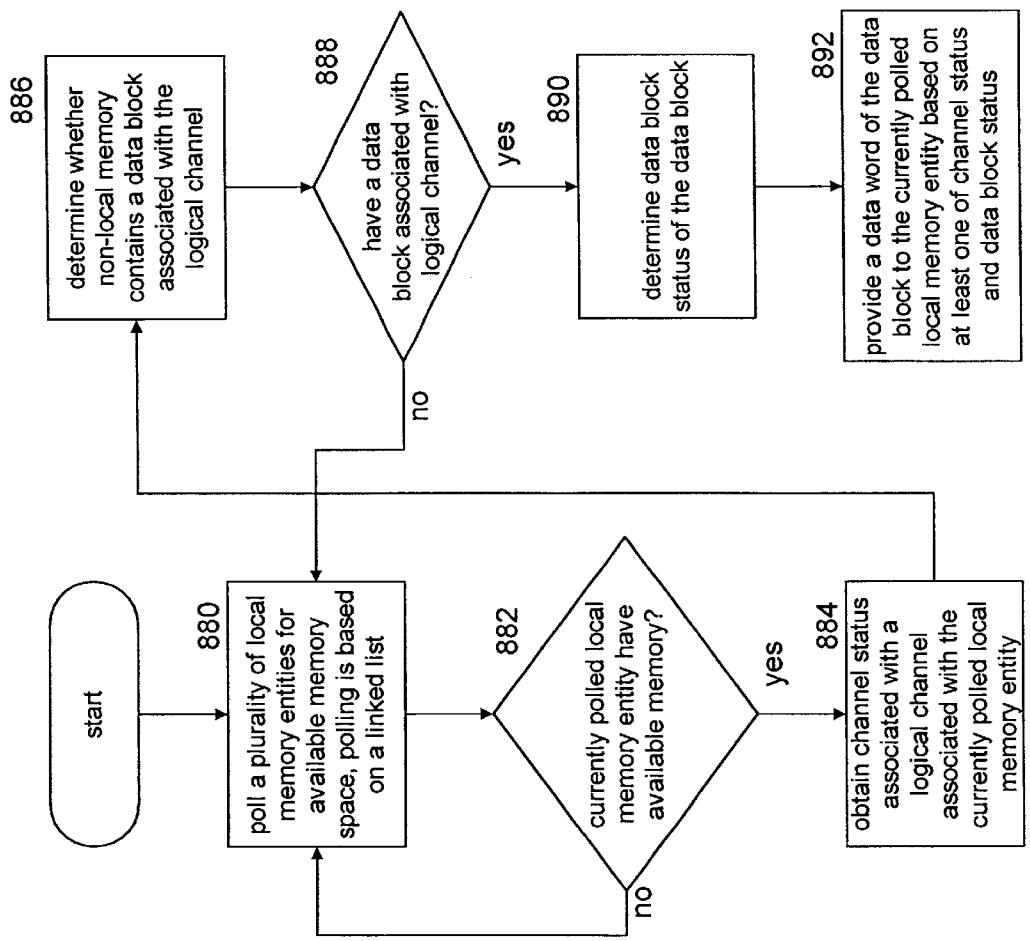
FIG. 35 illustrates a logic diagram of an alternate method for data management in accordance with the present invention.

FIG. 35 illustrates a logic diagram of a method for managing the transportation of data. The process begins at step 880 where a plurality of local memory entities is polled for available memory space. Such polling is based on a linked list. The polling sequence may be done in accordance with the affiliation of logical channels to local memory segments, as described with reference to FIGS. 29 and 30, wherein the linked list maintains such affiliations. In addition, or alternative to, the weighting of the polling sequence may be based on the number of local memory segments assigned to the logical channel, a predetermined priority of the logical channel and/or user defined weighting.

The process then proceeds to step 882 where a determination is made as to whether a currently polled local memory entity has available memory. If not, the process reverts to step 880. If, however, memory is available, the process proceeds to step 884. At step 884 the channel status associated with the logical channel that is associated with the currently polled memory entity is obtained. Note that the channel status includes seeking a data packet, processing a valid data packet, end of a data packet, amount of data transferred and/or current packet status.

The process then proceeds to step 886 where a determination is made as to whether non-local memory contains a data block associated with the logical channel. The process then proceeds to step 888 which continues the processing flow back to step 880 when the non-local memory does not have a data block associated with the logical channel. If, however, the non-local memory has a data block associated with the logical channel, the process proceeds to step 890. At step 890 the data block status of the data block is determined. The process then proceeds to step 892 where a data word of the data block is provided to the currently polled local memory entity based on the channel status and/or the data block status.

Figure 36:
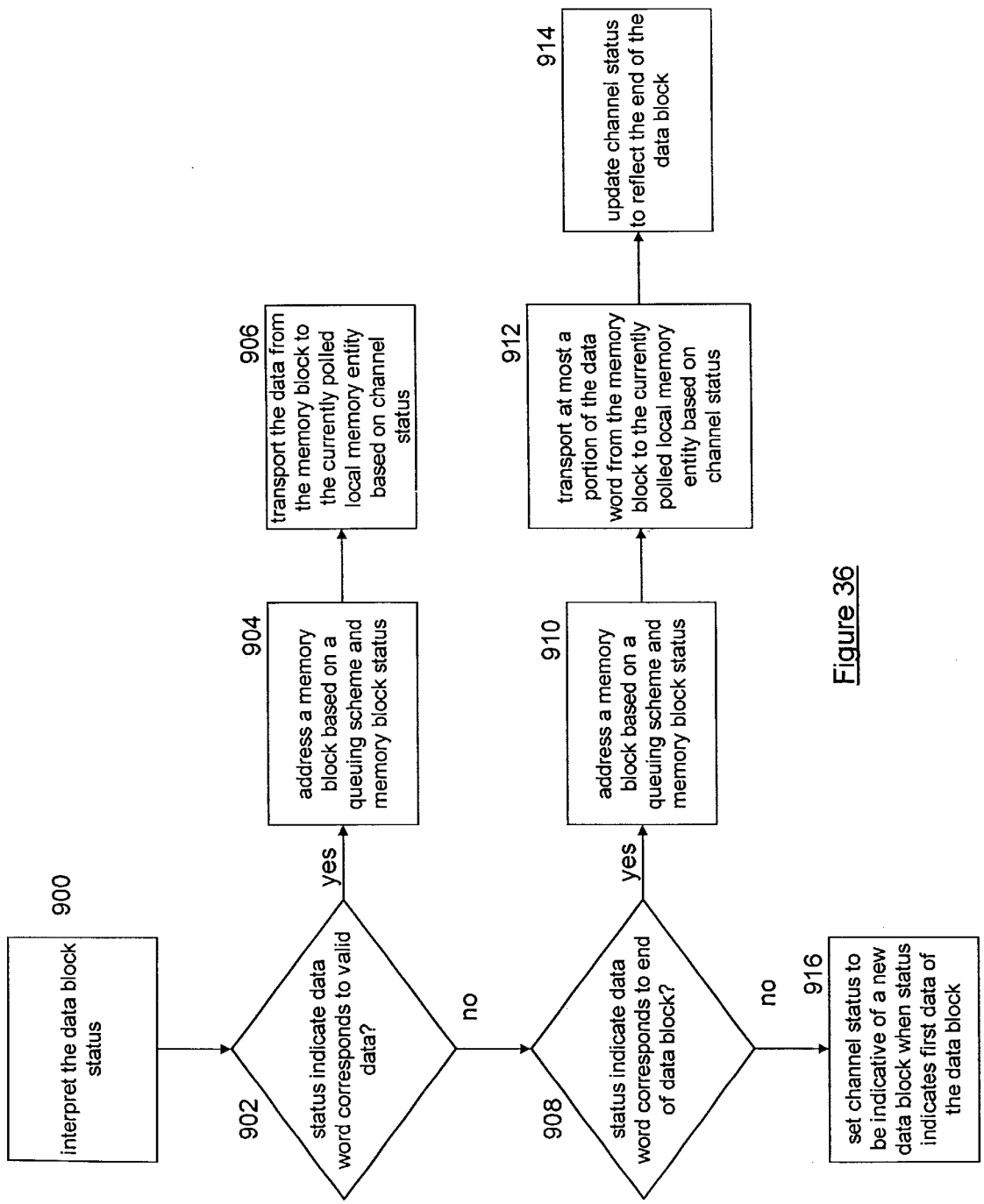
FIG. 36 illustrates a logic diagram of a method in furtherance of the method of FIG. 35.

FIG. 36 illustrates a logic diagram of a method that is furtherance of the method of FIG. 35. At step 900 the data block status is interpreted. The process then proceeds to step 902 where a determination is made as to whether the data block status indicates that the data word corresponds to valid data. If so, the process proceeds to step 904 where a memory block is addressed based on queuing scheme and memory block status. The process then proceeds to step 906 where the data is transported from the memory block to the currently polled local memory entity based on channel status.

If the status does not indicate that the data word corresponds to valid data, the process proceeds to step 908 where a determination is made as to whether the data block status indicates that the data word corresponds to the end of the data block. If not, the process proceeds to step 916 where the channel status is set to be indicative of a new data block when the status indicates first data of a data block. If, however, the status indicates the end of a data block, the process proceeds to step 910.

At step 910 a memory block is addressed based on a queuing scheme and the memory block status. The process then proceeds to step 912 where at most a portion of the data word is transported from the memory block to the currently polled memory entity based on the channel status. Note that at most a portion of the data word may be transported since some of the data word is used to indicate the end of the data block. The process then proceeds to step 914 where channel status is updated to reflect that the end of the data block has been reached.

The preceding discussion with reference to FIGS. 29–36 have described a memory management system that facilitates the flow of data between the local memory entities and the non-local memory entity in data transport system 12–16. In summary, the memory manager 172 allows the local memories to input/output the stored memory in a serial bit stream fashion. The memory manager controls the transport of data between the local memory and non-local memory in data words (e.g., one to sixteen bytes in length). The memory manager monitors the transfer of data to insure that incoming data packets associated with a logical channel are stored in a retrievable manner in non-local memory. By monitoring the status of such storage, the memory manager can determine when the data packets have been completely stored and/or when a data packet is invalid. The memory manager also facilitates the retrieval of a data packet from non-local memory by insuring that it is valid and fully stored in the non-local memory. In addition, the memory manager, via the linked list minimizes overflow or underflow conditions by access the local memories in a distributive manner. If an overflow or underflow condition were to arise, the data packet would be flagged as invalid, requiring retransmission. By minimizing the chance for an overflow or underflow condition, the need to retransmit data is substantially reduced.

Figure 37:
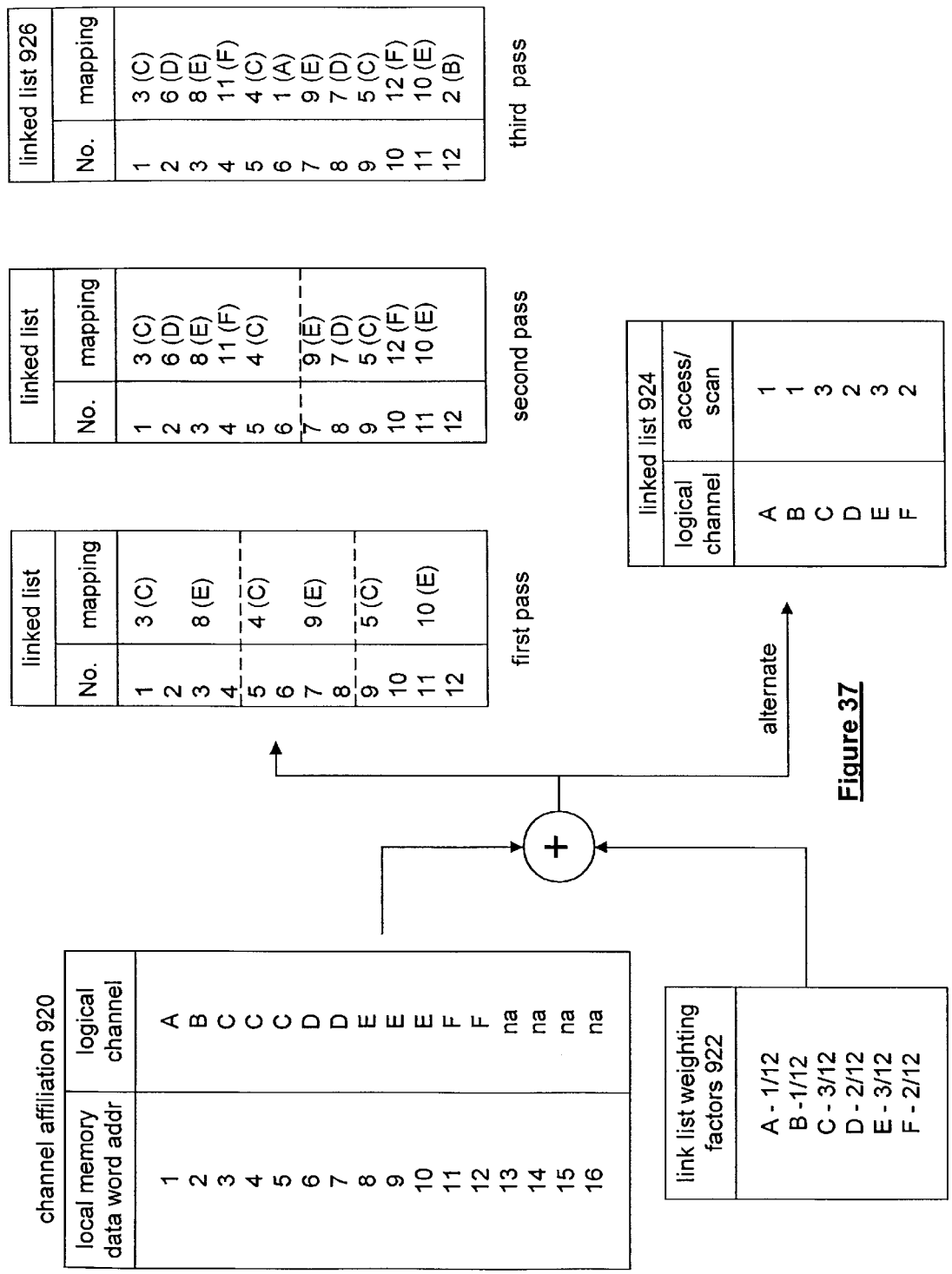
FIG. 37 illustrates a graphical representation of generating a linked list in accordance with the present invention.

FIG. 37 illustrates a graphical representation for the generation of a linked list 924 or 926. As shown, channel affiliation data 920 includes a local memory data word addresses (i.e., data section identifiers) and a logical channel affiliation. As shown, the local memory data word address includes 16 entries where 12 of the 16 have been allocated to a logical channel. As shown, logical channel A is affiliated with local memory address 1, local channel B is affiliated with the local memory data word address 2, and so on. From the channel affiliation data 920, the linked list, or dynamic list weighting factors 922 are be determined. In a straight forward weighting approach, the weighting is determined based on the number of entries affiliated with the logical channel to the total number of local memory data words used. As such, the weighting factor for channels A and B is $1/12$, for C and E: $3/12$ and for D and F: $2/12$.

By combining the channel affiliation data 920 with the linked list weighting factors 922, the linked list 924 and/or 926 may be generated. The linked list 924 includes the logical channel and the number of accesses per scan through the list. As such, as the memory manager is utilizing linked list 924 to access the local memories, it would access all 12 assigned local memory data words but based on the logical channel affiliation. As such, logical channel A would be addressed once per a linked list loop procedure as would logical channel B. Logical channel C and E would be accessed three times while logical channels D and F would be accessed twice.

The other technique for generating the linked list is to first address the logical channels having the higher weighting factors. Based on the weighting factors, the linked list 926 is divided into distribution sections corresponding to the weighting factor. As such, for this example, a first pass for generating the linked list divides the list into three sections where the logical channels C and E should each appear once in each of the sections. By distributing the logical channels in this manner, the chance for a data overflow or underflow is substantially reduced. The next pass through the linked list deals with the next level of weighting factors, which correspond to channels D and F. Since each of these logical channels is required to appear twice in the linked list, the linked list is divided in half. The memory locations associated with logical channels D and E are added to the linked list. Finally, the third pass includes the lower priority weighting factors associated with channels A and B.

As one of average skill in the art would appreciate, FIG. 37 is an example of a process for generating the linked list utilizing weighting factors. The three-step process as shown to generate linked list 926 is included as an illustration to facilitate the understanding of the generation of linked list and does not necessarily indicate that three steps need to be processed to obtain the linked list or that the generation of the linked list is done in such steps. Further note that only one object may be present when the linked list is established, such that the linked list is further built as discussed with reference to FIGS. 38–43.

Figure 38:
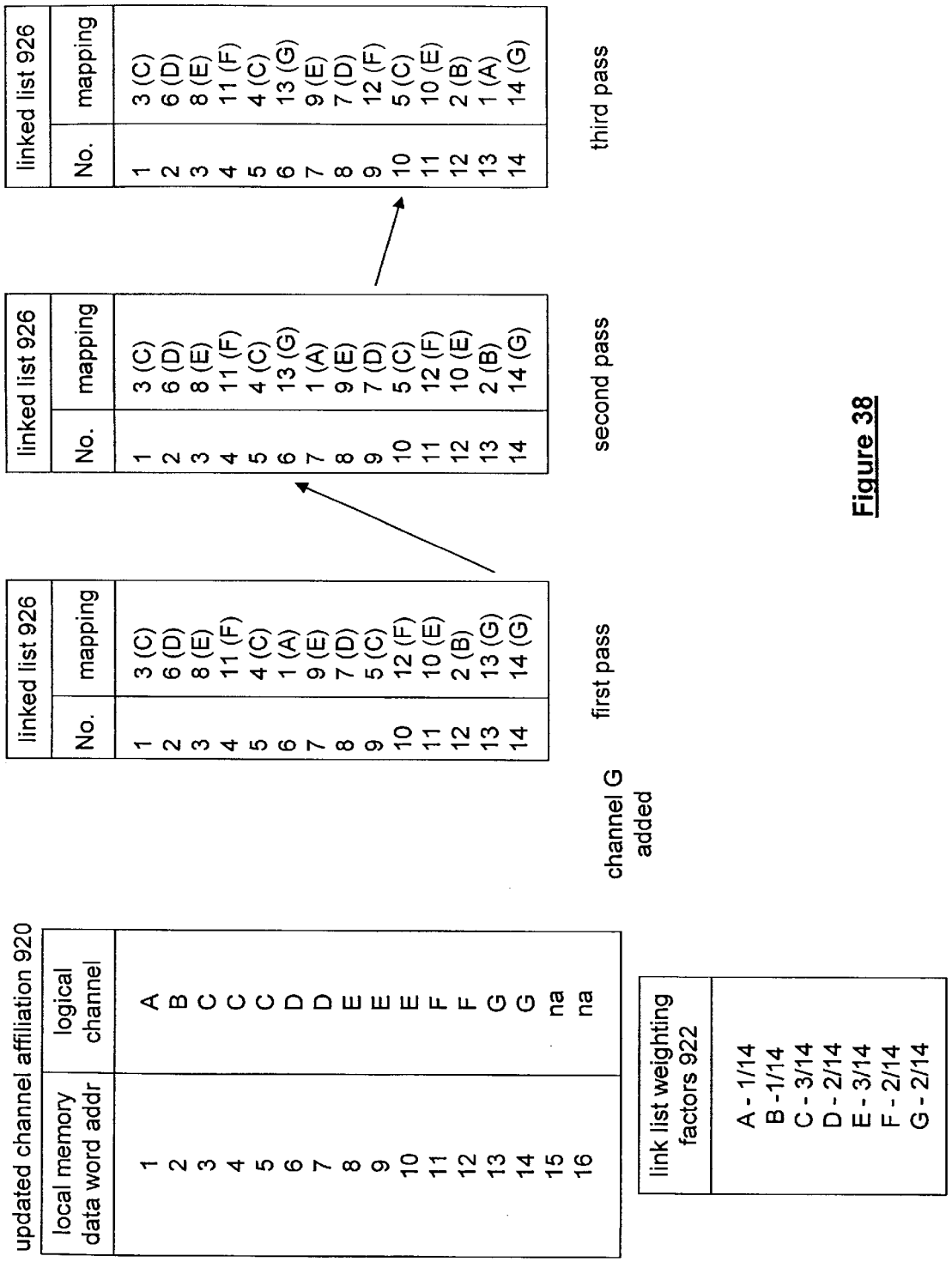
FIG. 38 illustrates a graphical representation of updating the linked list with a new object in accordance with the present inventions.

FIG. 38 illustrates a graphical representation for the addition of Channel G to the linked list. As shown, the channel affiliation data 920 is updated to include that logical channel G has two local memory data word sections assigned thereto. As such a new linked list weighting factor table 922 is generated as shown. A first pass of generating the linked list may be done by simply adding the data sections associated with logical channel G to the linked list. Since they are adjacent, it is readily determined that the distribution of the object elements associated with channel G are unsatisfactory. As such, at least one is redistributed to achieve a more acceptable distribution. When the more appropriate position is determined, the object entry is inserted into the linked list and the surrounding entries are adjusted. As shown in the second pass, the object entry associated with logical channel A is pushed to position 7 and each subsequent entry is pushed down, such that an object entry associated with logical channel G can be shifted to the $6^{th}$ position in the list. With this redistribution, the two object entries for object G are distributed within the linked list. As such, approximately every half traversal of the linked list, object G will be processed.

Having done this redistribution of the linked list, a determination is made as to whether other objects in the list have an appropriate distribution. As shown in the second pass, the three entries for object C are at positions one, five and nine. The spacing between these entries is thus three, three and five. As such, if the spacing between the object entry at position nine and the object entry at position one could be reduced, the object entries for object C would have a better distribution ratio. By moving the object entry for object C to position 10, the desired spacing is obtained for object C, while the entry for object F is pushed up in the list.

In general, the redistribution of the list is done by auditing each object in the list to determine the spacing for each entry of the object. Once the spacing is obtained, it is compared to a desired spacing threshold, which is calculated on the fly based on the size of the list and the number of entries associated with the object. If each spacing is within acceptable limits of the desired spacing threshold, no change is made. If, however, the spacing is not within the desired spacing threshold, an object entry is moved to obtain the desired spacing. Other object entries are pushed up or down the list to accommodate for the repositioning of the moved object entry.

Once the first object of the list is checked for proper distribution, the next object in the list is checked. If spacing of entries for the next object is acceptable, the next object is checked. If not, at least one object entry is moved to obtain the desired spacing. Such individual object distribution checking continues sequentially through the list in a round robin manner. Note that the distribution checking may be executed as a background process such that it does not substantially interfere with the utilization of the linked list. Further note that the distribution checking may not be commenced until a certain number of objects are in the linked list.

Figure 39:
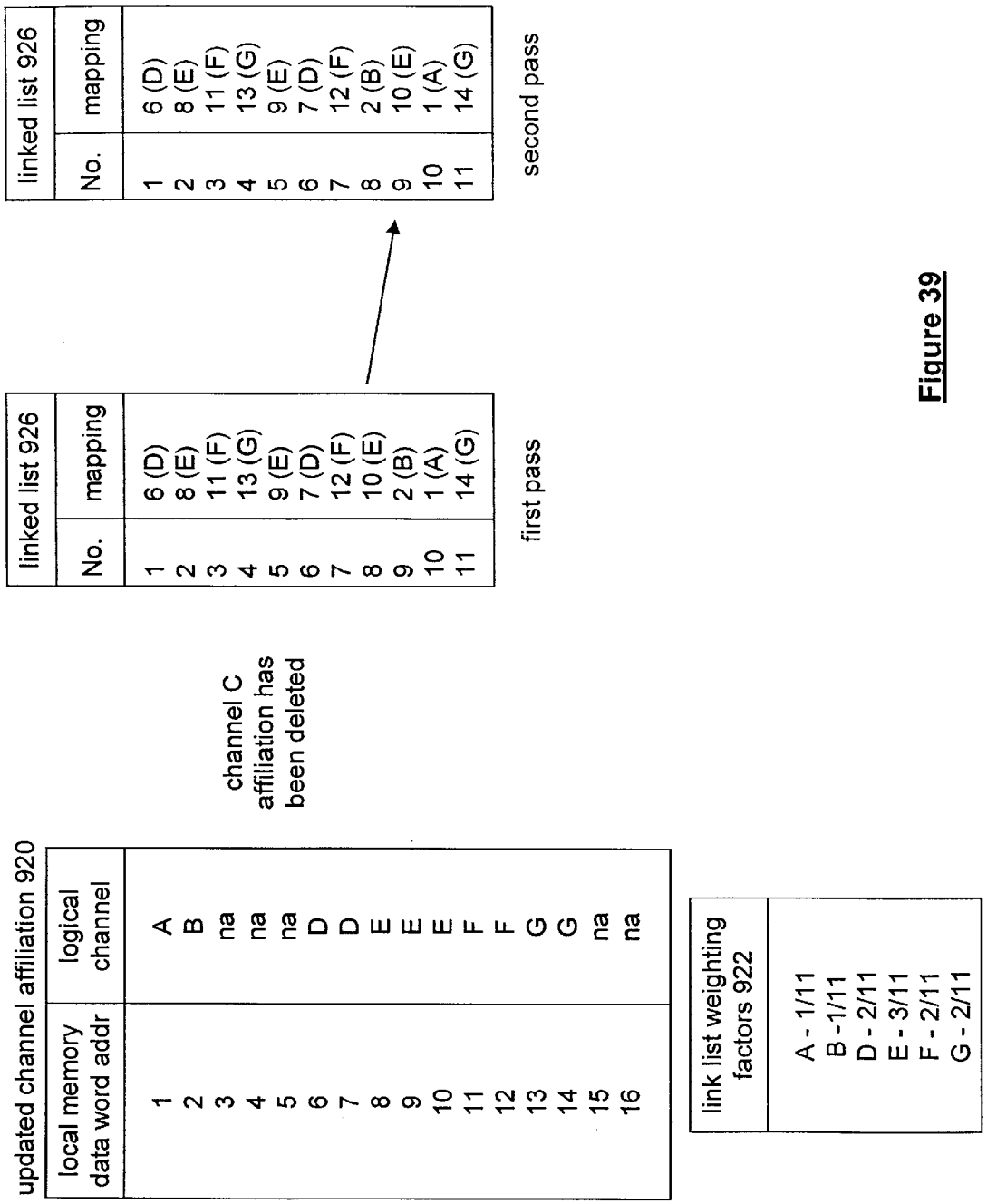
FIG. 39 illustrates a graphical representation of deleting an object from the linked list in accordance with the present invention.

FIG. 39 illustrates the graphical representation of deleting channel, or object, C from the linked list. As shown, the channel affiliation data 920 is updated to show the removal of logical channel, or object C. Correspondingly, the linked list weighting factors 922 are updated to show the removal of object C. The first pass linked list is done by simply removing the entries associated with object C and compressing the list as shown. Having done this, a determination is then made as to whether the objects have a desired distribution. As can be seen, the distribution between object entries associated with object E have a spacing of two, two and four. It would be desirable to reduce the spacing of four (e.g., the spacing between entry number eight and entry number two), thereby obtaining a more distributive balance for the object entries related to object E. By moving the third object entry of object E to the 9 position, the object entry for object B is pushed up the list.

Figure 40:
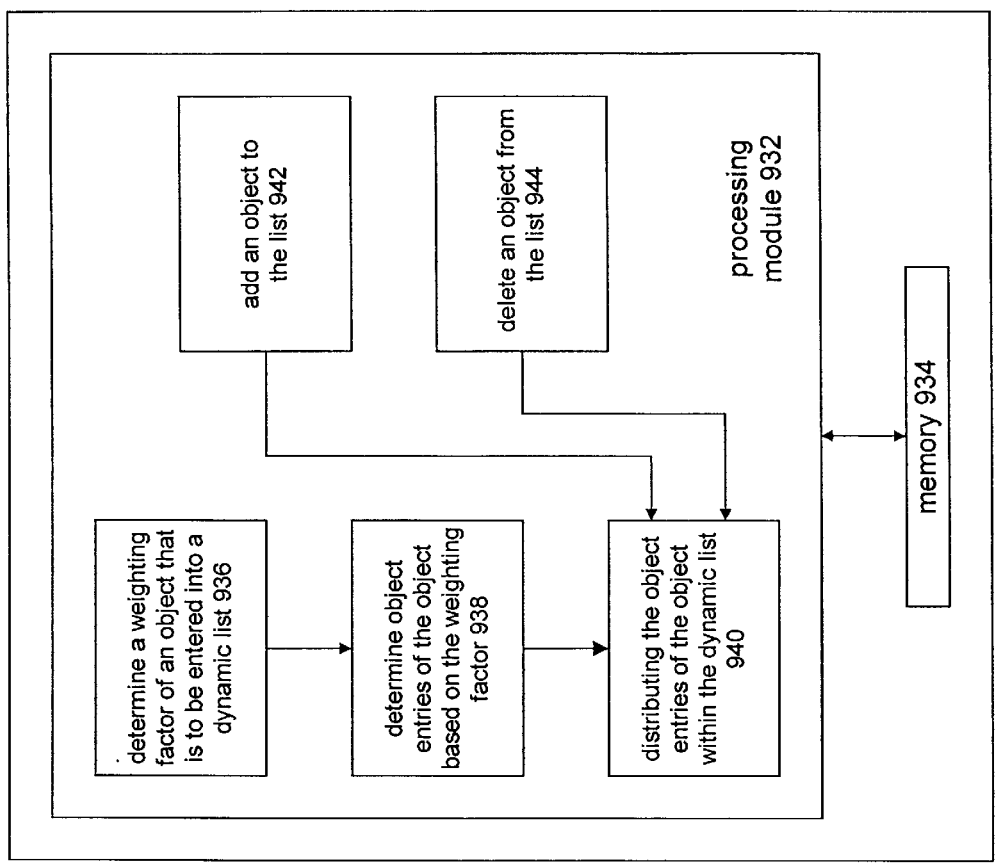
FIG. 40 illustrates a schematic block diagram of a dynamic list processor in accordance with the present invention.

FIG. 40 illustrates a graphical representation of a dynamic list processor 930 that includes a processing module 932 and memory 934. The processing module 932 may be a single processing entity or a plurality of processing entities. Such a processing entity may be a microprocessor, microcomputer, microcontroller, digital signal processor, state machine, logic circuitry and/or any device that manipulates data based on operating instructions. The memory 934 may be read-only memory, random access memory, floppy disk memory, hard disk memory, magnetic tape memory, and/or any device that stores digital information. Note that if the processing module includes a state machine and/or logic circuitry to implement one or more of its functions, the operating instructions stored in memory are embedded within the state machine and/or logical circuitry. As such, the memory is embedded in the state machine.

The memory 934 stores operating instructions that cause the processing module 932 to function as a plurality of circuits 936–940. While performing the operating instructions, the processing module functions as circuit 936 to determine a weighting factor for an object that is to be entered into a dynamic list. The processing module then functions as circuit 938 to determine object entries of the object based on the weighting factors. The processing module then functions as circuit 940 to distribute the object entries of the object within the dynamic list. The processing module may also function as circuit 942 to add an object to the list when an object is to be added to the list. In addition, the processing module may function as circuit 944 to delete an object from the list when so indicated. The operating instructions stored in memory 934 and executed by processing module 932 will be discussed in greater detail with reference to FIG. 41. Note that the dynamic list processor 930 is capable of performing the functions described with reference to the examples of FIGS. 37–39.

Figure 41:
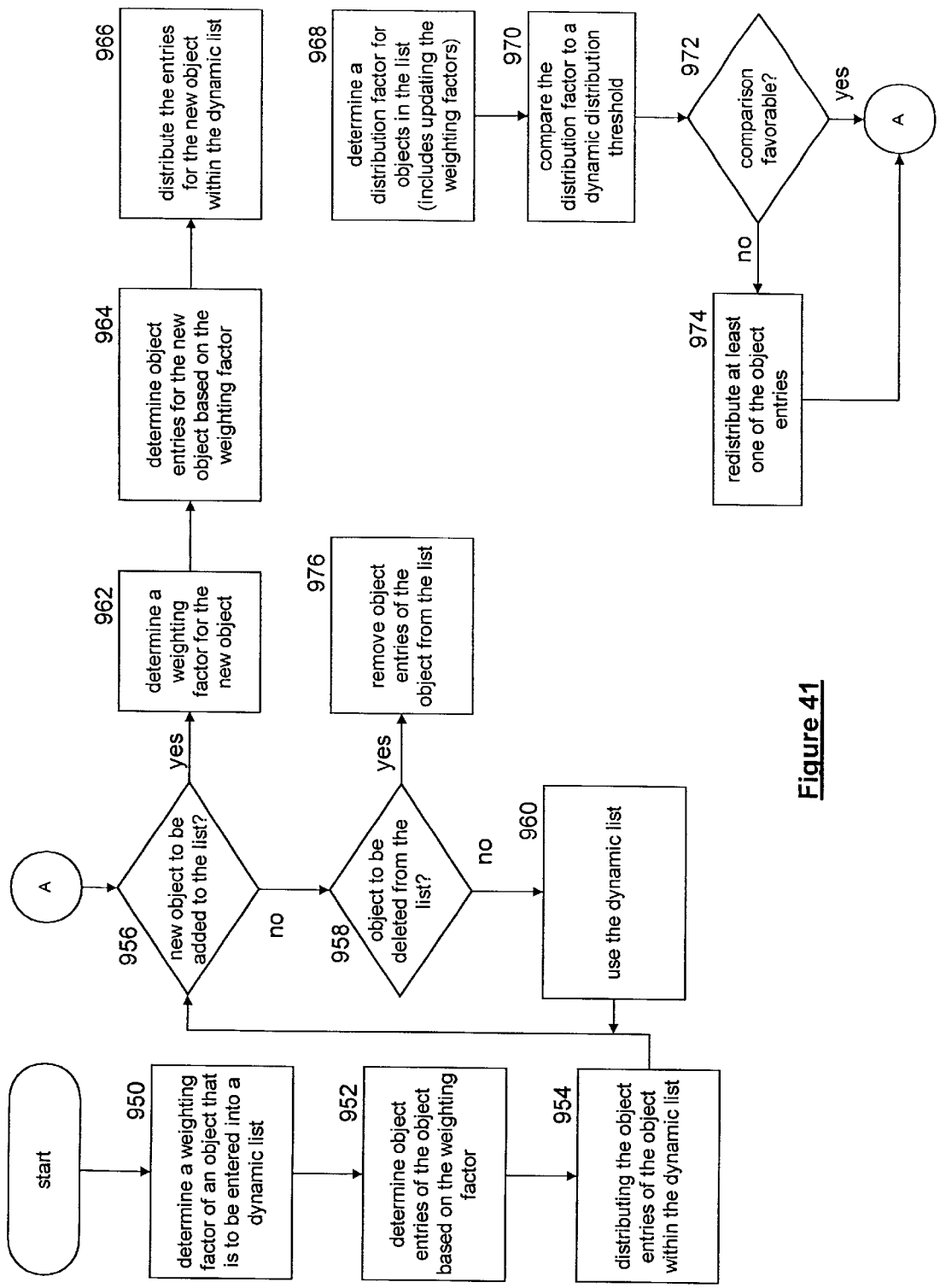
FIG. 41 illustrates a logic diagram of a method for generating a dynamic list in accordance with the present invention.

FIG. 41 illustrates a logic diagram of method for generating a dynamic list. The process begins at step 950 where a weighting factor of an object that is to be entered into a dynamic list is determined. The weighting factor corresponds to an object rate of the object, a priority of the object and/or a user preference of an object. The process then proceeds to step 952 where object entries of the object are determined based on the weighting factor. The process then proceeds to step 954 where the object entries are distributed within the dynamic list. The object entries may be linked together such that the dynamic list equates to a linked list. Further note that the dynamic list may be generated for a telecommunications data transport system wherein the objects correspond to logical channels. Further note that the object entries of an object may correspond to channel segments associated with the logical channels. Further note that the distributing of the object entries within the dynamic list may be done by determining the size of the dynamic list and distributing the object elements within the dynamic list based on the weighting factor and the size of the dynamic list.

The process then proceeds to step 956 where a determination is made as to whether a new object is to be added to the list. If so, the process proceeds to step 962 where the weighting factor for the new object is determined. The process then proceeds to step 964 where object entries are determined for the new object based on the weighting factor. The process then proceeds to step 966 where the entries of the new object are distributed within a dynamic list.

If a new object is not being added to the list, the process the proceeds to step 958, where a determination is made as to whether an object is to be deleted from the list. If not, the process proceeds to step 960 where the dynamic list is used and the process is looped to step 956. If, however, an object is to be removed from the list, the process proceeds to step 976 where the object entries are removed from the list. Note that a processing entity that produced the linked list may or may not be the processing entity that accesses the linked list. Further note that when the linked list is being updated with a new object, a deleted object, or a redistribution of object entities, the linked list remains accessible for use.

While the processing steps 950–964, and 976 are being performed, a redistribution checking processing is being performed in parallel, or in the background as not to substantially interfere with the main process. Such redistribution checking begins at step 968 where a distribution factor for an object in the list is determined. Such a determination may include updating the weighting factors. The process then proceeds to step 970 where the distribution factor is compared to a dynamic distribution threshold. The process then proceeds to step 972 where a determination is made as to whether the comparison was favorable. If so, the process continues at step 956. If, however, the comparison was not favorable, the process proceeds to step 974. At step 974, at least one of the object elements is redistributed within the dynamic list.

Figure 42:
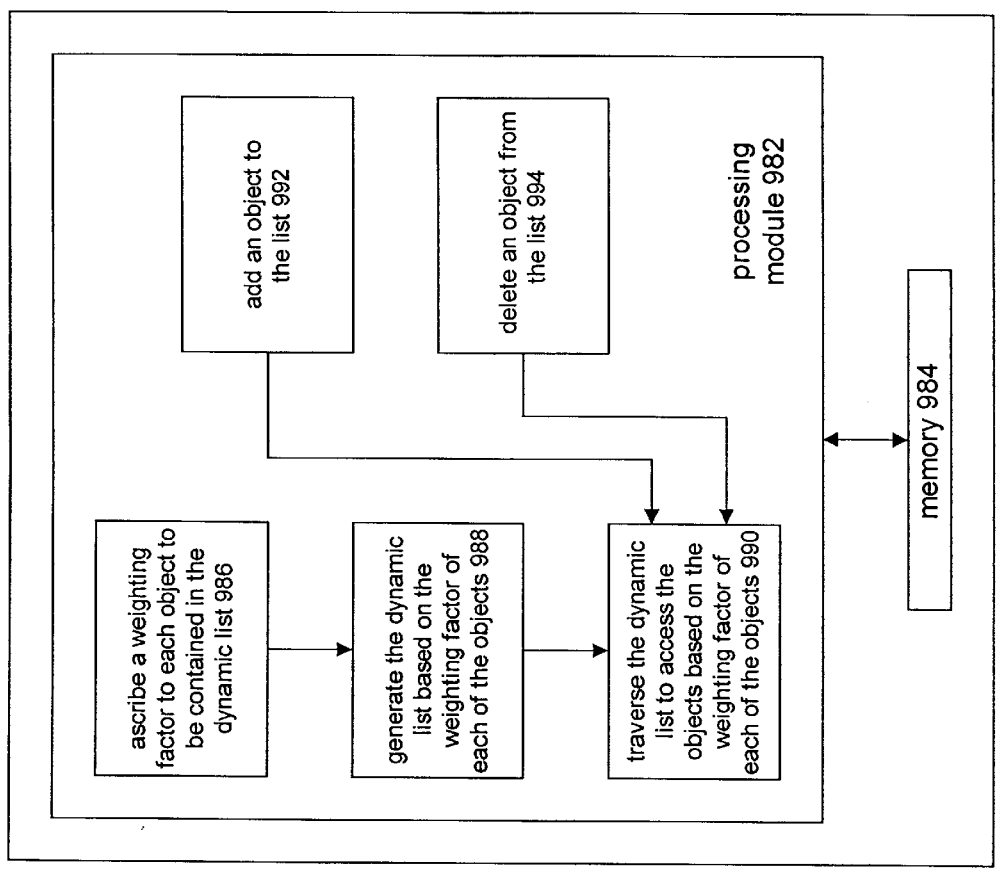
FIG. 42 illustrates a schematic block diagram of an alternate dynamic list processor in accordance with the present invention.

FIG. 42 illustrates a dynamic list processor 980 that includes a processing module 982 and memory 984. The processing module 982 may include a single processing entity or a plurality of processing entities. Such a processing entity may be a microprocessor, microcontroller, microcomputer, digital signal processor, central processing unit, state machine, logical circuitry and/or any device that manipulates digital information based on operating instructions The memory 984 may be read-only memory, random access memory, floppy disk memory, hard disk memory, magnetic tape memory, CD memory, DVD memory, and/or any device that stores operating instructions. Note that if the processing module 982 includes a state machine and/or logic circuitry to implement one or more of its functions, the operating instructions are embedded within the state machine and/or logic circuitry. As such, the memory is embedded within the logic circuitry and/or state machine.

Memory 984 stores operating instructions that cause the processing module 982 to function as a plurality of circuits 986–994. As circuit 986, the processing module ascribes a weighting factor to each object to be contained within the dynamic list. The processing module then functions as circuit 988 to generate the dynamic list based on the weighting factor of each of the objects. The processing module then functions as circuit 990 to traverse the dynamic list to access the objects based on the weighting factor of each of the objects. The processing module may further function as circuit 992 to add an object to the list. The processing module may also function as circuit 994 to delete an object to the list. The operating instructions stored in memory 984 and performed by processing module 982 may be further described with reference to FIG. 43. Note that the dynamic processing module 980 performs similar functions as described with reference to FIGS. 37 through 39.

Figure 43:
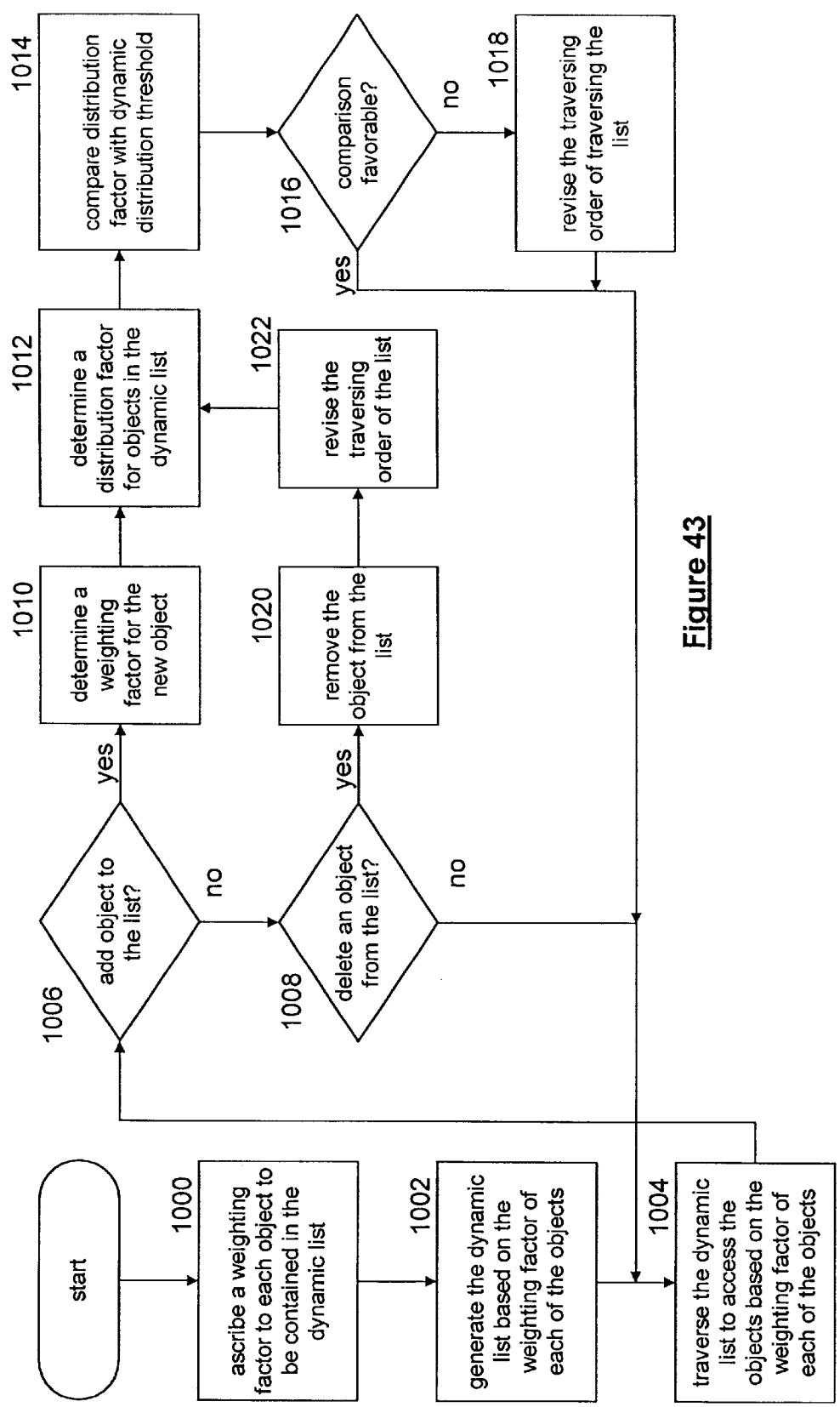
FIG. 43 illustrates a logic diagram of an alternate method for generating a dynamic list in accordance with the present invention.

FIG. 43 illustrates a logic diagram for generating a dynamic list. The process begins at step 1000 where a weighting factor is ascribed to each object to be contained within the dynamic list. The process then proceeds to step 1002 where the dynamic list is generated based on the weighting factor of each of the objects. The process then proceeds to step 1004 where the dynamic list is traversed to access objects based on the weighting factor of each of the objects. Such a dynamic list corresponds to the dynamic list 924 illustrated in FIG. 37. The dynamic list may be traversed in a distributive manner such that each object is accessed with the greatest probability of avoiding an overflow or underflow condition of the local memory.

The process then proceeds to step 1006 where a determination is made as to whether an object is to be added to the list. If so, the process proceeds to step 1010 where a weighting factor is determined for the new object. The process then proceeds to step 1012 where a distribution factor for the objects in the dynamic list is determined. The process then proceeds to step 1014 where a distribution factor is compared with a dynamic distribution threshold. As such, the dynamic distribution threshold is established, as best as possible, keep the distance between the allocations of a particular object as equal as possible. As shown in the examples of FIGS. 37 through 39, it was desirable to maintain a relatively equal number of object entries between object entries of the same object thereby assuring that every X entry in the list, the object would be addressed. As such, with a balanced distribution of object entries of objects within the list, overflow and underflow conditions of local memory can be minimized.

The process then proceeds to step 1016 where a determination is made as to whether the comparison of 1014 was favorable. If not, the process proceeds to step 1018 where the traversing order of the dynamic list is revised to facilitate a more compatible distribution. The process then reverts to step 1004 where the dynamic list is traversed. If, however, the comparison was favorable, the process proceeds to step 1004.

At step 1008 a determination is made as to whether an object is to be deleted from the list. If not, the process reverts to step 1004. If, however, an object is to be deleted from the list, the process proceeds to step 1020 where the object is removed from the list. The process proceeds to step 1022 where the traversing order of the list is revised. The process then proceeds to step 1012 and follows the subsequent steps. The processing steps of FIGS. 41 and 43 may be stored on a memory device such as a floppy disk, hard disk, etc. or embedded into a memory chip and treated as a separate product.

The preceding discussion has presented a method and apparatus for improving data transpiration within a data transportation system. By processing ingress and egress data at the bit level utilizing a memory manager and a linked list, the data can be processed in an efficient manner. With such an efficient manner, a switching entity is capable of supporting a DS3 link such that each of the DS0s associated with the DS3 link is capable of supporting an independent logical channel. By improving the switching entity to accommodate 672 logical channels, a service provider is given greater flexibility in servicing its customers.

What is claimed is:

1. A method for packetizing data, the method comprises the steps of:
   a) determining bit-time occurrence for retrieval of at least one bit of at least a portion of a data word;
   b) determining status of the data word based on the bit-time occurrence;
   c) retrieving, from local memory, the at least one bit based on the status of the data word to produce at least one retrieved bit;
   d) updating status of the data word based on the bit-time occurrence of the at least one bit and the data word to produce updated status of the data word; and
   e) applying a data packetizing protocol to the at least one retrieved bit based on the status of the data word to construct a data packet corresponding to the data word.

2. The method of claim 1, wherein step (e) further comprises at least one of:
   outputting the at least one retrieved bit;
   generating a stuffing bit and outputting the stuffing bit;
   outputting at least one error checking bit; and
   outputting at least one flag bit.

3. The method of claim 1, wherein step (e) further comprises inserting at least one abort bit in the at least one retrieved bit position when an underflow condition is detected.

4. The method of claim 1, wherein step (c) further comprises:
   determining at least one data section of the local memory based on a logical channel, wherein the local memory includes a plurality of data sections and associated status sections, and wherein the data packet is conveyed via the logical channel; and
   retrieving the at least one bit from a given location of the at least one data section.

5. The method of claim 4 further comprises storing the updated status in the associated status section corresponding to the at least one data section.

6. The method of claim 1, wherein the status of the data word comprises at least one of: current status of the data word, history status of the data word, mapping information of a logical channel to local memory, local memory context information that contains addressing information, current stored word length, and link list information.

7. The method of claim 1, wherein step (e) further comprises:
   determining that the at least one bit is affiliated with an unassigned logical channel; and
   outputting a null bit in place of the at least one bit.

8. A method for packetizing data, the method comprises the steps of:

a) storing at least a portion of the data word in at least one data storage section of a plurality of data storage sections of local memory;

on a bit by bit basis, b) obtaining data mapping information that corresponds the data word to the at least one data storage section and time positioning data;

c) obtaining memory context information based on at least a portion of the data mapping information, wherein the memory context information contains current bit retrieval status of the at least a portion of the data word; and d) processing a bit of the at least a portion of the data word as at least one of: data and data packetizing protocol information based on at least one of: time occurrence of the bit, the data mapping information, and the memory context information.

9. The method of claim 8 further comprises, prior to step (a), determining at least a portion of a data word is available for packetizing.

10. The method of claim 9 further comprises:

determining that the data word is available for transporting; and determining an allocated portion of the local memory has capacity to store the at least a portion of the data word.

11. The method of claim 8, wherein step (b) further comprises:

determining a logical channel affiliation of the bit based on time occurrence for retrieval of the bit and the time positioning data; and identifying the at least one data storage section based on the logical channel affiliation.

12. The method of claim 8, wherein the current bit retrieval status comprises at least one of: channel segment rate, addressing mode, valid data, linked memory segments, and data storage section fill status.

13. The method of claim 8, wherein step (d) further comprises:

determining logical channel affiliation of the bit based on time occurrence for retrieval of the bit and the time positioning data;

obtaining the memory context information specific to the logical channel to obtain specific memory context information; and determining whether the bit corresponds to data and data packetizing protocol information based on the specific memory context information and the data content of the bit.

14. The method of claim 13 further comprises:

interpreting the specific memory context information to identify that outgoing data is valid;

comparing the data content of the bit and at least a portion of previously outputted bits of the data word with an end of data packet flag; and outputting the bit as data when the comparing to the end of data word flag was favorable.

15. The method of claim 14 further comprises:

determining that the bit is packet protocol information when the comparing to the end of data word flag was unfavorable; and updating the specific memory context information to indicate that the data word has been outputted when the comparing to the end of data packet flag was unfavorable.

16. The method of claim 14 further comprises outputting a stuffing bit as the data when the data is valid and a pattern of data matches a packetizing protocol pattern.

17. The method of claim 13 further comprises:

comparing the data content of the bit and at least a portion of previously outputted bits associated with the logical channel with a start of data packet flag;

determining that the bit is packet protocol information when the comparing to the end of data packet flag was favorable;

outputting the bit as packet protocol information when the comparing to the start of data packet flag was favorable; and updating the specific memory context information to indicate that the data packet is beginning to be outputted when the comparing to the start of data packet flag was favorable.

18. The method of claim 13, further comprises determining the bit is frame delineation data based on the time occurrence for the retrieval of the bit and the time positioning data.

19. A data packetizing module comprises:

a processing module;

local memory; and memory operably coupled to the processing module, wherein the memory includes operating instructions that cause the processing module to (a) determine bit-time occurrence for retrieval of at least one bit of at least a portion of a data word; (b) determine status of the data word based on the bit-time occurrence; (c) retrieve, from the local memory, the at least one bit based on the status of the data word to produce at least one retrieved bit; (d) update status of the data word based on the bit-time occurrence of the at least one bit and the data word to produce updated status of the data word; and (e) apply a data packetizing protocol to the at least one retrieved bit based on the status of the data word to construct a data packet corresponding to the data word.

20. The data packetizing module of claim 19, wherein applying the data packetizing protocol includes at least one of:

outputting the at least one retrieved bit;

generating a stuffing bit and outputting the stuffing bit;

outputting at least one error checking bit; and outputting at least one flag bit.

21. The data packetizing module of claim 19, wherein applying the data packetizing protocol includes inserting at least one abort bit in the at least one retrieved bit position when an underflow condition is detected.

22. The data packetizing module of claim 19, wherein the memory further comprises operating instructions that cause the processing module to:

determine at least one data section of the local memory based on a logical channel, wherein the data packet is conveyed via the logical channel; and retrieve the at least one bit from a given location of the at least one data section.

23. The data packetizing module of claim 22, wherein the memory further comprises operating instructions that cause the processing module to store the updated status in the associated status section of the at least one data section.

24. The data packetizing module of claim 19, wherein the memory further comprises operating instructions that cause the processing module to:

determine that the at least one bit is affiliated with an unassigned logical channel; and output a null bit in place of the at least one bit.

25. A data packetizing module comprises:

a processing module;

local memory; and memory operably coupled to the processing module, wherein the memory includes operating instructions that cause the processing module to (a) store at least a portion of the data word in at least one data storage section of a plurality of data storage sections of the local memory; and, on a bit by bit basis, (b) obtain data mapping information that corresponds the data word to the at least one data storage section and time positioning data; (c) obtain memory context information based on at least a portion of the data mapping information, wherein the memory context information contains current bit retrieval status of the at least a portion of the data word; and (d) process a bit of the at least a portion of the data word as at least one of: data and data packetizing protocol information based on at least one of: time occurrence of the bit, the data mapping information, and the memory context information.

26. The data packetizing module of claim 25, wherein the memory further comprises operating instructions that cause the processing module to:

determine a logical channel affiliation of the bit based on time occurrence for retrieval of the bit and the time positioning data; and identify the at least one data storage section based on the logical channel affiliation.

27. The data packetizing module of claim 25, wherein the memory further comprises operating instructions that cause the processing module to:

determine logical channel affiliation of the bit based on time occurrence for retrieval of the bit and the time positioning data;

obtain the memory context information specific to the logical channel to obtain specific memory context information; and determine whether the bit corresponds to data, packetizing protocol information, or frame delineation data based on the specific memory context information and the data content of the bit.

28. The data packetizing module of claim 27, wherein the memory further comprises operating instructions that cause the processing module to:

interpret the specific memory context information to identify that outgoing data is valid;

compare the data content of the bit and at least a portion of previously outputted bits of the data word with an end of data packet flag; and output the bit as data when the comparing to the end of data word flag was favorable.

29. The data packetizing module of claim 28, wherein the memory further comprises operating instructions that cause the processing module to:

determine that the bit is packet protocol information when the comparing to the end of data word flag was unfavorable; and update the specific memory context information to indicate that the data word has been outputted when the comparing to the end of data packet flag was unfavorable.

30. The data packetizing module of claim 28, wherein the memory further comprises operating instructions that cause the processing module to output a stuffing bit as the data when the data is valid and a pattern of data matches a packetizing protocol pattern.

31. The data packetizing module of claim 28, wherein the memory further comprises operating instructions that cause the processing module to:

compare the data content of the bit and at least a portion of previously outputted bits associated with the logical channel with a start of data packet flag;

determine that the bit is packet protocol information when the comparing to the end of data packet flag was favorable;

output the bit as packet protocol information when the comparing to the start of data packet flag was favorable; and update the specific memory context information to indicate that the data packet is beginning to be outputted when the comparing to the start of data packet flag was favorable.

32. The data packetizing module of claim 28, wherein the memory further comprises operating instructions that cause the processing module to determine the bit is frame delineation data based on the time occurrence for the retrieval of the bit and the time positioning data.

* * * * *